United States Patent [19]

Dimick

[11] Patent Number: 4,566,038

[45] Date of Patent: Jan. 21, 1986

[54] SCAN LINE GENERATOR

[75] Inventor: Delbert R. Dimick, Irvine, Calif.

[73] Assignee: Excellon Industries, Torrance, Calif.

[21] Appl. No.: 413,167

[22] Filed: Aug. 30, 1982

Related U.S. Application Data

[63] Continuation-in-part of Ser. No. 314,524, Oct. 26, 1981, abandoned.

[51] Int. Cl.⁴ .......................... H04N 7/18; H04N 1/00

[52] U.S. Cl. .......................................... 358/256; 358/280

[58] Field of Search ................ 358/256, 260, 263, 280

[56] References Cited

U.S. PATENT DOCUMENTS

| | | | |
|---|---|---|---|
| 3,438,003 | 4/1969 | Bryan | 364/900 |
| 3,560,639 | 2/1971 | Centanni | 178/6 |
| 3,666,888 | 5/1972 | Sekimoto | 178/69.5 |
| 3,735,383 | 5/1973 | Naka | 340/324 A |
| 3,792,463 | 2/1974 | Eriksson et al. | 340/751 |
| 3,801,737 | 4/1974 | Komura et al. | 178/6 |
| 3,870,922 | 3/1975 | Shutoh | 315/383 |
| 3,906,480 | 9/1975 | Schwartz et al. | 340/745 |
| 3,992,572 | 11/1976 | Nakagome et al. | 178/6 |
| 3,996,584 | 12/1976 | Plager | 340/324 AD |
| 4,034,400 | 7/1977 | Owen et al. | 358/256 |
| 4,070,710 | 1/1978 | Sukonick et al. | 364/900 |
| 4,075,620 | 2/1978 | Passavant et al. | 364/521 |
| 4,081,842 | 3/1978 | Harbaugh et al. | 358/256 |
| 4,130,887 | 12/1978 | Reins et al. | 364/900 |
| 4,135,214 | 1/1979 | Weber | 358/261 |
| 4,204,207 | 5/1980 | Bakula et al. | 340/723 |
| 4,204,208 | 5/1980 | McCarthy | 340/745 |
| 4,228,432 | 10/1980 | Osborne | 340/736 |
| 4,254,467 | 3/1981 | Davis et al. | 364/521 |
| 4,311,998 | 1/1982 | Matherat | 340/731 |
| 4,410,916 | 10/1983 | Pratt et al. | 358/263 |

OTHER PUBLICATIONS

Bell System Technical Journal, Nov. 1970, pp. 2033–2074, by M. J. Cowan et al.

*Primary Examiner*—Joseph A. Orsino, Jr.
*Attorney, Agent, or Firm*—Gausewitz, Carr & Rothenberg

[57] ABSTRACT

A laser pattern generator for making a printed circuit board master image has its control data divided into image components according to whether a component is a simple figure such as a trace 32 that readily lends itself to conventional data compression coding or a more complex pattern 35 that is less readily coded. Data describing the complex patterns are prestored in a data library 358. Scan line elements of traces and patterns are independently assembled in separate work buffers 366–372. Data in the separate work buffers are then combined, either additively or subtractively, for assembly in a line assembly buffer 374 from which a data stream is derived for modulation of the laser 10. Additively combining data from the work buffers allows one image component to be electronically overlaid upon another, whereas subtractively combining data from the work buffers enables the pattern defined by subtractive data to be removed from another pattern. Slant lines are generated in the form of trapezoids, which are produced from trapezoid commands 380 that define column address of a point on the trapezoid, slope of one side of the trapezoid, width of the trapezoid along a scan line, rate of change of width, and height of the trapezoid. Processing speed is significantly increased by addressing data in the work buffers on a word-by-word basis, and simultaneously controlling the state of all bits of the addressed word of the work buffers.

35 Claims, 49 Drawing Figures

FIG. 3a.
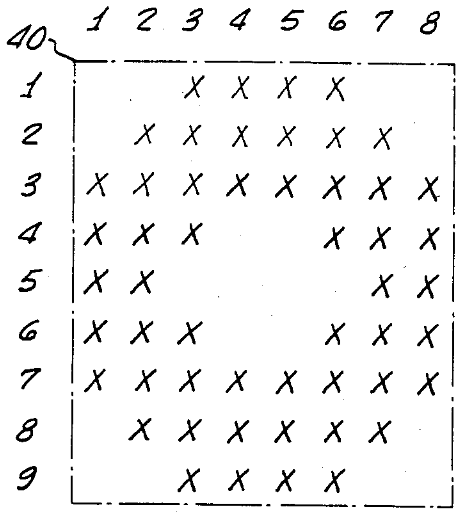
FIG. 3b.
| | | | |
|---|---|---|---|
| 0/2 | 1/4 | 0/2 | |
| 0/1 | 1/6 | 0/1 | |
| | 1/8 | | |
| | 1/3 | 0/2 | 1/3 |
| | 1/2 | 0/4 | 1/2 |
| | 1/3 | 0/2 | 1/3 |
| | 1/8 | | |
| 0/1 | 1/6 | 0/1 | |
| 0/2 | 1/4 | 0/2 | |
FIG. 3c. (PATTERN LIBRARY RAM)
| | RUN LENGTH CODE | RUN LENGTH CODE | NULL BYTE | |
|---|---|---|---|---|
| 1 | 0 0 0 0 0 0 1 0 | 1 0 0 0 0 1 0 0 | 0 0 0 0 | 0 0 0 0 |
| 2 | 0 0 0 0 0 0 0 1 | 1 0 0 0 1 1 0 0 | 0 0 0 0 | 0 0 0 0 |
FIG. 4. (POINTER TABLE)
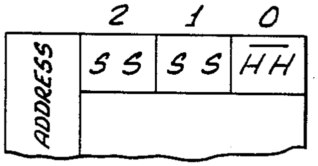
FIG. 5. (PATTERN PROC. TABLE & MAP)
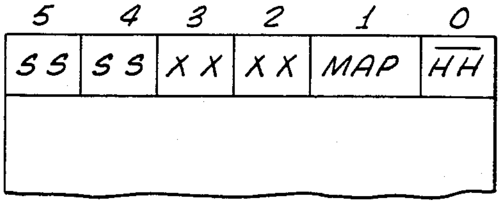

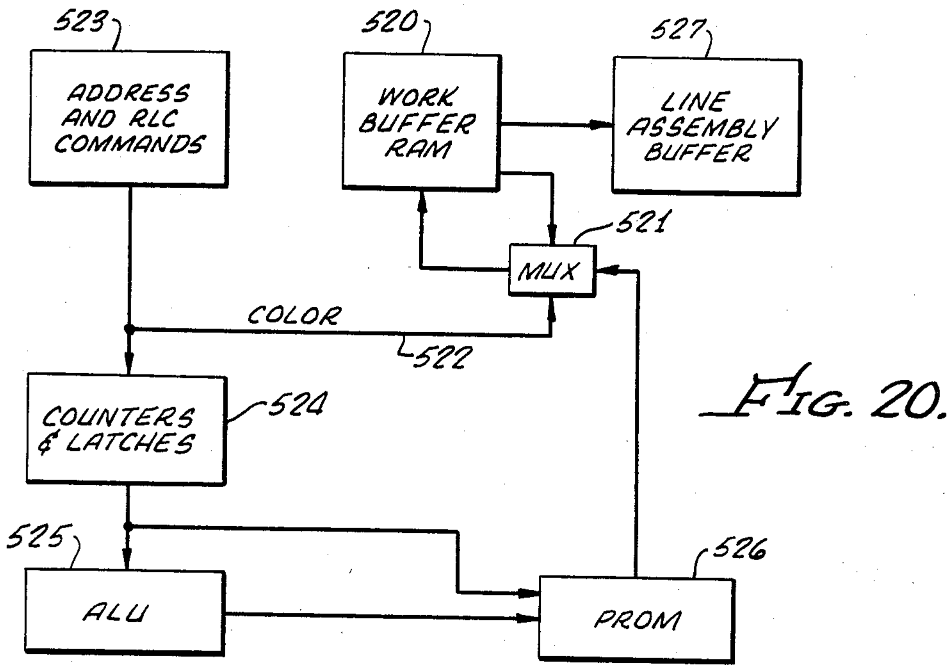
FIG. 20.
FIG. 21.
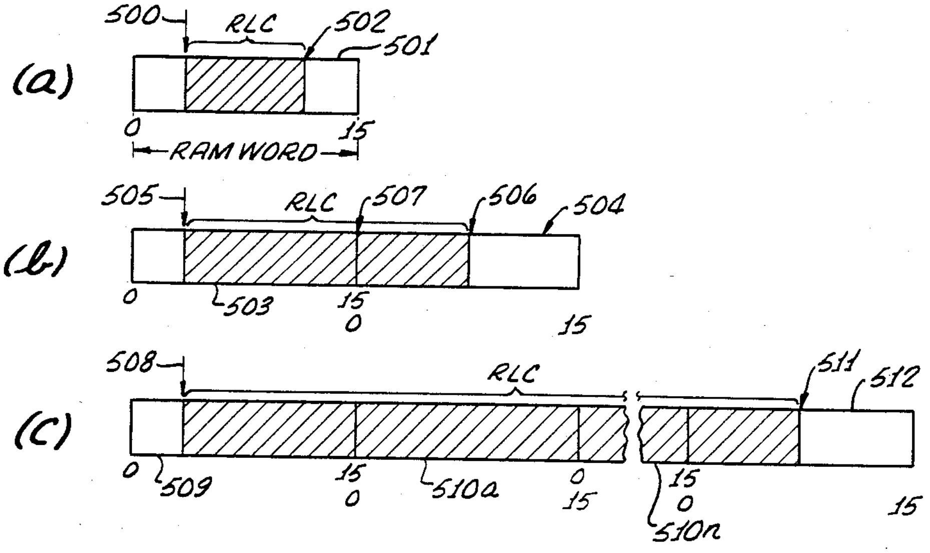

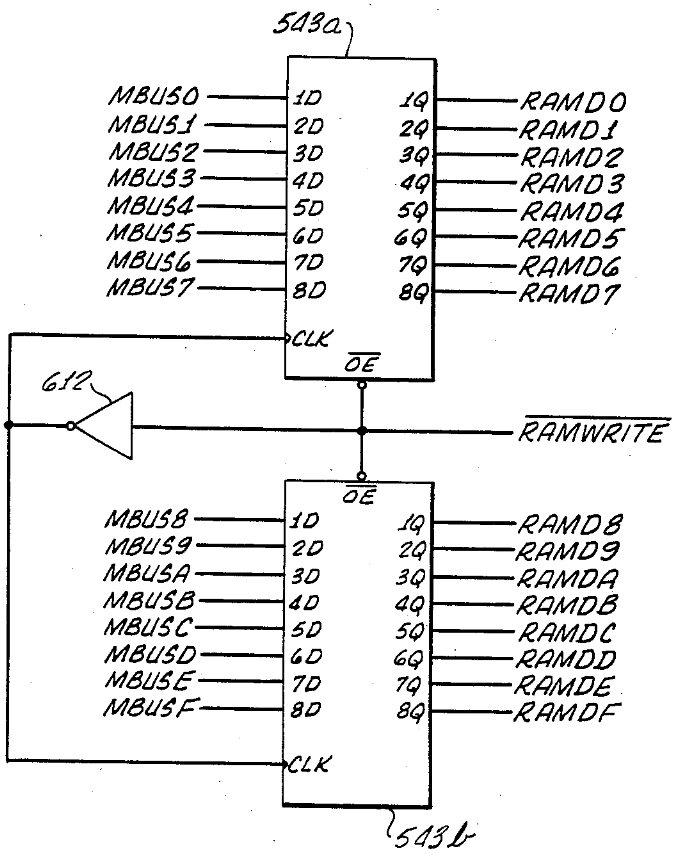
FIG. 25.
FIG. 28.
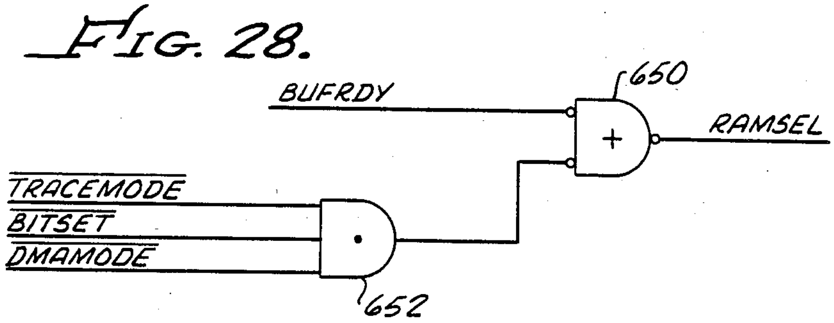

SCAN LINE GENERATOR

This application is a continuation-in-part of U.S. patent application Ser. No. 314,524 for Scan Line Generator, filed Oct. 26, 1981, now abandoned.

BACKGROUND OF THE INVENTION

The present invention relates to digital image display or generation of images, and more particularly concerns methods and apparatus providing increased data compression ratios with large numbers of different irregular patterns.

In the manufacture of printed circuit boards, master images are employed in the processing of the conductive patterns on the board. The master image comprises a number of pads, relatively large conductive areas, and a number of interconnecting conductive leads or traces. Increased density requires leads of smaller width, closely packed with each other and with the pad patterns. The traces are often of a relatively uniform rectangular shape, running vertically, horizontally or diagonally in straight or simple curved lines, whereas the pad patterns may be of irregular shape such as circular, annular, triangular or other nonorthogonal configurations. The required high density and high resolution require that the image generator be capable of high-speed precision definition of traces and patterns.

Graphic plotters and tape-up methods have been employed to generate master images but both require large amounts of time. Computer controlled lasers for generating images significantly reduce the image printing time, but require excessively large storage as display resolution increases. The laser writing beam is caused to sweep the writing medium in a substantially rectangular raster. The beam, of about 1 mil in diameter, is turned on and off over image elements (pixels) of about 1 mil in length. Accordingly, to generate the scan line data for an 18"×24" digitally produced image there is required about 432 megabits of data storage. The amount of data that must be stored for a particular image may become the limiting factor in reducing imaging time because of practical and economic constraints on the rate of data transfer, which data rate is inversely proportional to the time required to form an image.

In an article entitled "The Primary Pattern Generator" in the Bell System Technical Journal of November, 1970, pages 2033–2074, there is described a laser pattern generator in which the bit image of the scan line to be generated is completely assembled in a buffer before the start of a given scan line. Recognizing the great amount of data that must be handled, since each line in this system consists of twenty six thousand bits which must be taken from the buffer in serial fashion, part of the information is compressed according to well known coding techniques, sometimes termed two-dimensional or 2D coding. In this type of data compression, data commands define only changes to be made to currant scan lines. If there is no change in a succeeding scan line, the latter is merely repeated and no data commands for such unchanged line are transmitted. Such an approach is effective on orthogonal patterns that change in either horizontal or vertical directions. Nevertheless, on irregularly shaped patterns and patterns of other geometric shapes, such as a circle, ring, triangle or the like, which require a change in almost every scan line, the advantages of this type of compression are lost. Possibly because of this difficulty, the system of the Bell Technical Journal article produces data that contains all of the twenty six thousand bits for a new scan line, rather than merely update commands, for those instances in which a great number of update commands would be required to produce the succeeding scan line. Thus, exceedingly large amounts of data still must be handled.

Another coding technique is run length coding in which length of the scan between changes in the digital level is stored, instead of storing data defining each individual digital level. Accordingly, in the use of run length coding seven bits may define a continuous run of as many as one hundred twenty-seven zeros or ones. However, this approach, like the 2D coding technique, becomes unworkable as the frequency of the level change increases. As the length of a given run decreases beyond a certain amount this coding technique may result in expansion rather than compression. Clearly, an eight-bit data word will not efficiently describe a pattern length of less than eight unchanged bits. Thus, even with these known types of data compression excessively large amounts of data are still required.

Not only is equipment that is capable of exceedingly high data rates more expensive, but increasing numbers of data bits to be transferred frequently results in increasing error rates.

Accordingly, it is an object of the present invention to provide an imaging system that avoids or minimizes above-mentioned problems.

SUMMARY OF THE INVENTION

In carrying out pirnciples of the present invention in accordance with a preferred embodiment thereof, increased data compression is achieved by grouping components of the image to be generated into those wherein elements exhibit relatively less change from one scan line to the next, which may be called traces, and those of more complex patterns that do not as readily lend themselves to other data compression or encoding techniques. Data defining elements of traces and data defining elements of patterns are separately assembled in trace and pattern work buffers respectively. Plural pattern work buffers may be used and data from all may be combined to either additively or subtractively overlay traces and patterns. Data from one or more of the work buffers are fed to a line assembly buffer from which a data bit stream is fed to the image generator. Data defining each pattern is stored in a pattern library and extracted from the library for assembly into the pattern work buffer. Line-by-line scan data calls out each pattern only in the first scan line in which the pattern occurs and also calls out trace data for each scan line. A pattern processing table contains identification of all patterns that have been called but not yet completely assembled and enables each line of a pattern in the pattern library to be transferred to the pattern work buffer after the pattern call out. Accordingly, the line-by-line scan data is highly compressed. Further compression may be achieved by employing 2D compression to handle trace data and run length coding to handle pattern data stored in the pattern library.

BRIEF DESCRIPTION OF THE DRAWINGS

FIG. 3*a* illustrates to an enlarged scale a typical pattern;

FIG. 3*b* shows a series of run length codes that define the pattern of FIG. 3*a;*

FIG. 3*c* illustrates bit storage in the pattern library RAM;

FIG. 4 illustrates the format of the library pointer table;

FIG. 5 shows the format of the pattern processing table and map;

FIG. 20 is a functional diagram of a run length code command processor;

FIG. 21 illustrates several cases of memory word modification;

FIGS. 23, 24, 25, 26, 27 and 28 are circuit diagrams of various parts of the command processor shown in FIG. 22, and FIGS. 29, 30, 31 and 32 show timing of certain operations of the command processor.

DETAILED DESCRIPTION

General System

Figure 1:
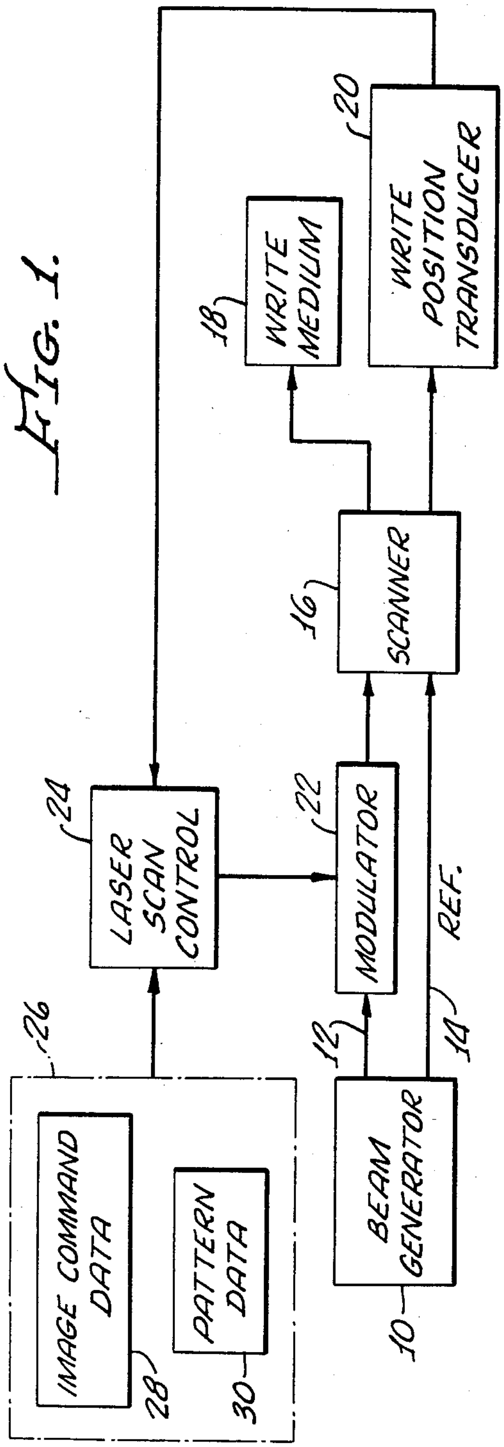
FIG. 1 is a block diagram of a laser pattern generating system embodying principles of the present invention.

Principles of the present invention are applicable to various types of digital imaging systems, including those in which a laser is employed for selectively exposing a light-sensitive medium, and cathode ray tube systems. Substantially the same type of stream of data bits as used for a laser flying spot scanner may be used to control an electrostatic printer having write means that employs sequential excitation of intersecting pairs of X, Y wires to print a rectangular raster. The data bit stream produced according to principles of the present invention also may be employed to control this type of digital image generation. For purposes of exposition, the invention will be described in connection with production of a data bit stream that controls a laser flying spot scanner for generating printed circuit board patterns for artwork masters or direct imaging. In such a system, as shown in FIG. 1, a beam generator 10, comprising one or more lasers and suitable beam splitting optics, providing mutually displaced or otherwise distinguishable write and reference beams 12, 14 which are both fed to a scanner such as a conventional rotating polygonal mirror 16. The two beams are scanned in synchronism, the laser across a write medium 18 and the reference beam across a beam position transducer 20, which produces a signal representing actual position of the write beam 12 in the course of each scan.

The laser is modulated by being passed through a modulator 22 that is controlled by binary data compiled by a laser scan control, generally indicated at 24, which receives beam position signals from the transducer 20. The modulator is of a conventional type that turns the write beam completely off for each data bit of one state (zero) and allows the beam to pass freely for each data bit of opposite state (one).

As the write beam is caused to scan the write medium, it is modulated by a series of control data bits fed to the modulator from the laser scan control. Assuming the 18 inch scan line of an 18 inch wide image, and a one mil scanning beam, for example, eighteen thousand data bits must be fed from the laser scan control to the modulator in the course of a single scan line. A 26 inch high image requires twenty six thousand scan lines. A complete scan line of data bits is assembled in the laser scan control at or prior to the initiation of each scan line and these data bits are shifted out to the modulator, bit by bit, for modulation of the write beam at each scan line element.

The assembled scan line data in the laser scan control is produced, scan line by scan line, from command data obtained from a host computer 26 or other device that contains storage 28 of scan line by scan line image data and storage 30 of pattern data. The image data and the pattern data are read from storage 28 and 30 into the laser scan control 24 which then processes the data to provide, in succession, each assembled scan line for control of the modulator 22. Because of data compression techniques to be described below, the amount of data required to be contained in image and pattern data storage 28 and 30 is considerably decreased, in some cases obtaining a compression ratio that may average about 2,000 to 1.

High data compression is achieved by grouping components of an image to be generated into different classes or categories. For example, in the highly stylized exemplary circuit portion illustrated in FIG. 2*a*, circuit board conductive leads (also called traces) are illustrated by elements 32, 33 and 34 which interconnect circuit board pads, variously illustrated at 35, 36 and 37. Leads 32, 33, 34 are generally of a simple orthogonal configuration. These, and some curved or inclined traces readily lend themselves to coding by 2D techniques. As previously mentioned, such techniques require descriptive data for a trace to identify only changes from previous scan lines. Once the digital sequence on a scan line has been defined for such a trace no additional information for the trace is required until a change occurs in its digital sequence on a subsequent scan line. However, irregularity of the patterns of pads 35, 36 and 37 may yield little advantage from such compression techniques and, thus, a different technique is employed to handle the pattern components of the overall image. Detailed data for each pattern is stored in a pattern library and scan line by scan line image data contains data merely identifying an individual pattern (as by pattern number, for example) and the address of only the start of such pattern. Detailed data defining each individual pattern is contained in the pattern data storage 30 and transferred into a pattern library of the laser scan control. The pattern data in the library contains a complete description, line by line, of all bits of all patterns of a selected image, but each pattern is included only once even though it may appear many times, at different locations, in the image.

The scan line by scan line image command data, accordingly, includes data defining the trace components of the image, defined with 2D compression, and also contains data that identifies a pattern and its location, but otherwise identifies no pattern details. Both trace data and pattern data are run length coded for still further data compression, as will be described below.

Pattern and Image Data Format

Pattern data, which may be referred to herein as Group II data, is handled in the following format:

FF 02 MM NN WW HH 1/0LL 1/0LL' 1/0LL"

---001E NN' HH' WW' 1/0LL 1/0LL' 1/0LL" ---001D

This format employs hexadecimal notation so that, for example, hexadecimal F represents decimal 15 or four successive ones in binary notation. The symbol FF is equivalent to a single byte of eight bits, all being ones. The symbol FF in Group II data is a heater indicating the beginning of the group. The next byte, 02, identifies the following data as Group II (pattern) data. The next byte, MM, represents hexadecimal characters that identify a library number. There may be as many as two hundred fifty-five Group II libraries, each of which may contain two hundred thirty-nine different patterns, in an exemplary system. Only one library number is employed in the present system for any one complete image. The library of patterns is employed to hold lines of bit data for patterns that may be used repeatedly during the processing involved in generating the image raster. The maximum size of each pattern is 255 by 255 mils in this exemplary embodiment, although patterns of larger size could be handled with other data formats. Bit pattern description is implemented by use of run length coding in which the most significant bit of the code defines whether the code represents a run of ones or of zeros and the remaining seven bits define the length of the run.

The next byte, NN, of the Group II format identifies a particular pattern, this byte being a unique pattern number. The next byte, WW, represents the pattern width, which is the number of bits along a scan line from the left-most column of a pattern to the right-most column of the pattern. Byte HH denotes the height of the pattern or, more specifically, the number of lines in the pattern. This is followed by the pattern data for the complete pattern.

Pattern data is defined by a series of run length codes. The 1/0 (there being alternatively a 1 or a 0 in the most significant position of the byte 1/0LL) determines whether the next series of bits of the Group II data, which are defined by the run length code LL, are all ones or all zeros. The series of run length codes continues along each line of the pattern and thence, without break, along each succeeding line until the end of a given pattern, the pattern end being identified by the pattern separator bytes 001E. Group II data format then identifies the next pattern in the particular pattern library as pattern number NN' and thereafter identifies its width and height WW' HH' and then the run length codes LL that completely define the pattern. Group II data continues with similar identifications of additional patterns until all patterns of the particular library for a given image have been identified and then terminates with a Group II terminating symbol of two bytes 001D. The Group II header FF02 is not repeated for any subsequent patterns in one library.

Illustrated in FIG. 3*a* is an exemplary pattern. The adjoining FIG. 3*b* shows the nature of the run length coding of the pattern of FIG. 3*a*. The pattern is contained in an imaginary rectangle having vertical and horizontal boundaries that are tangent to or otherwise just touch the outermost, uppermost and lowermost limits of the pattern. The run length coding for each line of pattern data is defined starting from the left-most margin of the pattern boundary and continuing to the right-most margin. Further, as will be more specifically explained below, the image data which identifies a particular pattern by number will also identify the position of the pattern on the scan line by the the column address of the upper left-hand corner of the imaginary boundary circumscribing the pattern. The pattern boundary is shown in dotted lines in FIG. 3*a*. The column address of the upper left-hand corner 40 of the pattern is the position called out in the image data for location of the pattern. The exemplary pattern shown in FIG. 3*a* has a width of eight bits and a height of nine lines, each line being a succeeding scan line of the laser raster. In FIG. 3*a* the X's represent ones and the blank spaces represent zeros. Shown in FIG. 3*b* is the run length coding for each of the pattern lines, each run length code being shown in this figure as a zero or one separated by a slash from a decimal number representing the total number of the run length. Decimal run length code is employed in FIG. 3*b* solely for exposition. The run length code is actually handled in binary form within the scan control. In line 1 of this pattern the first two bits, starting from the left boundary, are zeros and thus, there is a run length code of 2 in FIG. 3*b* preceded by a 0. The next four bits are ones and thus, the run length code is indicated as 1/4. The last two bits are zeros, indicated by 0/2. In line four, for example, the first three bits are ones, indicated by 1/3, the next two bits being zero, indicated by 0/2, and the next three bits are ones indicated by 1/3.

FIG. 3*c* illustrates run length codes for lines 1 and 2 for the pattern of FIG. 3*a* in their binary form, as stored within the pattern library (to be described below). In the pattern library there is no need to include a run of zeros that reaches to the right-most boundary of the pattern since the system is implemented, as will be explained below, by clearing the pattern work buffer (setting all bits to zero) prior to inserting pattern data for a given scan line. However, as each line of pattern data is entered into the pattern library, a null byte, 00, is inserted at the end of each line to signal completion of a single data line of a pattern. The last line in a pattern is terminated by two null bytes, 00 00. The inserted null byte is shown in FIG. 3*c*, but is not present in the Group II data. In line 1 of FIG. 3*c* there are two run length codes. The first one has its most significant byte equal to zero, indicating that this is a run of zeros, and the next seven bits show a binary 2, indicating run length of 2.

The next byte has a one in the most significant bit, indicating a run of ones and the next seven bits of this second byte read binary four to indicate the run length of ones. These are followed by a null byte (eight zeros, to denote end of line). Similarly, the first byte in line 2 shows a run of a single zero. The second byte shows a run of six ones. Obviously, for runs of this short length, the run length coding is a data expansion rather than compression, but these values are used solely for purposes of exposition since the run length can code a length of up to one hundred twenty-seven bits. Greater run lengths may be handled by using two successive run length codes or by using a five-byte run length code as will be described below in connection with the line-by-line or Group III image data. More efficient ways of using run length codes for short runs are known, and may be used if desired.

The image or scan line by scan line (Group III data) format is as follows:

FF 03 KK FO YY YY 1 XX XX

NN 0XX XX 1/0LL 0XX XX' 1/0LL' 0 XX XX" 1/0LL"

--F0 YY' YY' 0 XX XX 00 1/0LL LL 0 XX XX' 1/0LL' 0 XX XX" 1/0LL" --001C

Bytes FF 03 are the header, identifying the following data as Group III data. KK is the designation of the individual printed circuit board layer for which the following line-by-line data defines the image. F0 YY YY is the scan line number, after which sequentially follows pattern and trace calls or commands. In the exemplary format shown, the first call or command is a pattern call that follows line number F0 YY YY, and is indicated by 1 XX XX NN, wherein the 1 indicates that the call is a pattern call, the 1 being the most significant bit of the byte 1 XX. The XX XX comprises a fifteen bit column address that identifies the horizontal position along the scan line of the left-hand boundary (actually the upper left-hand corner) of this pattern. NN designates the pattern number which, accordingly, uniquely identifies one of the patterns of the library such as, for example, one of patterns 35, 36 or 37, of FIG. 2*a*. There may be other pattern calls following the first pattern call, or a trace command such as that indicated at 0 XX XX 1/0LL may follow. In this trace call, the zero, which is the most significant bit of the byte 0 XX identifies the call as a trace call and distinguishes from a pattern call which has a one in its most significant bit. The next fifteen bits XX XX identify the column address, which is the horizontal position of the bit at which the following run length code begins. The 1 or 0 indicates whether the run is a run of ones or zeros and LL comprise seven bits that designate the length of the run. A zero in MSB of RLC indicates end of trace (run of zeros). For any single scan line the line-by-line data may include a number of pattern calls and a number of trace calls, until all commanded data for a given scan line has been designated. Only a single pattern call and a single trace call are shown in the above exemplary format. Then the line-by-line data will signify the beginning of the next line by the next scan line number F0 YY' YY' which will, in turn, be followed by a series of either pattern or trace calls, or both. Where a run length code is greater than one hundred twenty-seven a five byte run length code (0 XX XX 00 0/1LL LL) is employed, (following line number F0 YY' YY' in the exemplary format stated above). In this case, the most significant bit 0 of the first byte indicates a run of zeros. The next fifteen bits XX XX again designate the column address of the start of this run length code. The address is followed by a null byte 00 indicating that the next two (instead of just one) bytes are employed for the longer run length code, which itself is designated by a one or zero in the most significant bit of its first byte followed by fifteen bits (LL LL) to designate the length of the run. The end of all of the Group III data for a given image is designated by the Group III data terminator bytes 00 1C.

Image Definition

The image-by-image scan line data starts in the upper left-hand corner of the image and proceeds horizontally across the 18 inch width of the exemplary image in steps corresponding to 0.001" increments, to a maximum of 18,000. The scanning process is repeated until the last scan line, which is scan line number 24,000 (for a 24 inch long image). As mentioned above, any one or more patterns of the library of 255 patterns, as well as various traces, may be commanded in the data of a Group III data sequence. For each occurrence of a pattern in the image it is called in the Group III data only once (although any pattern may appear at many locations and patterns may be overlaid at the same address) and this call or command specifies the location of the upper left-hand corner of the pattern boundaries and the pattern number. Thus, when pattern number NN is called in the Group III format as illustrated above, it is called in the scan line on which it first appears, by its pattern number NN and the column address of its upper left-hand corner. No further reference to this pattern is made in any Group III line-by-line data unless and until this very same pattern is to be printed again (at another location) and thus is called out on subsequent scan line (or the same scan line) which identifies the column address of the upper left-hand corner of this pattern on the new scan line (or the different column address in the same scan line).

As previously mentioned, trace data defines each line in terms of the previous scan line. If no changes occur on a line, no trace is called. If a trace is called it is located by the column address of its upper left-hand corner and the length horizontally to its upper right-hand corner. The length (set forth as a run length code) has its most significant bit set to 1, indicating the start of a solid. Trace data also defines the lower edge (termination of the trace) by a similar run length code on the appropriate scan line, identifying the bottom left-hand corner column address and its horizontal length to the bottom right-hand corner.

Figure 2A:
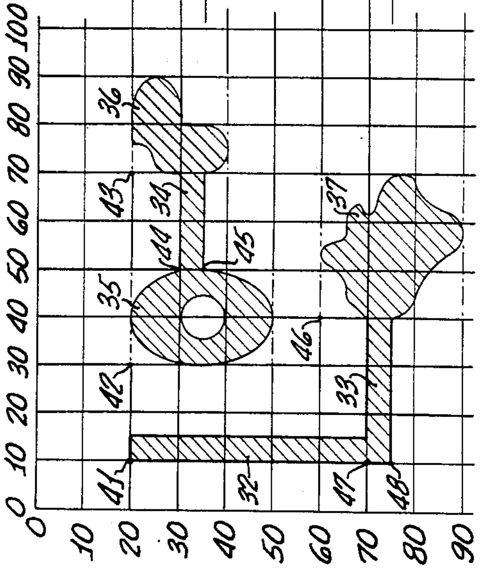
FIG. 2*a* illustrates an enlarged highly stylized and simplified section of a circuit board image to be generated.
Figure 2B:
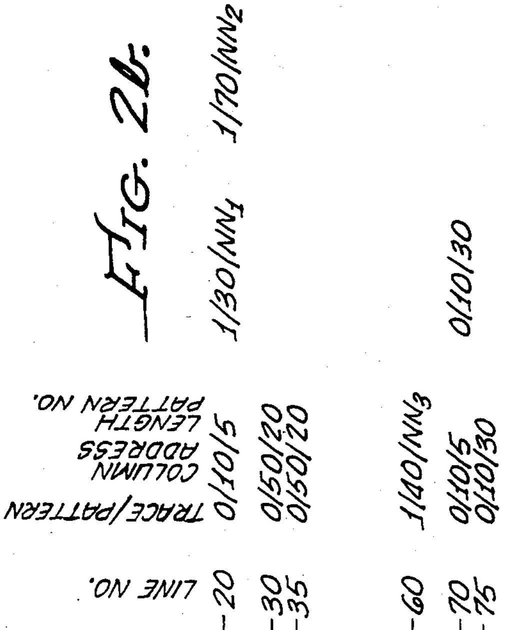
FIG. 2*b* depicts line-by-line image data for the image section of FIG 2*a;*

Referring again to the simplified exemplary image of FIG. 2*a*, an image is illustrated having neither trace nor pattern in the first 20 scan lines of which the numbers are indicated by the row of scan line numbers running vertically along the left side of the figure. Column addresses are indicated by the numbers running horizontally along the top of the figure. Scan line by scan line data for the image of FIG. 2*a* is shown in FIG. 2*b*, using decimal notation for purposes of exposition only. The first feature to be called out for this image is the trace 32. Thus, on scan line 20 there is a first data call at point 41 indicating the upper left-hand corner of trace 32 and this will be called out in the image data format described above as a zero followed by the column address of point 41, which is column 10, and the length of the trace, which is five bits. The five bit trace length will be encoded in a run length code having a one in its most significant bit, to indicate a run of ones, and having the next seven bits indicating the length of five bits of this run of ones. All bits are considered to be zero until set to a one. Therefore, the first ten zeros on line 20 and also the zeros on all of lines 0-19 need not be called out in the image data. The next feature on line 20 is pattern 35 and, accordingly, this pattern is called out next. The upper left-hand corner of its boundary, at point 42, is identified by column position. Thus, the second command in the line-by-line data of scan line 20 has a one in its most significant bit to designate a pattern call, followed by the column address (column 30) of the upper left-hand corner of the pattern boundary. This, in turn, is followed by the pattern number ($NN_1$) that uniquely identifies a pattern of the configuration of pattern 35. Continuing on scan line 20, the next feature to be called out is pattern 36. Again, this is called out by a one in the most significant bit of the pattern call followed by the column address (column 70) of the upper left-hand corner of the pattern, which in turn is followed by the pattern number, in this case $NN_2$.

No further data is called out in any of the line-by-line image data until line 30. At line 30, trace 34 (at point 44) is called out by a zero, indicating a trace command, a start address indicating column address 50 and a run length of twenty ones. The next data to be called out is data on line 35, since this is the end of trace 34. The code indicating the bottom of the trace starts with a zero to indicate a trace command followed by the column address of the lower trace boundary, point 45, which is at column address 50 in this case, followed by a run length code of zeros so as to turn off all of the bits for the full horizontal length of the trace, in this case, 20 zeros. The next line that has image data is line 60 which calls out point 46, the start of pattern 37, having a one to indicate a pattern call, a column address of 40 to indicate the position of the upper left-hand corner of the pattern and a pattern number $NN_3$ to designate this particular pattern. The next image data line in this image is line 70, indicating point 47, which is the end of trace 32. This calls out a trace identifying zero at column address 10 having a length of five zeros. Since trace 33 also starts at the point of termination of trace 32, line 70 also will call out the start of trace 33 by a zero having a column address of 10 and a run length of thirty ones. The final image line for this exemplary figure is line 75 which indicates point 48, the end of trace 33, calling out a zero for a trace call, a column address of 10 and a run length of thirty zeros, will the most significant bit of this last run length being zero to designate the trace end.

Reading Data Into Scan Control

Implementation of the laser scan control in a presently preferred exemplary embodiment is carried out by means of a Signetics 8X300 microcontroller having peripheral storage, input output controls and decoding, and auxiliary data transfer and data assembly hardware. Specific details of the processor controller input/output control and decoding are set forth in the Signetics 8X300 Design Guide of December, 1980, printed by Signetics Corporation and identified as DSPG Document No. 80-102.

Details of the manner in which data is transferred from the data source 26 to the laser scan control storage may be varied as deemed necessary or desirable. For purposes of the present invention it is only necessary that the specified data be present in the laser scan control storage so that it may be transferred to the several work buffers of the laser scan control as described below.

Figure 6:
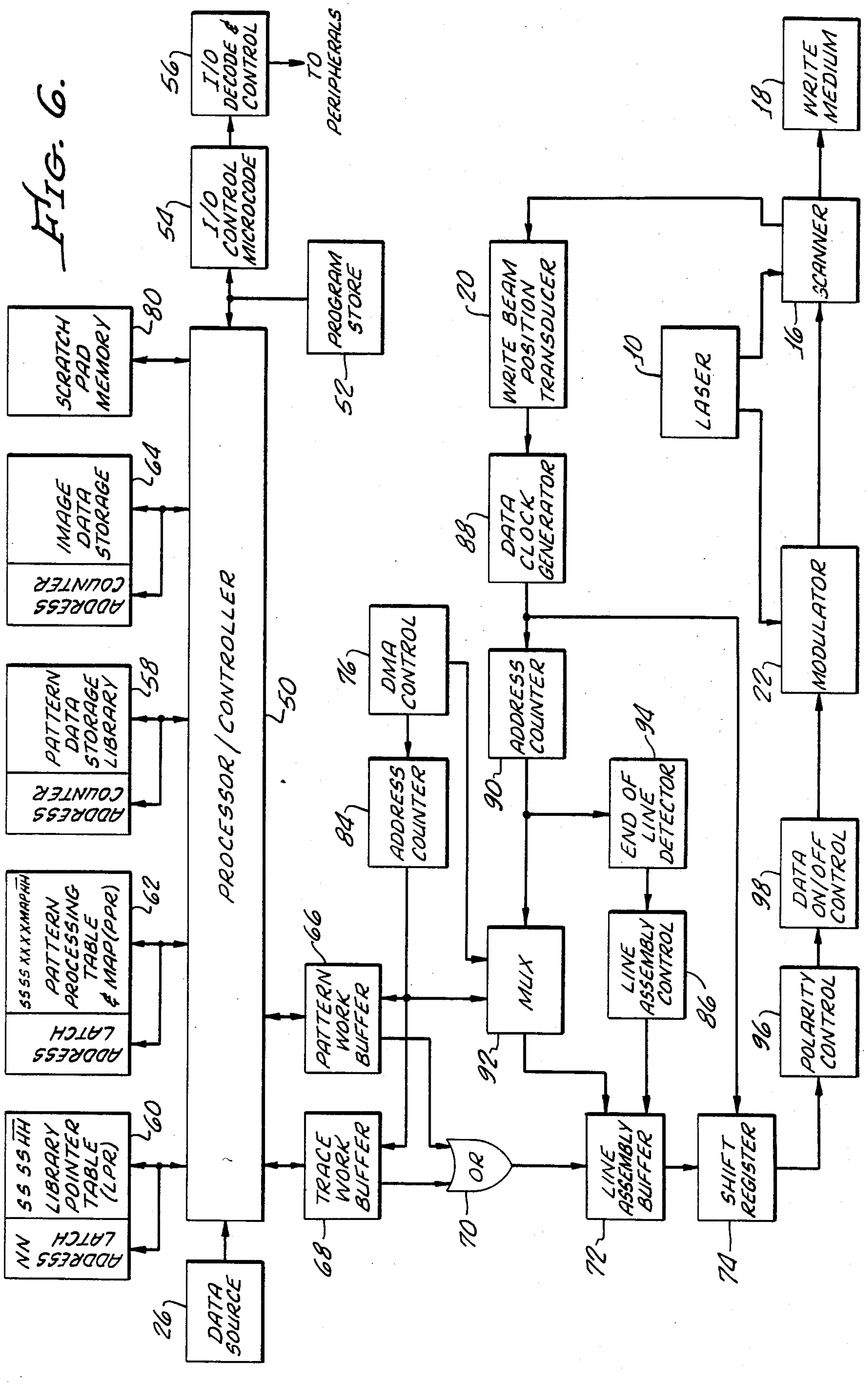
FIG. 6 is a block diagram of a scan control embodying principles of the present invention.

FIG. 6 is a block diagram of the laser scan control 24 of FIG. 1 and related storage and control. Data source 26 feeds data into the signetics processor/controller 50 under control of a microprocessor program 52, input/output control micrcodes 54 and decoding and controls 56 within the processor controller. Reading of data into the various memories involves techniques well known to those skilled in the art and details of these may be varied as deemed necessary or advisable.

Data defining various libraries of patterns, and data defining the scan line by scan line information for various images are compiled in the above-described Group II and Group III formats in storage 28, 30 (FIG. 1), which may be, for example, conventional floppy discs, tape storage, or the like. Initially, Group II data on the floppy disc is searched until the selected library number, byte MM of the Group II data, is found, whereupon all of the pattern data for this library is read from the floppy disc to be stored in a pattern data library RAM (random access memory) 58 of the processor. Data stored in the library RAM 58 are the run length codes of lines of each pattern of the selected library of Group II data. The data is stored at any unused location in the library RAM with the run length codes being positioned in sequence in successive lines or addresses of the memory, each of a group of successive memory lines corresponding to a line of the pattern. The library storage RAM may comprise, for example, a 4K by eight bit memory (four thousand lines of eight bits each) of the processor. In storage of the Group II data in the library RAM 58 the pattern width WW is employed by the processor to determine the end of each line of pattern data. Thus, the total lengths of a series of consecutive runs of the run length codes of the pattern data are added until the total of a group of consecutive codes equals but does not exceed the width WW. At the end of the last run length code of such group of consecutive codes a null byte 00 is inserted into the pattern library and the next run length code is then positioned at the next address of the library. Thus, for example, for the pattern of FIG. 3*a*, data inserted in the library is in the binary form as illustrated in FIG. 3*c* for the first two lines of the pattern. The null byte designating the end of a scan line for the individual pattern is to be used when processing the pattern data on a scan line by scan line basis. Alternatively the pattern data may be initially formatted (in pattern data storage 30) on a line-by-line basis, with the null byte denoting the end of each pattern data line and, if so, the width WW need not be included in the pattern command.

As the Group II data run length codes are read into the library RAM 58 a library pointer table is generated in a library pointer RAM (LPR) such as a 1K by twenty-four bit (one thousand lines of twenty four bits each) memory 60 of the processor. The first 254 lines of this RAM are used for the library pointer table. Other lines of this RAM may be used for temporary storage of other data as described below. The library pointer table is analagous to a table of contents of the pattern library, with certain data specific to each pattern listed therein.

Format of the data in the library pointer table 60 is shown in FIG. 4. In establishing the pointer table, the specific pattern number NN is employed as the pointer table memory address so that, for example, pattern number seven is inserted at address number seven of the memory, pattern number four, at address number four, pattern number 28 at address number 28 and so on. In the byte zero of the pointer table the two's complement of the height, $\overline{HH}$, of the pattern of the particular LPR address is inserted. In bytes one and two of the pointer table is stored the address (SS SS) in the pattern data library at which the pattern data (run length codes) of this particular pattern, NN, start. Of course the address may compise three or more bytes, if a greater amount of storage is used. Thus, after the Group II data has been read from the floppy disc storage into the library RAM, the library pointer table contains a list of all the patterns in the library. For each pattern the pointer table stores the complement of its length and the address within the pattern library at which the particular pattern starts.

After completion of the read out of all Group II data from the floppy disc storage 30, the floppy disc is searched for the appropriate Group III data, as identified by the byte, KK, which names the selected circuit board layer. Having identified the board, the following line-by-line image data is read out of the floppy disc storage into the image data storage, which may take the form of a 64K by eight bit random access memory 64 of the processor. When all of the Group III data from the floppy disc storage 28 has been read into the image data storage RAM, the initial storage is complete. Processing, expansion and assembly of scan line data for real time control of the laser modulator can begin at any time, upon operator command.

Scan Line Data Assembly

In general, to assemble data for the data stream that accomplishes line-by-line and bit-by-bit control of the image generating raster, the trace and pattern data are first separately assembled in trace and pattern work buffers, respectively. Contents of both work buffers are then transferred through logical OR circuitry to a line assembly buffer and thence to a shift register for control of the beam modulator. The image data is read on a line-by-line basis from the image data RAM 64. The image commands are inspected to determine whether the most significant bit is a one or a zero, a one indicating a pattern call or pattern command and a zero indicating a trace call. For each pattern call, pattern data is extracted from the pattern data storage and inserted into a pattern work buffer such as a 4K by eight bit random access memory 66. The pattern data is inserted into the pattern work buffer with the aid of a pattern processing table contained in a random access memory (PPR) 62. It will be recalled that image data contains a pattern call only when the pattern starts on the particular scan line. Thereafter, no further calls for such pattern are contained in the image data. The remainder of the detailed pattern data is processed on subsequent scan lines in conjunction with the pattern processing table or PPR 62, as will be described below. For each trace call the run length codes of the trace data are inserted into a 2D or trace work buffer, which may be a 4K by eight bit random access memory 68.

Thus, each of the work buffers 66 and 68 assembles data for its particular type of component of the image on any given line. Having completed the pre-assembly of trace data for a given line in buffer 68 and pattern data for the same line in buffer 66, the contents of the two buffers are transferred through OR circuitry 70 to one or a set of line assembly buffers 72. Preferably, the line assembly buffers include several identical buffers, as more particularly described below, so that as components of each line are preassembled in the work buffers, scan line data from the two work buffers may be inserted into a different one of the set of line assembly buffers. The latter accordingly can be filled ahead of the actual read out from the buffers 72. All work and line assembly buffers are individually large enough to assemble data for a complete scan line. The data is shifted from the buffers 72 to a shift register 74 from which the assembled line data is shifted out, bit by bit, for control of the laser modulator. Thus, it is from the shift register 74 that flows the stream of data bits that define the image raster, line by line and bit by bit.

As Group III data is read from the image data storage, each command on a given scan line is tested to determine whether it is a pattern call or a trace call. If a command (0 XX XX) identifies a trace, an appropriate change is made in the trace work buffer at its column address identified by the address bytes XX XX. Because traces are handled with the above-described trace data compression, there are no trace calls unless there is a change from a previous line, and no changes are made in the contents of the trace work buffer 68 unless and until there is a trace data call on a given line. Then, starting with the bit identified by the trace command column address, the succeeding number of bits equal to the length of the run length code are changed to ones or zeros, as the case may be, thereby expanding the trace run length code, within the trace work buffer, into bit-by-bit trace data for this particular line. Thus as each trace command appears on the image data being read from storage 64, it is expanded into the trace work buffer 68.

Alternatively, to improve system speed, the trace data, which identifies column address and run length code of the trace for a given line, may be temporarily stored in any suitable storage space such as, for example, unused portions of the LPR 60. Use of such temporary storage may require less time than the actual expansion of the data command into the trace work buffer. The temporary storage device, being a smaller memory, can have a shorter read out time than the read out time from the larger image data storage 64. The trace data can be extracted from the temporary storage and expanded into the trace work buffer 68 at a later portion of the operation as, for example, during the transfer of data from the line assembly buffers 72 to shift register 74.

Pattern Processing Table and Map (PPR)

In reading information from the image data storage RAM each trace command is processed into the trace work buffer (or temporarily stored for later transfer to the trace work buffer). Each pattern call, signifying the start of a new pattern on a given line, is entered into the pattern processing table and map (PPR) 62 but the associated pattern data in the pattern library RAM is not processed into the pattern work buffer at that time. The pattern processing table affords temporary storage for certain pattern identifying and locating data, for use during the processing of each individual pattern on each of its successive scan lines. On reading from the image data storage RAM only two operations are performed for a given scan line. First, the trace work buffer is changed as appropriate (or trace data temporarily stored), and second, the pattern processing table is updated as appropriate. After reading of image data for a complete scan line, active patterns identified in the pattern processing table are processed into the pattern work buffer from the pattern library RAM (and trace data, if temporarily stored, are transferred into the trace work buffer).

As previously stated, each pattern is called out in the scan line by scan line image data only once, and thereafter is processed or expanded into the pattern work buffer on a line-by-line basis. For each scan line, another line of pattern data of each previously called pattern must be processed. Processing of pattern line data is merely the transfer of each run of bits contained in a pattern data line of library RAM 58 into locations of the pattern work buffer, beginning with the designated work buffer column address XX XX. Accordingly, it is necessary to monitor and keep track of identity and status of those patterns (which may number up to 2,000 in an exemplary embodiment) that have been called on previously processed scan lines and are still being processed from the pattern library into the pattern work buffer. This monitoring is done with the aid of PPR 62. Each time a pattern is called by the line-by-line image data, pattern processing data is stored temporarily in the PPR so as to both identify the particular pattern and the status of its processing, that is, the number of lines of the particular pattern that have already been processed (or are yet to be processed).

The pattern processing table contains pattern identification data for all of those patterns that have been called but have not yet been completely processed. It also provides a map that identifies locations of empty lines in the PPR (for insertion of pattern data newly called) and active pattern data lines (to identify pattern data to be processed).

The pattern processing table and map 62 is a random access memory having 2,000 lines of 48 bits each. Each line is either empty or active. It is active if it contains pattern data and empty if it does not (although map bits are always present). Data in each active line comprises six bytes as illustrated in FIG. 5. The first byte (byte 0) of pattern identifying information on each active line initially contains the two's complement ($\overline{HH}$) of the number of lines in the pattern. Bytes 2 and 3 contain the start position of the pattern on a scan line, (e.g., the column address XX XX of the left-hand boundary of the pattern). The fifth and sixth bytes (bytes 4 and 5) contain the address SS SS of the starting point of the pattern in the pattern library RAM. The second byte of each line of pattern data in the PPR comprises a map that is formed in the course of inserting pattern data into the PPR, and in processing active patterns. A pattern is active if it has been called and all of its line data has not yet been transferred to the pattern work buffer for such call. The map provides information identifying the address of the next empty line for insertion of a new pattern call or the address of the next active line to be processed. The number of bits used for the map is a function of the size of PPR. Although an eight bit map will provide for 256 lines and is shown for purposes of exposition, it will be understood that use of additional bits for the map will increase the number of lines that may be used in the PPR.

Figure 7:
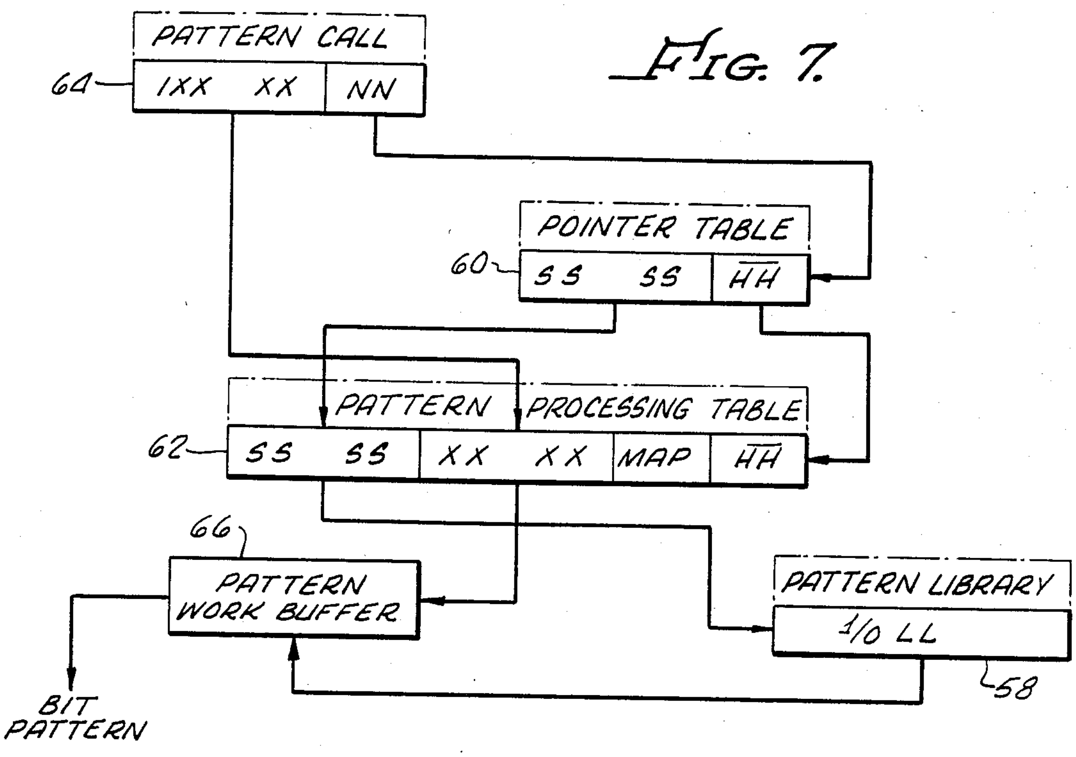
FIG. 7 depicts information flow among library pointer table, pattern processing table, pattern library and buffer.

In reading the scan line by scan line image data, the pattern processing table and map is updated upon each pattern call. Flow of data among library pointer table, pattern processing table, pattern library, and buffer is depicted in FIG. 7. The pattern number NN of a pattern call is used to enter the pointer table (in which the pattern number NN is the pointer table address) to obtain the pattern library start address SS SS. The start address SS SS from the pointer table and the column address XX XX from the pattern call are inserted into the appropriate bytes of the pattern processing table and map, in an empty line thereof determined by the map bits (as will be explained below). The map bits of such line are updated. Pattern height complement ($\overline{HH}$) is also entered into the pattern processing table from the pointer table. After reading a complete line of image data, and assuming all trace calls have been processed into trace work buffer 68, the processing of the pattern data for a given scan line into the pattern work buffer 66 commences.

The PPR contains data pertinent to each pattern that has been called on previous lines and which has not yet been completely expanded into the pattern work buffer. There may be as many as 2,000 active patterns listed on respective lines of the PPR, there may be none, or there may be any number, at any PPR location. Accordingly, the table is searched for the active pattern. For each active pattern in the PPR the pattern library start address, SS SS, in the PPR is used to enter the pattern library 58 to extract one scan line of data of that particular pattern. The pattern library RAM start address SS SS (as contained in the PPR) is updated so that on the next scan line the next line of such pattern will be extracted from library RAM 58. Further, upon the processing of each line in the PPR, the pattern height complement $\overline{HH}$ is incremented, in the PPR (but not in the pointer table). Therefore, when all lines of a given pattern have been processed, this complement will read zero and the PPR line then will be empty or clear. The run length codes 1/0LL of the pattern line at address SS SS of the library RAM are expanded into the pattern work buffer, beginning at the column address XX XX contained in the PPR.

Each line of pattern identifying data of the PPR is inserted therein when a pattern is first called in data read from the image data storage RAM 64. The pattern column address data (XX XX) remains in the PPR, unchanged during the complete processing of the full number of lines occupied by the height of the pattern, but the first cycle, $\overline{HH}$, and the pattern line start address in the library, SS SS, are incremented or updated for each scan line. Because different lines in the PPR become empty on different scan lines, and because other patterns are called at various scan lines, pattern data will be inserted into the PPR in a random fashion, in an order that is not predetermined. Therefore it becomes necessary, upon occurrence of a pattern call, to search the PPR for an empty line for insertion of the new pattern call. Similarly, in going through the PPR to process the information into the pattern work buffer, it is necessary to find those lines that contain active patterns. To search through all 2,000 lines of the PPR each time a pattern is called or processed requires an excessive amount of time. To decrease this searching time the map bits are provided. Details and some examples of use of the map bits, including the related empty and active line pointers, will be described below in connection with FIGS. 8*a*–8*h*.

In addition to the map provided in the PPR, an empty line pointer is provided in a scratch pad memory 80 (FIG. 6). This pointer always identifies the address of the last line of the PPR to have become empty. The map bits of such last empty line, in turn, always identify the next empty line. Similarly, a last active line pointer is provided (also in the scratch pad memory) that identifies the address of the last active line (the last line into which pattern data was inserted or the last line that was processed upon completion of processing for a scan line). The map of each such active line identifies the address of the previous active line (e.g. the last previous line into which pattern data was inserted or in which the pattern data was processed). Each line that is "previous" when going through the table in one direction is the "next" line when going through the table in the opposite direction. Therefore, in going through in opposite directions each time, the trail of "previous" lines becomes a map of "next" lines. The trail from one set of map bits to the next is contained in the PPR map bits (byte 1). The PPR is entered at the line address designated by the active line pointer, which always contains the line address of the last line into which data had been added, or in which the data had been processed. Thus, the active pointer is consulted to locate the beginning of the trail of active line map bits. Similarly, the trail from one empty line to the next is contained in map bits of the empty lines. This "empty" trail is entered at the line designated by the empty line pointer, which always contains the line address of the last line which has become empty (the next empty line when initially filling the table). Thus the empty line pointer is consulted to locate the beginning of the trail of empty line map bits.

When the pattern of a given line of the PPR has been completed (e.g., when it has been processed through the pattern work buffer for the requisite number of scan lines) the line becomes empty, the address of this newly empty line (the last line to become empty) is entered into the empty line pointer in scratch pad, and the map of this last empty line is changed to the address of the next empty line, which is the address previously contained in the empty line pointer. Thus, when a line becomes empty, such line becomes the last empty line, and its map bits are changed to designate the line address of the "next" empty line, which is the line that had previously been the last empty line.

The pattern processing table and map is initialized as in FIG. 8*a*. In FIGS. 8*a*–8*h*, which diagrammatically illustrate operation of the pattern processing table, only a portion of the table is shown. Some of the table line addresses are indicated on the left-hand side of the figure.

The PPR is initialized by inserting into the map position of each line the address of the next line which, at this time (with all lines empty), represents the next empty line. Thus, line 00 contains the address 01 in its map location, line 01 contains the address 02, etc. Decimal notation of map addresses is used for convenience of exposition in these figures.

Assume data is being extracted from the image data storage RAM and contains a pattern call, 1 XX XX NN. The column address XX XX is entered into bytes (locations) two and three of PPR line 00. The pattern number NN is used to extract the data SS SS and $\overline{HH}$ which are inserted into the appropriate bytes of this line. In these figures a horizontal line in a byte position indicates the presence of data and the absence of such line denotes an empty byte. Upon entering the pattern information into line 00, the map bits of this line are entered into scratch pad memory as the "next empty line" pointer, or empty pointer, which, accordingly, then contains the address 01, the next line of the table that is empty.

In these figures, an address with a horizontal line through it indicates the state of the map or scratch pad pointer at the start of an operation in a given line of the PPR and the adjacent address without a line through it indicates the data at the completion of an operation on the given table line. Thus, the data is shown both before and after a change. In FIG. 8*b* the map position indicates that upon entry of pattern data into line 01 the map bits were changed from 02 to 00, the active line pointer indicates that the contents of this scratch pad memory were changed from 00 to 01 and the empty line pointer indicates that the contents of this memory was changed from 01 to 02.

Assuming a second pattern call occurs in the image data of a given scan line, the "next empty line" pointer 01 in the scratch pad memory identifies the address of the line into which this pattern information is to be inserted. The information is then inserted into line 01, as in FIG. 8*b*, and the map of this line is modified (changed from 02 to 00) so as to leave a trail that points to the previous address in which a pattern had been entered. Thus as a line is filled, its "next empty line" map bits are changed to become a last active line trail. Since line 00 is the first line employed, the "last active line" pointer or active pointer, which initially contained 00, is not changed upon insertion of pattern data into line 00. Upon insertion of data into line 01, the map bits of this line are changed to read the address, 00, contained in the last active line pointer and the active pointer is changed to 01, as indicated at the side of FIG. 8*b*. The map bits thus form a trail pointing to the line that had been previously activated. Line 01 is now active and the address 02 that it originally contained, pointing to the next empty line, is moved to the empty line pointer as indicated at the side of FIG 8*b*.

Upon occurrence of a third pattern call the empty line pointer identifies line 02 into which this pattern information is entered. The address 01 of the last active line pointer is inserted into the line 02 map bits and the address 03 originally contained in the map of line 02, indicating the next empty line, is inserted into the empty line pointer scratch pad memory. The status of the table and pointers upon entry of the third pattern call is indicated in FIG. 8*c*.

Upon occurrence of a fourth pattern call (FIG. 8*d*) the empty pointer address 03 is employed to locate the address for entry of the data of such next pattern, the map position of this newly entered line is changed to represent the address of the last active line pointer, address 02, and the address of the next empty line, address 04, initially in the map of line 03, is inserted into the empty line pointer. This operation continues until the end of a scan line occurs in the image data storage being read from the image data storage RAM 64. Each time a pattern call occurs on this scan line the next empty line pointer is consulted to identify the line into which the new pattern call is inserted, the empty line pointer and last active line pointer are updated and the map is updated to leave a trail of previous active lines and next empty lines.

After reading of a full scan line from the image data storage, all trace data has been inserted into the trace work buffer (or stored temporarily) and the PPR has been updated. No changes have yet been made in the pattern work buffer. Now the pattern processing table is entered for processing of the identified active pattern data (inserting a line of pattern data, for each active pattern, into the pattern work buffer). It is necessary to find those lines having an active pattern, and to do so without consulting each line of the table. Each successive processing operation is in the direction opposite the direction of the preceding processing. This bidirectional operation in the pattern processing table, namely reversing the direction of the processing through the table (from top or low numbered lines to the bottom or higher numbered lines, first, and then from higher numbered lines toward lower numbered lines and then again in the first direction) when processing active patterns from the table into the work buffer is derived from the mapping concept. In going from top to bottom a trail is left (in the map bits) identifying the immediately previous active line in which a pattern had last been inserted or in which a pattern had been processed. In going from bottom to top that trail becomes a map pointing to the next location of an active line in this reverse direction of processing. The direction of processing through the table is controlled by the map bits each line of which points to the next active or empty line. The point of entry into the map or trail is designated by the active and empty pointers.

Figure 8:
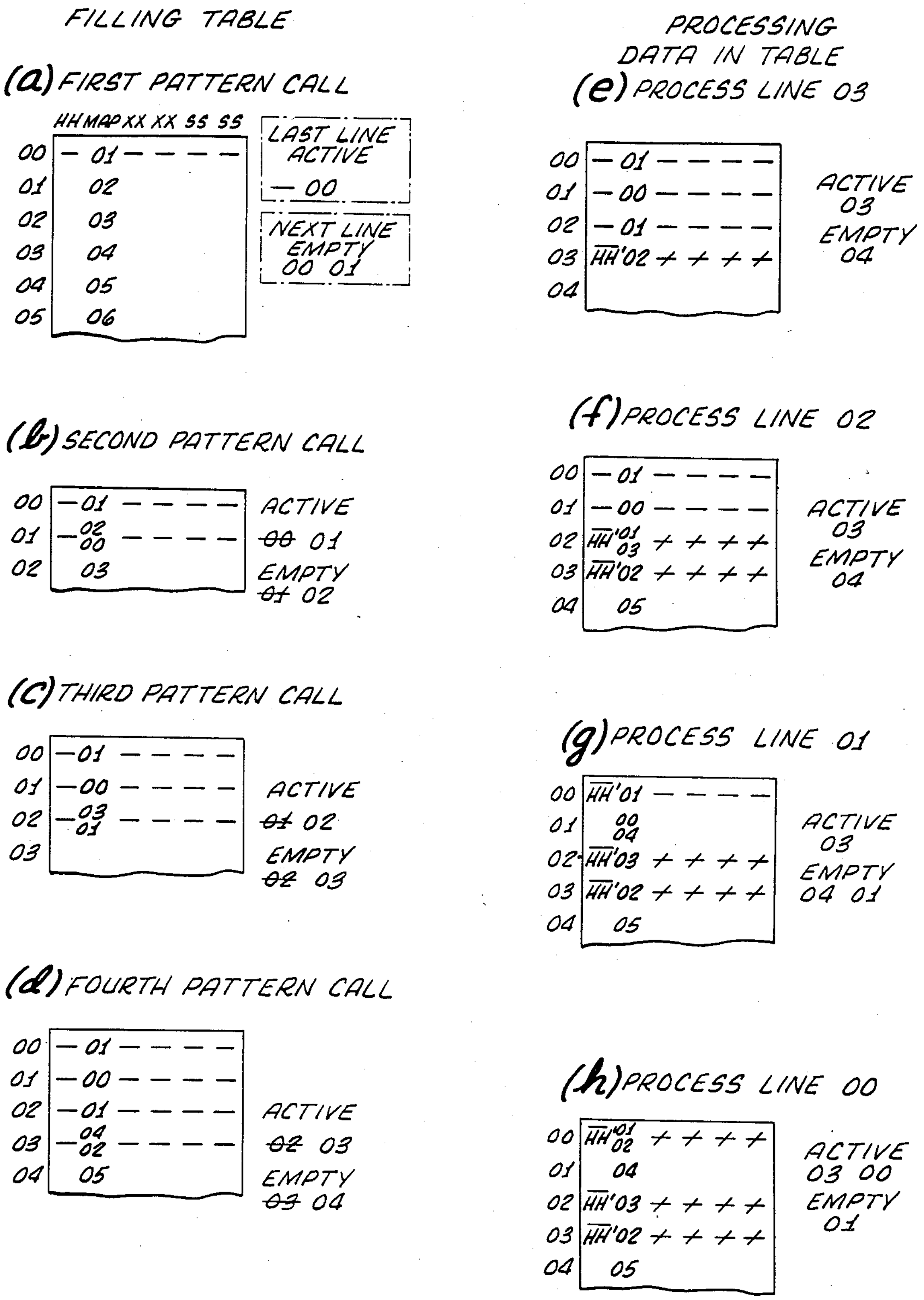
FIGS. 8*a*–8*h* illustrate steps in the use of the pattern processing table and map.

Assume that the scan contains only the four pattern calls just discussed, that the PPR has been updated from data read from image data storage, and that the active patterns are now to be processed into the pattern work buffer. Processing of the PPR data is started by consulting the last active line pointer, which points to line 03 in the example (FIG. 8*e*). The HH complement is incremented (shown as $\overline{HH}'$) since one line of this pattern is being processed. The pattern library RAM address SS SS is employed to enter the pattern data library to extract the pattern data information (in run length coding) and this code is used to set the designated number of bits in the pattern work buffer at the appropriate word and bit position identified by the XX XX (column address) of the PPR. The fact that the data in line 03 has been processed is indicated (solely for purposes of exposition) in FIG. 8(*e*) by the crosses in the several bytes of this line and the $\overline{HH}'$. Neither the empty line pointer nor the active line pointer need be changed upon processing the first pattern unless, as will be described below, the incrementing of $\overline{HH}$ indicates that this particular pattern is now completed and the line has been emptied.

The map address 02 of the line (03) that has just been processed identifies the next active line. Thus, the information in line 02 of the PPR is processed next into the pattern work buffer and this processing of active lines continues, employing the map address of each line being processed to identify the address of the next line to be processed. In processing lines of the PPR, only map bits are changed to form the trail, but no change is made in the active line pointer until the processing in one direction is completed. The address of the last line processed is then entered into the active line pointer. Thus, for example, if line 00 is the last line processed when going from bottom to top, the last active line pointer is changed to 00 (FIG. 8*h*) so that it will point to the start of the trail for the next sequence of pattern processing.

The updating of the PPR (entering new pattern calls in empty lines) is independent of the processing. For each scan line the table is entered for updating by consulting the empty line pointer to find the start of the empty trail, and then the empty lines trail in the map bits is followed, shifting map bits of each empty line, as such line is filled, to the next empty line pointer. When an empty line is made active during the updating, such line becomes the last active line. Its address is entered in the active line pointer and its map bits are changed to read the address previously in the active line pointer.

FIG. 8(*f*) represents the PPR after the processing of line 02 into the pattern work buffer. Upon completion of processing of line 02, its map address, which had been 01, is changed to indicate the previous last active line, 03.

Upon processing of line 02, its map had pointed to the next line to be processed, and this line, 01, is processed next. Assume the processing of line 01, as indicated in FIG. 8*g*, empties this line (this being the last scan line of the pattern, designated on PPR line 01) line 01 becomes the last empty line and its address is then inserted into the last empty line pointer storage. Now the next empty line is the line that had previously been in the empty line pointer, namely line 04, and this address is inserted into the map bits of line 01. No change is made in the active line pointer storage at this time.

In processing data in the PPR, the map bits of the line which had previously been made a trail of active lines becomes a map. Moreover, as the PPR is next traversed from bottom to top, a trail is left in the same manner that the trail was made in going from top to bottom. That is, the map bits of each line processed are modified to indicate the address of the line previously processed. Thus, the map bits of line 01 (FIG. 8(*g*)) identify line 00 as the next active line. This line is then processed (FIG. 8*h*), changing its map to the address of the last active line, 02 (since line 01 is no longer active), and the active pointer is changed to 00, because line 00 was the last line processed.

Regardless of the sequence or locations of empty lines and active lines in the PPR, it is not necessary to test each line to find a desired line. The empty line pointer always identifies the address of the next empty line and the active line pointer always identifies the address of the last active line. The map bits of each active and empty line provide the desired trail, namely, the location of the previous active or the next empty line.

Thus it will be seen that the PPR contains a list of all patterns in the library, with the library start address of each. The PPR keeps a running account of those patterns that have been called, but not yet completed, containing (a) the number of pattern lines yet to be written, (b) the column address, and (c) the current pattern line start address (updated address SS SS) of the pattern in the library.

Pattern Data Processing

Pattern data for the given scan line is processed by expanding the coded data (from a line of pattern data in the library RAM) into the pattern work buffer in a manner similar to the expansion of the trace data into the trace work buffer, but with one significant distinction. Unlike the trace work buffer, which is changed only upon the occurrence of a trace command on a given scan line, the pattern work buffer is cleared after the data for each scan line has been transferred out to the line assembly buffers. This facilitates expansion of the data into the pattern work buffer since only ones need be set. No change need be made where zeros are called for, other than to keep track of the column address. Inserting bit data into the work buffers may be performed by any one of a number of known techniques. For example, data from the buffers may be shifted out in sequence, bit by bit, bits at selected locations may be modified as determined by column address and run length, and all recirculated back into the buffer.

Figure 11:
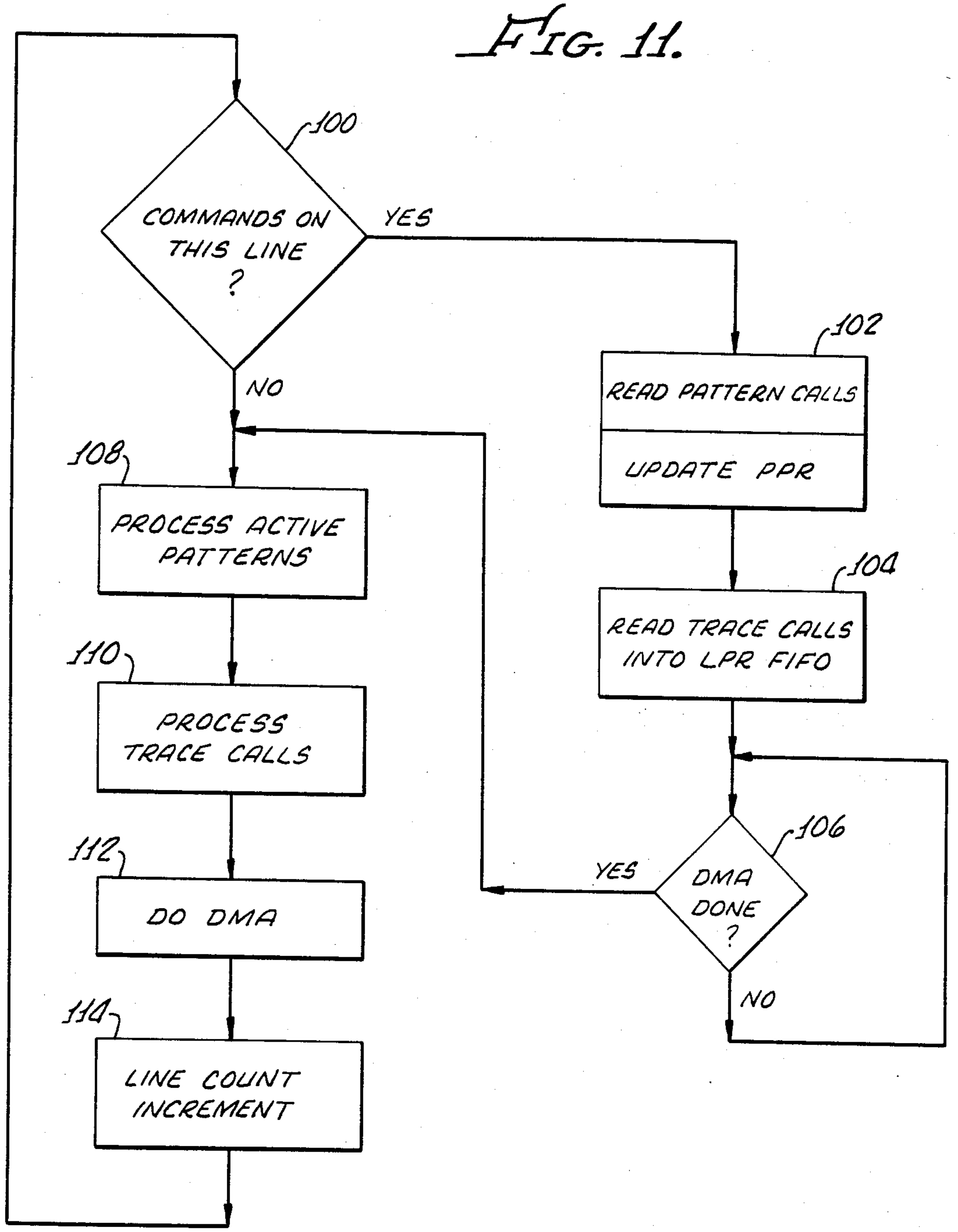
FIG. 11 is a broad flow chart that describes transfer of data to work buffers.

Other well known techniques, including bit masks and look up tables may be employed under control of the microprocessor. For increased speed, each buffer may have appropriate hardware under control of its own program (PROM) to perform the insertion of data into the buffer. In expansion of pattern data from the pattern data library into the pattern work buffer the operation is performed on a byte-by-byte basis. Thus, going into the pattern library RAM 58 the first byte at the designated address is extracted and, beginning with the column address identified by XX XX, the appropriate bits of the pattern work buffer are set for the particular run length code. Then the next bytes of the library RAM pattern data are similarly handled until the null byte 00 occurs, indicating an end of the pattern line (or no further ones to be set in the pattern) in the library RAM. An address pointer in the form of a temporary address in an auxiliary or scratch pad memory may be employed to keep track of the buffer column address of each byte that is expanded into the work buffer. Thus, to the initial column address XX XX of the particular pattern is added the length of each run length code so as to generate the address of the bit position where the next run length code starts. For a run length code of zeros no bits need be set, but the scratch pad memory adds the length of the run length code of zeros to the prior accumulated column address so as to define the bit position for the next run length code. Steps in the reading and processing of image commands and data are more specifically defined in the accompanying flow charts (FIGS. 11 and 12).

Having employed the PPR 62 to identify an active pattern and having extracted all of the line data of such pattern from the pattern library RAM and expanded it into the pattern work buffer, the address SS SS in the PPR is updated so that for the next scan line the next line of pattern data of such particular pattern in the pattern library will be employed.

Assembly of Work Buffer Data

Upon complete assembly of all bits for a given scan line in the two separate work buffers, (the trace work buffer holding all scan line data for one class of image component and the pattern work buffer holding all scan line data for the other class of component), data for a complete line, including both trace pattern components, may now be assembled. Accordingly, the contents of the two work buffers 66 and 68 are transferred through the OR circuitry 70 to the line assembly buffer 72.

Use of two separate work buffers, contents of either or both of which are transferred to the line assembly buffer to provide complete bit data for a single scan line, has a number of advantages. Traces and patterns can be electronically overlaid, one atop the other. This is so because bit data for the trace component of a given scan line can include bits in the same bit position of such scan line as bits of one or more patterns on that same line. Because the pattern work buffer is cleared after each line, data for overlaid or overlapping patterns themselves may be inserted into two or more separate work buffers. Such data can not only be overlaid (additively combined) but also may be subtractively combined, as described in connection with FIG. 13. Thus, for example, a hole of the configuration of one pattern may be positioned within a part of a second pattern. The subtractive combination effectively removes one pattern (image component) from another.

Figure 9:
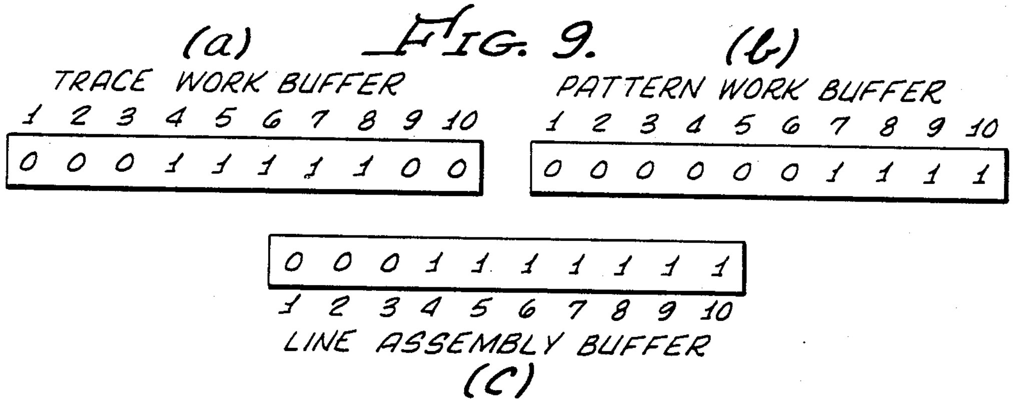
FIGS. 9*a*–9*c* illustrate transfer of data to a line assembly buffer from the trace work buffer and pattern work buffer.

A simplified example of pattern and trace overlaying (additive combination) is illustrated in FIG. 9*a*, 9*b* and 9*c* wherein FIG. 9*a* shows ten bit positions of a scan line contained in the trace work buffer. FIG. 9*b* shows the same ten scan line positions contained in the pattern work buffer and FIG. 9*c* shows the contents of the trace and pattern work buffers of FIGS. 9*a* and 9*b* after they have been transferred through the OR circuitry into the line assembly buffer. Where the bit position of both trace and pattern work buffers is zero, the corresponding bit position of the line assembly buffer is zero. Where the bit position of both trace and pattern work buffer is one, the corresponding bit position of the line assembly buffer is one. Where either the bit position of the trace buffer or the same bit position of the pattern work buffer is one, the corresponding bit position of the line assembly buffer is one.

Using two different work buffers allows use of the 2D compression technique for traces and also allows a preclearing for the pattern work buffer. Thus each of the two image components may be optimally handled without compromising the handling of the other. The 2D technique requires that the buffer retain data from previous lines on which no data changes have occurred. However, the completely independent and separate pattern work buffer is precleared for each line, so that the bit pattern for a pattern line in the pattern library may be completely independent of previously processed lines. This preclearing of the pattern work buffer allows higher speed processing because only ones, but not zeros, need be set when expanding data into the work buffer. Further, if deemed necessary or desirable, to further increase speed, separate microprocessor controllers, one for each of the work buffers, may be employed. Using the independent pattern work buffer, each pattern call is independent of each other pattern call. Accordingly, where a scan line includes a number of pattern calls, nonsequential processing of pattern calls (scan lines) may be employed, thus permitting use of multiple processors for increased speed. Such an arrangement is not practical for handling traces because each line must be constructed in sequence before changes can be applied to construct a subsequent trace scan line.

Figure 10:
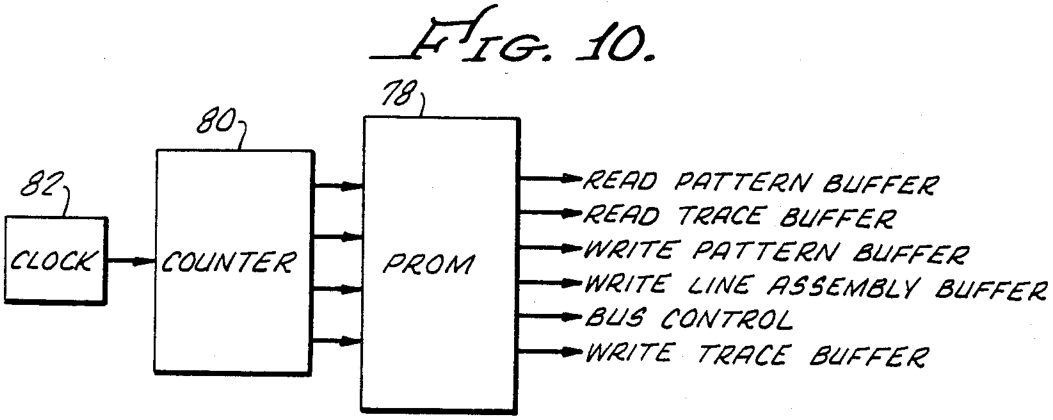
FIG. 10 is a block diagram of the DMA control.

Transfer of assembled data from the work buffers to the line assembly buffers is governed by direct memory access (DMA) control 76. Use of DMA control allows this transfer to be performed without going through the processor 50 and thus increases system speed. The DMA control, as shown in FIG. 10 is essentially a state machine that provides a set of sequential eight bit control signals from a programmable memory 78 that is triggered by the outputs of a counter 80 in response to a DMA clock 82.

Upon completion of expansion of trace and pattern data for a given scan line into the work buffers, the DMA control increments an address counter 84 which addresses both work buffers 66, 68 and the line assembly buffer 72. Where several line assembly buffers are employed, the transfer of data from the work buffers is into one of buffers 72 that has been selected by a line assembly buffer control 86. In an exemplary embodiment, transfer of data from the work buffers to the line assembly buffers is performed thirty-two bits at a time and the address counter 84 thus identifies buffer locations from which and to which this transfer takes place.

Write beam position transducer 20 triggers a data clock generator 88 which provides clock pulses synchronized with the write beam position. Pulses from the clock generator 88 increment a second address counter 90 which divides the clock pulses by thirty-two and provides a new address for each thirty-two clock pulses. An end of line detector 94 keeps track of the address counted by counter 90 to signal the end of a scan line and cause the line assembly control 86 to select the next one of the group of line assembly buffers 72 to be read out to shift register 74. Obviously, only a single line assembly buffer need be employed and the control 86 may be eliminated. In such a case the data from the work buffers would be transferred to the single assembly buffer and, only after this transfer is complete, the data may be transferred from the assembly buffer to the shift register. However, the number of patterns called will vary from line to line. Commonly, a single scan line may include a large number of pattern calls and immediately succeeding lines may include fewer or none. The PPR must be modified for each pattern call. Similarly, expansion into the trace work buffer occurs at the beginning of each trace, where the image line data changes from a previous image line. However, for vertical and horizontal traces in particular, there may be a number of lines in which no changes need to be made in the trace work buffer. Accordingly, the time required for filling the work buffers will vary from line to line. To accommodate this variation, and to increase processing speed, a number of identical line assembly buffers (four, for example) may be provided. These are filled with successive scan lines, working, for example, three lines ahead of the line that is being transferred to the shift register and shifted out to modulate the beam. Thus, for those lines having few pattern calls or less change in the trace work buffer, assembly in the work buffers is completed in a relatively short period and the assembled data may be quickly transferred into one of the line assembly buffers so that several of the line assembly buffers may be filled with successive lines relatively rapidly. Upon occurrence of a line requiring a relatively longer time for processing, data from one or more of the previously filled line assembly buffers can be shifted out to the shift register and thence to the laser modulator while the PPR is being updated and the work buffers are being filled, thereby providing a more smoothly continuous and faster flow of data to the shift register and modulator.

During transfer from the work buffers to the line assembly buffers, bit position of both work buffers and the line assembly buffers is under control of the address counter 84. However, bit position of data to be transferred from the line assembly buffer to the shift register 74, is controlled by the write beam position and thus is under control of the data clock generator 88 and address counter 90. Accordingly, the line assembly buffers 72 are arranged to be alternately addressed by both address counter 84 (for transfer of data from the work buffers) and address counter 90, (for transfer of data to the shift register 74). The alternative addresses are fed to the line assembly buffers via a multiplexer 92 under control of the DMA control 76. The latter operates the multiplexer to address the line assembly buffers 72 from address counter 84 for transfer of data from the work buffers and from address counter 90 transfer of data from the line assembly buffers to the shift register.

When using multiple line assembly buffers each buffer is loaded in sequence with successive scan lines from the work buffers. Similarly, in reading out from the line assembly buffers each is read out to the shift register one after the other. After a first one of the line assembly buffers has been loaded it may be used to start transferring out its data immediately to the shift register even though the next buffer may be in the process of being loaded from the work buffers. Thus, while writing from one line assembly buffer to the shift register, the transfer of data from the work buffers to another line assembly buffer can be started.

Upon an end of line signal from end of line detector 94, line assembly buffer control 86 selects the next buffer from which data can be shifted out to a modulator. In this exemplary embodiment data is shifted from the line assembly buffer to the shift register thirty-two bits at a time and read out of the shift register one bit at a time. Upon the shifting out of the thirty-two bits from the shift register, address counter 90 increments the line assembly buffer address for transfer of the next thirty-two bits to the shift register.

It will be understood that specific arrangements for transfer of data from the line assembly buffers to the shift register and modulator may vary without departing from principles of the invention since many arrangements are well known for employing assembled line data for achieving write beam control. In the exemplary arrangement illustrated herein, data from the shift register is transferred through a polarity control circuit 96 which can selectively invert all bits to enable writing of either a positive or negative image. The line data is then fed through a data on/off control 98 which is controlled by a position transducer (not shown) arranged to detect position of the writing table as it moves from one scan line to the next. This control is employed to start the writing of the image at a particular position of the writing medium, at a specific scan line. In other words, the writing table may be moved from one scan line to the next with the control 98 commanded to prevent the writing of data. This is achieved by temporarily disabling the data clock generator 88 until a desired table position has been reached. The data is fed to the laser modulator 22 as previously described.

Flow Charts

The flow chart of FIG. 11 is a general illustration of the basic steps involved in the reading of information from the pattern data storage library 58 and the image data storage 64. It will be recalled that there may be many image lines which have no commands, neither trace calls nor pattern calls. Nevertheless, there may yet be still active patterns, called on previous lines and these still must be processed into the pattern work buffer 66. Also, contents of both work buffers must be transferred to the line assembly buffers for each scan line. Accordingly, as broadly illustrated in FIG. 11, for each line it must be determined whether or not there are any commands on the line. This is indicated at flow chart step 100. If commands on this line are found, pattern calls are read and the pattern processing RAM (PPR) 62 is updated, step 102. Trace data is read, step 104, storing the trace calls in a temporary storage area of the pattern pointer table, LPR 60, also identified as 2D FIFO (for storage of trace or 2D commands on a first in first out basis). When this has been done the system checks to see whether or not the direct memory access, or DMA, has been completed, step 106. In the DMA, it will be recalled, contents of the trace work buffer 68 and pattern work buffer 66 are transferred to the line assembly buffers and then to the shift register for control of the laser modulator.

After completion of the DMA, the trace and pattern work buffers again are available for receiving trace and pattern data. Thus the system will then process active patterns, and process trace calls, steps 108, 110. Then the DMA may be authorized, step 112, and the scan line count is incremented, step 114. If there are no commands on the succeeding line, the system begins to process patterns and traces, doing the direct memory access and incrementing the line count. This is repeated until it is determined that a line has been reached which contains pattern or trace calls whereupon these are read as described before, processing patterns and trace calls.

Figure 12A:
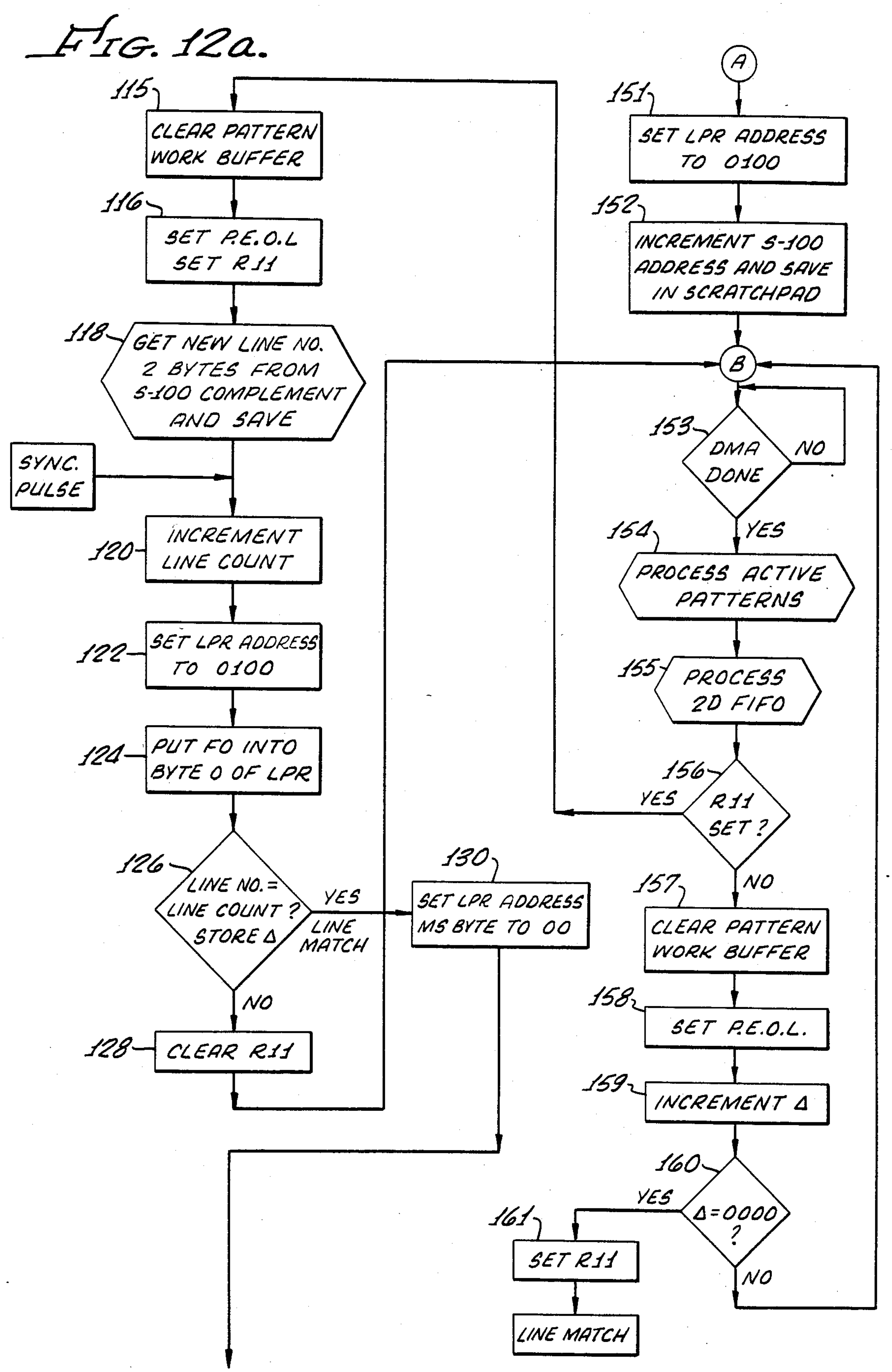
FIGS. 12*a*, 12*b* and 12*c* collectively comprise a more detailed flow chart of the process described in FIG. 11.
Figure 12B:
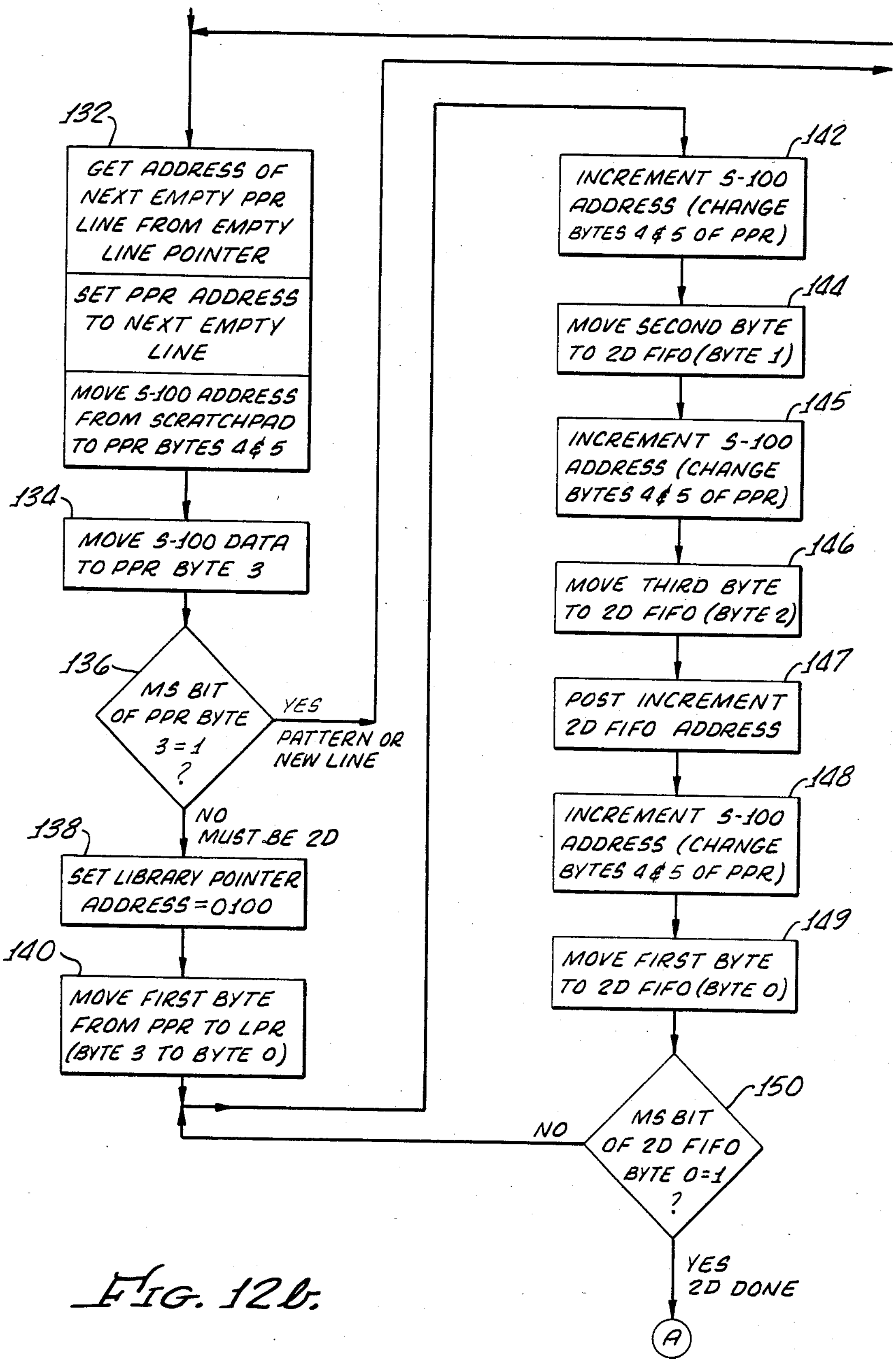
Figure 12C:
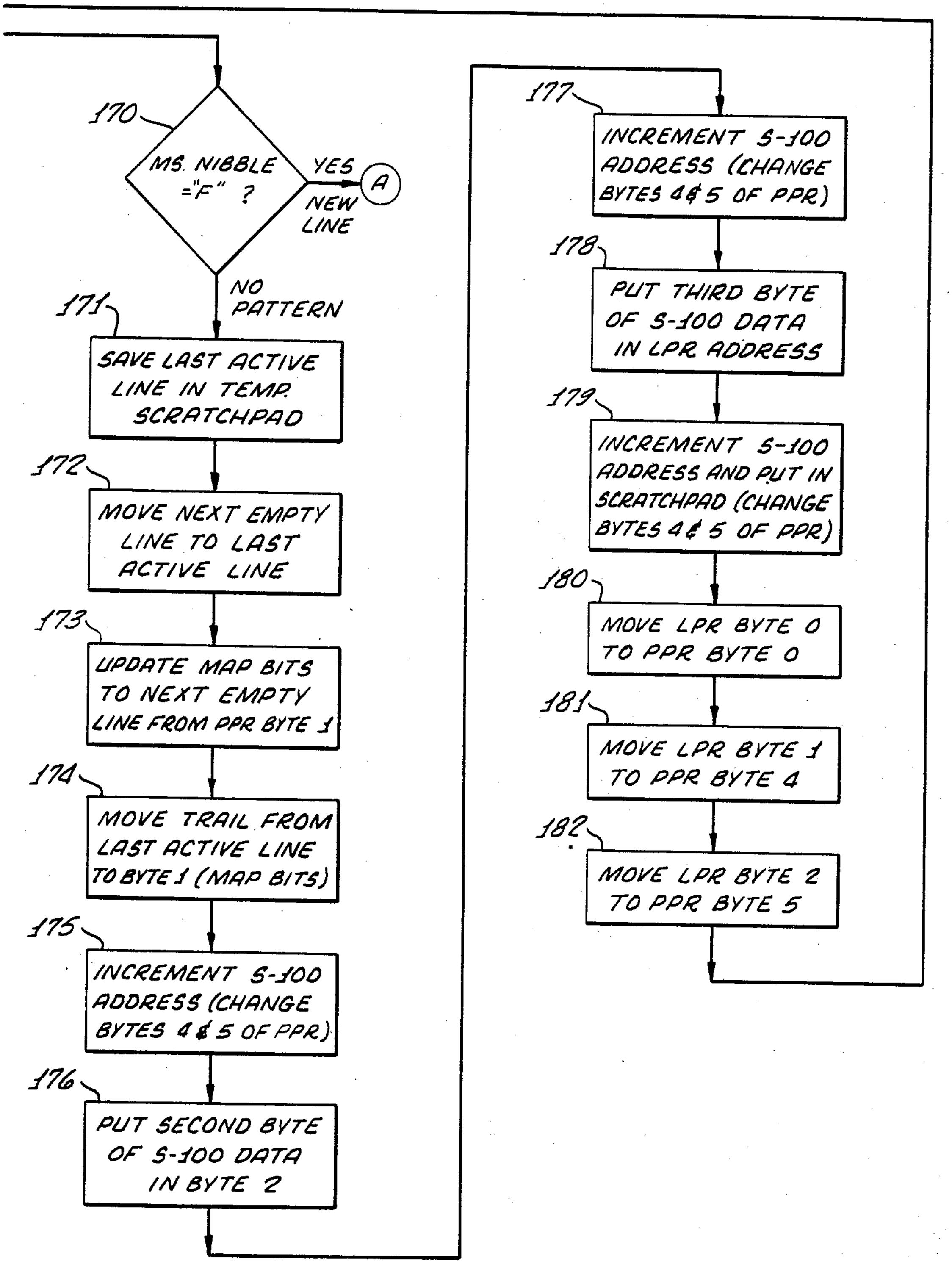

FIGS. 12*a*, 12*b* and 12*c* collectively comprise a more detailed flow chart of the steps illustrated in the flow chart of FIG. 11. These three figures make up a complete flow chart with FIG. 12*b* positioned directly below FIG. 12*a*, and with FIG. 12*c* directly to the right of FIG. 12*b*. In the flow chart of FIGS. 12*a*, 12*b* and 12*c*, the image data storage 64 is termed the S-100. It is assumed that, upon reading the floppy disc from the data source or host computer, the Group III data is sorted for each scan line to group all pattern calls on a given scan line and store these, one after the other, in sequence in the S-100 memory and to group all trace calls on the same scan and similarly store these, one after the other, in sequence and immediately following the last of the pattern calls for the scan line. It is further assumed, for this flow chart, that all trace calls are fully designated in three bytes. Therefore, in the S-100 memory each line of image data for a given scan line contains all of the patterns called on that line followed by all of the traces called on that line. In the steps described in these flow charts the library pointer table or library pointer RAM (LPR), as previously mentioned, is used for temporary storage of trace calls as they are read from the image data storage, S-100. Thus, in LPR 60 of FIG. 6, the first 256 addresses, up to hexadecimal address 00FF are used as the library pointer table, containing the information illustrated in FIG. 4. All subsequent addresses, hexadecimal 0100 and above are used for temporary storage of trace calls, and are collectively termed the 2D FIFO.

Starting with step 115 (FIG. 12*a*) the pattern work buffer 66 is cleared and, step 116, both a processor end of line (PEOL) and a line read command flag R11 are set. This setting of R11 is for initialization only. R11 is set at another point, as will be described below, to allow reading of the next line of commands. The processor end of line, when set, authorizes the start of the DMA at the end of a laser scan (as determined by a complete count of the 18,000 line elements). The DMA is started upon completion of one scan and completed before start of the next. For a fifteen millisecond scan line repetition rate, for example, there are five milliseconds from the end of one scan to the start of the next. The R11 flag is employed to indicate whether or not a new line of commands is to be read upon completion of processing of patterns and traces. Then, step 118, two bytes of a new line number YY YY are extracted from the S-100, this number is saved in the scratch pad memory, and the S-100 address is incremented.

A sync pulse from the scanning mirror increments the line count, step 120, and the LPR address is set to hexadecimal address 0100, step 122. This is the first line of the 2D FIFO. An F0 is placed in byte 0 of the LPR, step 124, to denote the beginning of a new line of image data, and operates as a command terminator for the reading of trace commands from the 2D FIFO. Having initialization the LPR, the present line number is compared with the line count, step 126, to determine whether this particular line has any trace or pattern commands. The line number is the hexadecimal YY YY of the Group III data and was read in step 118. This earlier step occurred when, upon completion of processing of commands and testing the next line, it is found that the line count has reached the previously stored next line number (only lines having commands have a line number). At such time the new line number YY YY is extracted from the S-100 memory, complemented and saved in a scratch pad. It is this line number that is compared in step 126 with the line count. The complement of the difference, delta, is stored in a suitable register. If the difference is not zero there are no commands to be read, whereupon read command flag R11 is cleared, step 128, and the system proceeds to process active patterns and to do the DMA, as denoted by the sequence of steps following "B" (steps 154 et seq, FIG. 12*a*).

If delta is zero, the line count agrees with the stored line number, and the system attains a state called line match in which the trace and pattern commands are read from the S-100. To start reading the S-100 data, the address of the most significant byte of the LPR is set to 00, step 130, (so as to point at the pointer table instead of the 2D FIFO) and then, step 132, (FIG. 12*b*) the address of the next empty line of the PPR is obtained from the empty line pointer. The empty lines of the PPR are used to initially hold the commands read from the S-100, even before determining whether such commands are trace calls or pattern calls. If they are trace calls they will be removed and placed in the 2D FIFO, and if pattern calls they may remain. PPR bytes 4 and 5 are used for temporary storage of S-100 addresses. Accordingly, the empty lines of the PPR are initially used merely as temporary storage. The address of the PPR is set to the next empty line obtained from the pointer and the S-100 address which had previously been stored in a scratch pad memory (as will be explained below) is temporarily stored in PPR bytes 4 and 5. This is the address of the most significant byte of the column address of a trace or pattern (or it may be an F, to signal start of a new line of image data.) Then, step 134, the first byte (column address) of S-100 data is moved to byte 3 of the PPR. It will be recalled that the most significant bit of this byte is a 1 for a pattern call and a 0 for a trace call. Accordingly, in step 136 the most significant bit of this byte is inspected. Assuming the S-100 data to be a trace call, its first byte is 0XX and its first bit is a zero. Thus, it is known that the call must be a trace call and, as in step 138, the LPR address is set to the first 2D FIFO address, hexadecimal 0100. Now the three bytes of the trace call are transferred from the S-100 to the 2D FIFO (assuming for the purposes of these flow charts that the trace calls are all presented in three bytes only). The first byte of the S-100 data (0XX) which initially had been stored in PPR byte 3, in step 134, is moved to LPR byte zero, step 140. The S-100 address is incremented by changing bytes 4 and 5 of the PPR, step 142. Now, the second byte of the S-100 data (XX) is extracted from the S-100 and placed in the 2D FIFO byte 1, and the S-100 address is again incremented so that the third byte of the S-100 data (1/0LL) may be moved to byte 2 of the 2D FIFO, steps 144, 145 and 146. The 2D FIFO address is incremented, step 147, the S-100 address is again incremented by changing bytes 4 and 5 of the PPR, step 148, and the next byte of the S-100 (which is the first byte of the next 2D call, or of the next command line) is moved to byte 0 of the 2D FIFO step 149. If another 2D command follows the first, the most significant bit of byte zero of the 2D FIFO is zero and this following 2D command will be inserted in this next line of the 2D FIFO. If this most significant bit of 2D FIFO byte zero is one, then the following data is F0 (F is four binary ones) and it is known that the next body of data in the S-100 is a new scan line of commands.

As previously mentioned, all trace calls have been grouped together following all command calls for a given scan line. Therefore the F0 means that reading of trace commands (and pattern commands too) is completed and the system will proceed to process active patterns and trace commands as in sequence "A" (FIG. 12*a*, steps 151 et seq). In this sequence the LPR address is set to the first line of the 2D FIFO, step 151, and the S-100 address is incremented and saved in the scratch pad memory, step 152. The address now contained in scratch pad memory after step 152 is the address of the next line number YY YY which follows the F0 that was transferred to byte zero of the 2D FIF0 in step 149.

If the DMA has been completed, as determined in step 153, processing of active patterns is performed as previously described, step 154, utilizing the active lines of the pattern processing table, PPR, to extract lines of pattern data from the pattern library and entering this data into the pattern work buffer. Similarly, step 155, the trace commands are processed by expanding these from the 2D FIFO into the trace work buffer.

At the completion of the processing, line read flag R11 is inspected, step 156. If it is set the next line requires reading of commands. If R11 is clear, there are no commands on the next line, and the pattern work buffer is cleared, step 157. The processor end of line is set, 158, authorizing the DMA to begin, and delta is incremented, step 159, so that it can be determined, in step 160, whether or not a new line has commands to be read. If delta is not yet zero, the next line merely requires processing of patterns and expansion of trace commands, and this is done upon completion of the DMA. This cycle is repeated (steps 154–160) until delta equals zero.

If, after incrementing delta, it is found to be zero in step 160, the line read flag R11 is set, step 161, line match exists, and the system returns to step 130 (FIG. 12*a*). Commands are read (in the steps following step 130) on the line of which the line number had been saved in the scratch pad. Upon completion of step 150 (2D commands all read), the S-100 address points to the start of the next line, F0. Proceeding to "A" (step 151), S-100 address is incremented to point to the next line number YY. Upon completion of the processing, step 156 now shows R11 is set and the system returns to step 115. The next line number is stored and, assuming it does not consecutively follow the previous command bearing line, delta will not be zero, R11 will be cleared (step 128) and sequence "B" is followed.

Referring back to step 136 (FIG. 12*b*), in which the most significant bit of the first byte of the command is inspected, assume this bit is one. A one in this bit may mean either a pattern call or the beginning of a new line, an F0. Accordingly, in step 170 (FIG. 12*c*), all of the next four bits, that is, the most significant nibble of PPR byte three, are inspected to determine whether the next data define a new line number F (all bits are 1) or a pattern call, X (not all bits are 1). Scan line length is not large enough to provide a column address in which all four of the most significant bits are one. If step 170 shows a new line of commands then the system goes to sequence "A" and the pattern and trace command processing begins, after setting the LPR address and incrementing the S-100 address as in steps 151 and 152.

If a pattern call is identified in step 170, the PPR map and pointer bits are updated as described in connection with FIG. 8. The last active line pointer is saved in a temporary scratch pad, step 171, and in steps 172, 173 and 174 the map bits and pointers are updated, moving the next empty line pointer to the active line pointer storage, moving the map bits of this PPR line from byte ont to the next empty line pointer, and moving the trail from the last active line pointer storage to byte one of this line in the PPR. This first byte of this pattern call (1XX) had been moved to PPR byte three in step 134 and the S-100 address of this byte had been placed in PPR bytes four and five in step 132. Now the S-100 address in PPR bytes four and five is incremented, step 175, to point to the second byte of the pattern call and this second byte is transferred from S-100 to byte two of the PPR in step 176. The S-100 address in PPR bytes four and five is again incremented, step 177, and the third data byte is transferred from S-100 and the LPR address is set to this byte, step 178. It will be recalled that the third data byte is the pattern number NN and that this pattern number is employed as the LPR address for the pointer table portion of the LPR.

The S-100 address is now incremented, step 179, and this incremented S-100 address is now stored in a scratch pad since it points to either the first byte of the next command, whether pattern or 2D command, or the line designator F0 of the next line. Now byte zero of the LPR line addressed by the pattern number NN, is moved to PPR byte zero, step 180, to move the pattern height complement $\overline{HH}$ into the PPR. LPR bytes one and two are moved respectively to PPR bytes four and five, steps 181, 182 so that the PPR now contains the pattern library address (SS SS) of the pattern for which data is stored on this line of the PPR.

Having completed the reading of a pattern call into the PPR, the system returns to step 132 to read a second call, and follows through to steps 136 and 170 to determine whether the next call is another pattern call, a new line, or a trace call. Following pattern calls (if any) are read, after which all trace calls (if any) on the same line are read. After reading all trace calls, or after reading all pattern calls, if the line contains no trace calls, the system goes to sequence "A" for processing.

Subtractive Patterns

The use of plural work buffers and, in particular, the use of pattern work buffers that are precleared for each scan line has the advantage of enabling one pattern to be overlaid on another as previously described. In effect, this is an additive process in which one pattern can be superimposed upon another (a trace, for example). This concept is readily expanded to allow use of subtractive patterns so that the system can either overlay or subtract, or both, at various points in an image. In pattern subtraction, a portion of a pattern is removed (effectively "erased"). Pattern, subtraction is of use, for example, where a hole is to be placed in a solid field. Prior systems allow only the imposition of a solid pattern upon a blank field. Using prior techniques, a solid pattern covering a large area can be generated with a very small amount of data whereas a larger amount of data would be required to generate that same pattern with one or more holes in it. Employing pattern subtraction concepts of the present invention, the solid pattern can be generated to cover its entire area without any hole or holes and separate patterns for the hole or holes are generated and then subtracted from the pattern bits of the solid pattern. Total data for generation of the larger solid pattern and the smaller subtractive pattern can be considerably less than required to achieve the same results with prior techniques.

Figure 13:
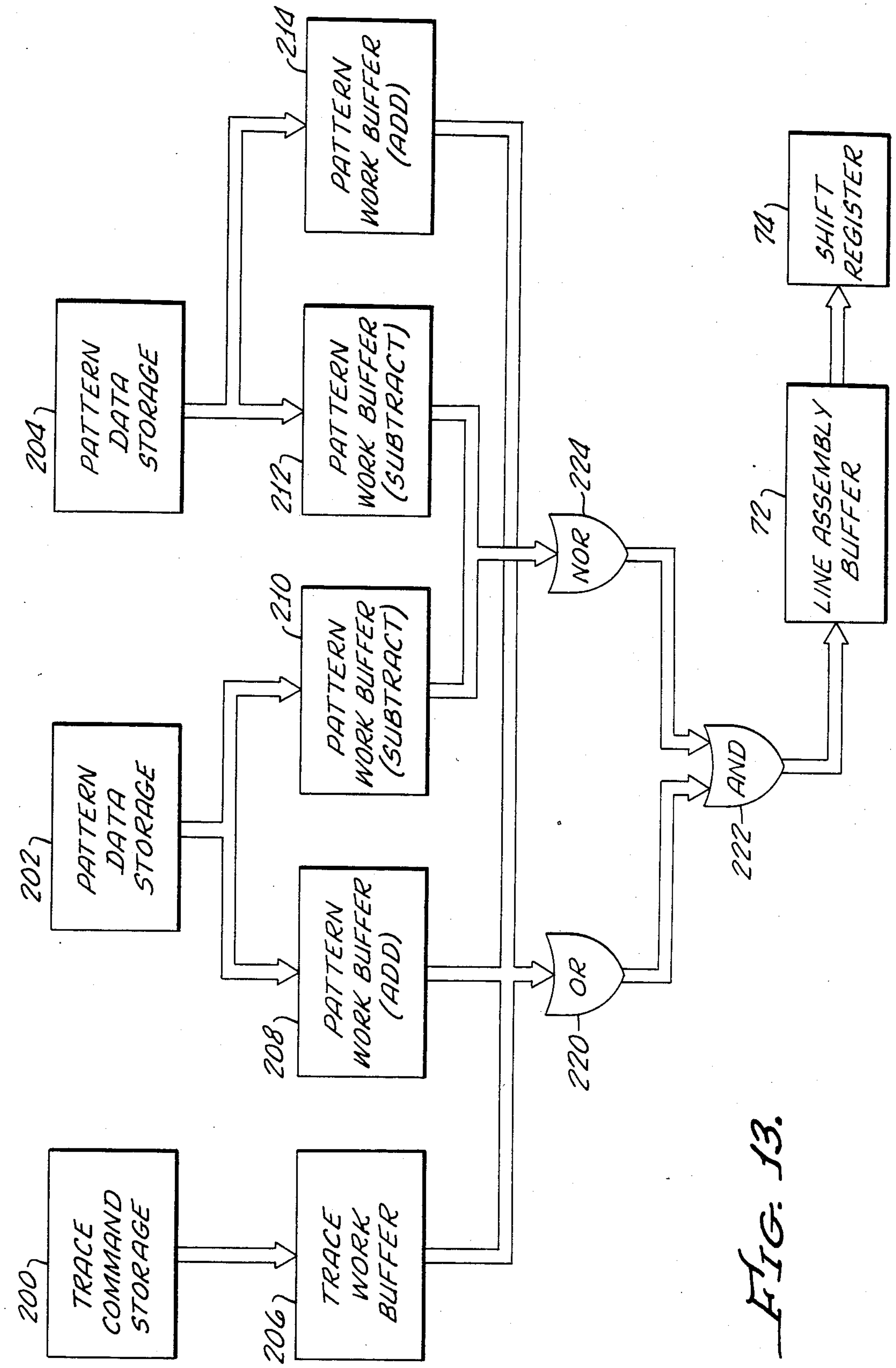
FIG. 13 is a block diagram of parts of a system modified to enable either additive or subtractive overlaying of traces and patterns.

FIG. 13 illustrates portions of the system of FIG. 6 modified to provide for both addition and subtraction of the patterns.

Trace and pattern data are stored in trace command storage 200, pattern data storage 202 and pattern data storage 204. The trace command and pattern data storage 200 and 202 may be identical to the higher address numbers (above address 256) of the library pointer RAM 60 of FIG. 6 and to the pattern data storage library 58 of FIG. 6, respectively. Trace commands are read from the image data storage 64 (not shown in FIG. 13) for temporary storage in memory 200 before processing into the work buffer. Pattern data storage 202 contains the same information as the pattern data storage library 58 of FIG. 6. In addition to pattern data storage 202 a second pattern data storage 204 is provided. The second pattern storage may be identical to the first pattern data storage 202. Alternatively, it may take the form of a function generator which receives and stores all data necessary for defining a given pattern shape and thereafter generates data lines of a corresponding bit pattern. However, for purposes of description of the add subtract function it may be considered that pattern data storage 204 is identical to the pattern data storage 202 and to the pattern data storage library 58 previously described. Storage 204 may include patterns other than those contained in storage 202. Information is transferred from the storage devices 200, 202 and 204 to respective ones of work buffers 206, 208, 210, 212 and 214 in the manner described above in connection with FIG. 6. Buffers 206, 208 and 214 are additive and buffers 210 and 212 are subtractive in this exemplary arrangement. Each work buffer can assemble a complete line of data but will hold only a line of data from a specific one of the storage devices 200, 202, 204. Thus, the trace work buffer 206 will hold a full line of a trace, the add and subtract pattern work buffers 208 and 210 will hold a complete line of pattern data from storage 202 and similarly, and the add and subtract work buffers 214, 212 will hold a full line of data from the storage device 204. Each of the storage devices 202 and 204 has the pattern data stored therein identified as additive or subtractive, as by coding the stored pattern data or storing additive patterns in one area of the storage and subtractive pattern data in another area. Additive pattern data from storage 202 (to be overlaid) are expanded from the pattern data storage 202 uniquely into the add pattern work buffer 208 whereas subtractive pattern data from storage 202 (to be subtracted from the overall pattern or image for areas which contain zeros rather than ones on the image) are fed from the pattern data storage 202 uniquely to subtractive pattern work buffer 210. Similarly, for pattern data storage 204 data for subtractive patterns are transferred from storage 204 uniquely to the subtractive pattern work buffer 212 and data for additive patterns are transferred from the storage 202 uniquely to the additive pattern work buffer 214. All of the pattern work buffers 208, 210, 212 and 214 are precleared for each line, whereas the trace work buffer 206 is changed only when a change is commanded by a trace command.

Each full line of data from the trace work buffer 206, additive pattern work buffer 208 and additive pattern work buffer 214 is fed through OR circuitry 220 and then as first inputs to AND circuitry 222. Each full line of data from the subtractive work buffers 210 and 212 is fed through NOR circuitry 224 of which the output is fed as a second input to the AND circuitry 222. The output of the AND circuitry is fed to the line assembly buffer 72 and thence to the shift register 74 for readout as previously described in connection with FIG. 6. For a given bit position along a scan line, the data from the three additive buffers 206, 208, and 214 are handled just like the data from the trace and pattern buffers 68 and 66 of FIG. 6. In other words, if any one of these buffers has a one in a given bit position the OR circuit 220 will provide a one in that position. The subtractive buffers 210 and 212 are arranged so that a one in any given bit position commands reset of that bit in the image data stream. In other words, a one in a given bit position of a line of subtractive buffers 210 or 212 will turn off the laser whereas a one in any given bit position in any of the additive buffers 206, 208 and 214 will turn on the laser (or vice versa). If, for a given bit position, neither of the subtract buffers has a one (neither is commanding reset) NOR circuitry 224 provides an enabling input to AND circuitry 222 and the system works with the three input OR circuitry 220 just as previously described in connection with the two input OR circuitry of FIG. 6. If either one or both of the subtractive work buffers 210, 212 does command a reset, NOR circuit 224 provides a zero output that will not enable the AND circuitry 222 and thus, regardless of the data in the additive buffers 206, 208 and 214, AND circuitry 222 will provide a zero and thus a blank on the image. Accordingly, it will be seen that the patterns in pattern work buffers 206, 208 and 214 are in effect additively combined with each other and the patterns in subtractive buffers 210 and 212 are subtractively combined with the additively combined pattern data.

Trapezoid Generation

In the system described to this point, a slant line may require more data to define it than is required for horizontal or vertical traces, but such slant line may not be readily adapted for handling as a pattern. It has been found that slant lines and other trapezoidal configurations may be readily generated by techniques that provide a number of advantages in data compression and economy of hardware. For purposes of this discussion, a trapezoid is a four sided figure defined at its top and bottom by horizontal lines and at its sides by vertical or slant lines that intersect the top and bottom lines. Included in this definition are three sided figures, which are trapezoids in which either the top line or bottom line is of zero length. A slant line is formed on the image by a trapezoid having substantially equal length top and bottom lines that intersect closely spaced, mutually parallel, or nearly parallel, lines that run between top and bottom of the figure.

Figure 14:
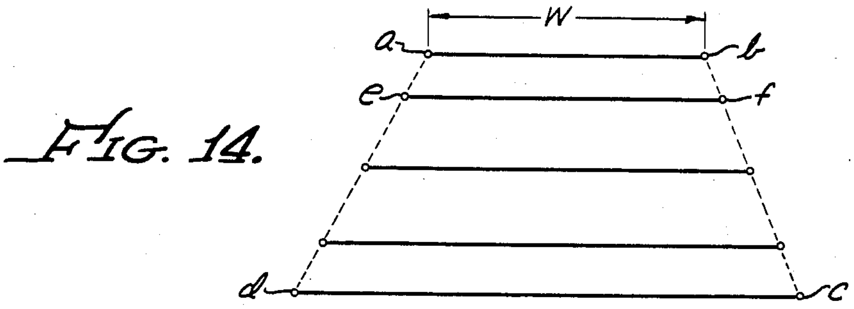
FIG. 14 illustrates a trapezoid and parameters employed in its generation.

Illustrated in FIG. 14 is a trapezoid abcd having a horizontal top line ab and a horizontal bottom line dc, both of which intersect side lines ad and bc, respectively. It is found that such a figure can be readily defined with significant savings in data, computation and hardware by defining five parameters. These parameters are: X, the column address of the starting point, a, of the left side of the first line, ab; R, the slope of the left side of the trapezoid, ad; W, the width, or length of the upper horizontal side, ab, of the trapezoid; Δ, the rate of change of width of the trapezoid from scan line to scan line; and H, the height or total number of lines. Given the information X, R, W, Δ, and H, the entire trapezoid may be generated on a scan line by scan line basis by simple addition. Thus, the starting address $X_e$ of the second scan line, ef, of this trapezoid is simply the sum of the starting address $X_a$ of the first line and the slope of the left side. $X_e = X_a + R$. Similarly, the width $W_{ef}$ of the second line, ef, of the trapezoid is simply obtained by adding the change of width Δ to the width $W_{ab}$ of the first line. $W_{ef} = W_{ab} + \Delta$.

The use of parameters W and Δ, instead of parameters that define the address of the right side of each line and the slope of the right side, affords a number of advantages. Implementation of the trapezoid generation is greatly facilitated, particularly when using run length code. Further, in computing parameters to define such a trapezoid, the left side address and width frequently are calculated based upon a given center line and trapezoid width and slope. It is considerably simpler to calculate the quantities X, R, W, Δ, and H than to calculate quantities that will provide addresses of both ends of the line. Accordingly, a significant decrease in computer time necessary to make such calculations is achieved.

Figure 15:
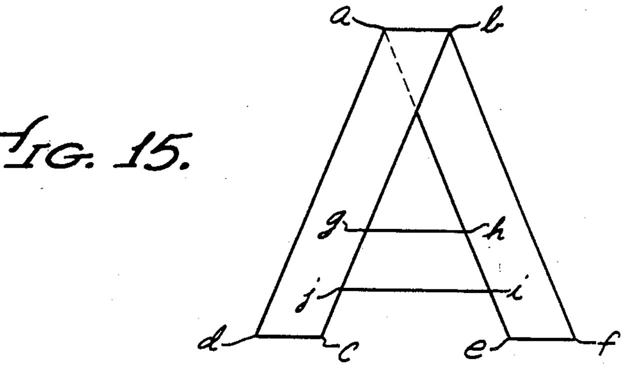
FIGS. 15 and 16 illustrate different arrangements for generating a pattern composed of several trapezoids.
Figure 16:
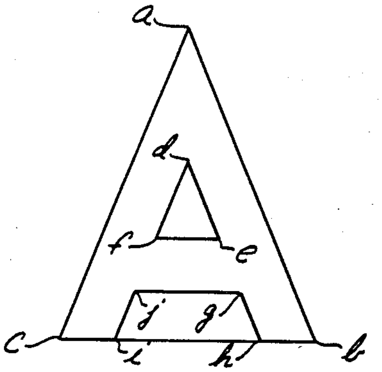

Employing trapezoids, a number of different configurations may be built up. For example, the letter "A" may be generated, as illustrated in FIG. 15, by additively generating three separate trapezoids, trapezoid abcd, trapezoid abef, and trapezoid ghij. Alternatively, as illustrated in FIG. 16, a solid trapezoid abc may be generated and subtractively combined with trapezoids def and ghij. Trapezoids abcd and abef of FIG. 15 are also slant lines of any desired width and length. Obviously these illustrations are merely exemplary of the great variety of figures that may be defined by one or more additively or subtractively combined trapezoidal figures.

To include trapezoid commands, the Group III scan line by scan line data is modified solely by the addition of the trapezoid commands and the addition of data to distinguish between trapezoid and pattern commands. Thus, the image or Group III data has a general format that begins with the Group III header, followed by the scan line number, after which the several commands occur in a specified order, all trace commands first, then all trapezoid commands, and finally all pattern commands.

In the image data, the header is the same as previously described, FF 03 KK, where 03 defines the Group III data, and KK is the image number.

The next bytes of image data are F0 YY YY, where F0 is the control byte, as previously described, specifying that the next two bytes, YY YY, define the scan line number for which the following commands will be executed.

A number of trace commands then follow in the format previously described, 0XX XX 1/0LL. As before, 0 in the most significant bit denotes a trace command. If necessary, this three byte trace command may be replaced by a five byte trace command in which the third byte is set to 00 and is followed by two run length code bytes. Thus, a five byte trace command has the form 0XX XX 00 1/0LL LL. Here, the fourth and fifth bytes become a double precision length run length code in which the fifth byte is the least significant byte of the run length code and the most significant bit of the fourth byte is used to specify whether the pixels are to be set or reset (1 or 0, respectively).

Although trace commands may be positioned interchangeably in a series of trace commands, all are grouped together before the trapezoid or pattern commands.

Following the last trace command are one or more trapezoid commands in the following format:

1XX XX 00 RR RR RR RR 1/0LL LL DD DD DD DD HH HH

As with the previously described pattern commands, the first two bytes (XX XX) are the column address of the first pixel to be affected. The most significant bit of this address is set to a 1 to assist in distinguishing trapezoid and pattern commands from the trace command. Thus, a 1 in this most significant bit denotes not a trace, but either a trapezoid or a pattern command. The third byte is a null byte and distinguishes between trapezoid commands and pattern commands, since 00 is not a valid pattern number. It is this third byte in a pattern command that would identify the pattern number.

All trapezoid commands within a group of trapezoid commands need not be positioned according to column address, but are contained in a block which is located after the last trace command and before the first patern command for a particular scan line. The fourth through seventh bytes (RR RR RR RR) comprise a 32 bit signed two's complement fractional number defining the slope of the left side of the trapezoid. Use of the signed two's complement allows a simplified arithmetic addition to be carried out when adding the slope of the left side to the column address. As previously mentioned, a new column address is calculated for each subsequent scan line by adding the slope value, as indicated by the fourth through seventh bytes, to the column address of the prior line. If the value of the slope is zero, then the column address does not change in subsequent scan lines and results in a vertical left side for the pattern. If the value of the slope is negative, then the column address will be decreased by the simple addition, resulting in a left edge sloping toward the left margin. Similarly, if the value of the slope is positive, then the left edge of the trapezoid will slope toward the right margin for increasing scan line numbers.

The eighth and ninth bytes (1/0LL LL) of the trapezoid command comprise a run length code that define the number of pixels in the first scan line of the trapezoid, or, in other words, the width of the top line of the trapezoid. As in the previously described RLC commands, a 1 in the most sigificant bit of the run length code turns on the specified number of pixels, and a 0 in the most significant bit turns the specified number of pixels off, and furthermore, erases them from any existing trace or pattern command that may be affecting the same pixels in the scan line. Thus, a 0 in the most significant bit of the run length code of the trapezoid results in a subtractive trapezoid, to be assembled in a subtractive work buffer, and a 1 in this bit results in an additive trapezoid to be assembled in an additive work buffer.

The tenth through thirteenth bytes (DD DD DD DD) specify the rate of change of trapezoid width (RLC), or, in other words, the difference in slope between the left and right edges of the trapezoid. If the value of this change (Δ) in width is zero, then the left and right edges of the trapezoid are parallel. If the value of the slope difference is negative, then the right edge slopes toward the left margin faster than the left edge does; that is, the trapezoid becomes narrower with each scan line. If the value of the Δ slope is positive, then the trapezoid gets wider with each scan line. In effect, the Δ slope is the rate at which the run length code changes with each scan line.

The last two bytes (HH HH) specify the number of scan lines in the trapezoid pattern, or, in other words, the height of the trapezoid.

The pattern commands all follow the trapezoid commands and are as previously described.

If deemed necessary or desirable, the Group II, or pattern data header, FF 02 MM, which, as described above, is followed by the pattern identifying data NN WW HH 1/0LL, etc., may be immediately followed by a number SS (between the header and the pattern identifying data). This number is the pattern number of the first "erase" pattern (the lowest number of any "erase" pattern). In such a situation, all pattern numbers NN that equal SS or are greater than SS are identified as erase patterns, and all pattern numbers lower than SS are identified as additive patterns. Thus, the additive and subtractive patterns may be presented in the pattern command format by identical data, but distinguished by determining whether the pattern number is SS or greater (subtractive) or less than SS (additive).

Figure 17:
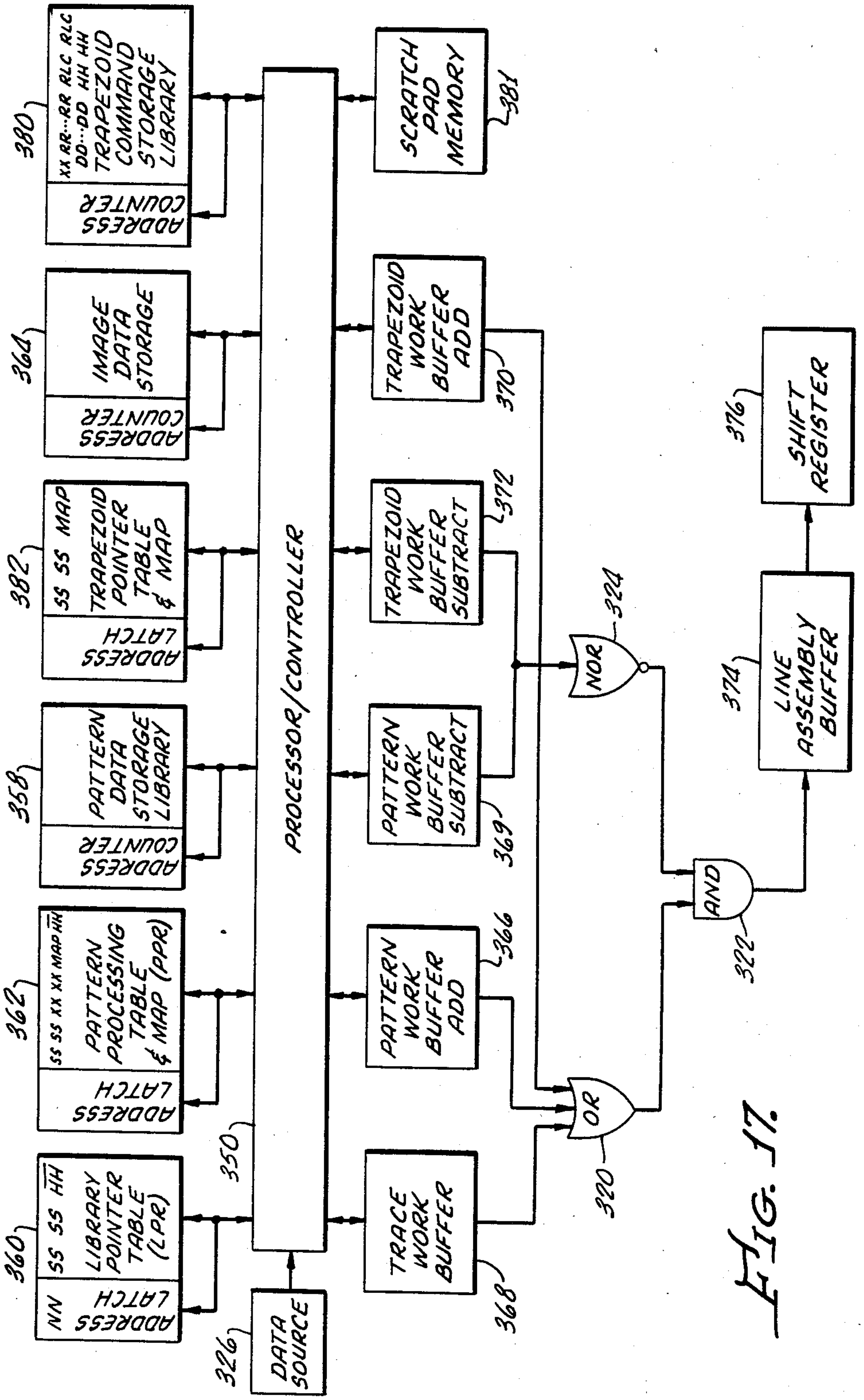
FIG. 17 is a block diagram of a scan control similar to that shown in FIG. 6, but modified to show the arrangement employed for trapezoid generation.

Ilustrated in FIG. 17 is a block diagram of the laser scan control of FIG. 6 modified to include structure for trapezoid generation and also including additive and subtractive work buffers, with certain blocks omitted. As previously described, data source 326 feeds data into the processor controller 350 under control of the microprocessor program, input/output control microcodes, and the coding and controls within the microprocessor controller (not shown in FIG. 17). The system employs a pattern data storage library RAM 358, working in conjunction with the pattern processing table and map 362, a library pointer table 360, which also temporarily stores trace data, an image data storage 364, and scratch pad memory 381, all as previously described in connection with FIG. 6. Also included are a number of work buffers, including a trace work buffer 368, an additive pattern work buffer 366, a subtractive pattern work buffer 369 (all identical to those previously described), and additive and subtractive trapezoid work buffers 370, 372. The trapezoid work buffers 370 and 372 are substantially identical to the pattern work buffers 366 and 368 and, like the pattern work buffers, are cleared after each transfer of a line of data to the line assembly buffer 374. Transfer of the data from the work buffers to the line assembly buffer 374 operates just as described in connection with FIG. 13. Data from the three additive buffers 368, 366, and 370 are fed through OR circuitry 320 and thence as one input to AND circuitry 322, whereas data from the subtractive work buffers 369 and 372 are fed through NOR circuitry 324 from which is provided the second input to the AND circuitry 322, which provides as its output the input to the line assembly buffer 374, which, in turn, feeds shift register 376.

To generate trapezoid data on a line by line basis from the data contained in a trapezoid command, there are employed a trapezoid command storage library or RAM 380, coupled with the processor controller 350, and a trapezoid pointer table and map 382, also coupled with the processor controller.

Figure 18:
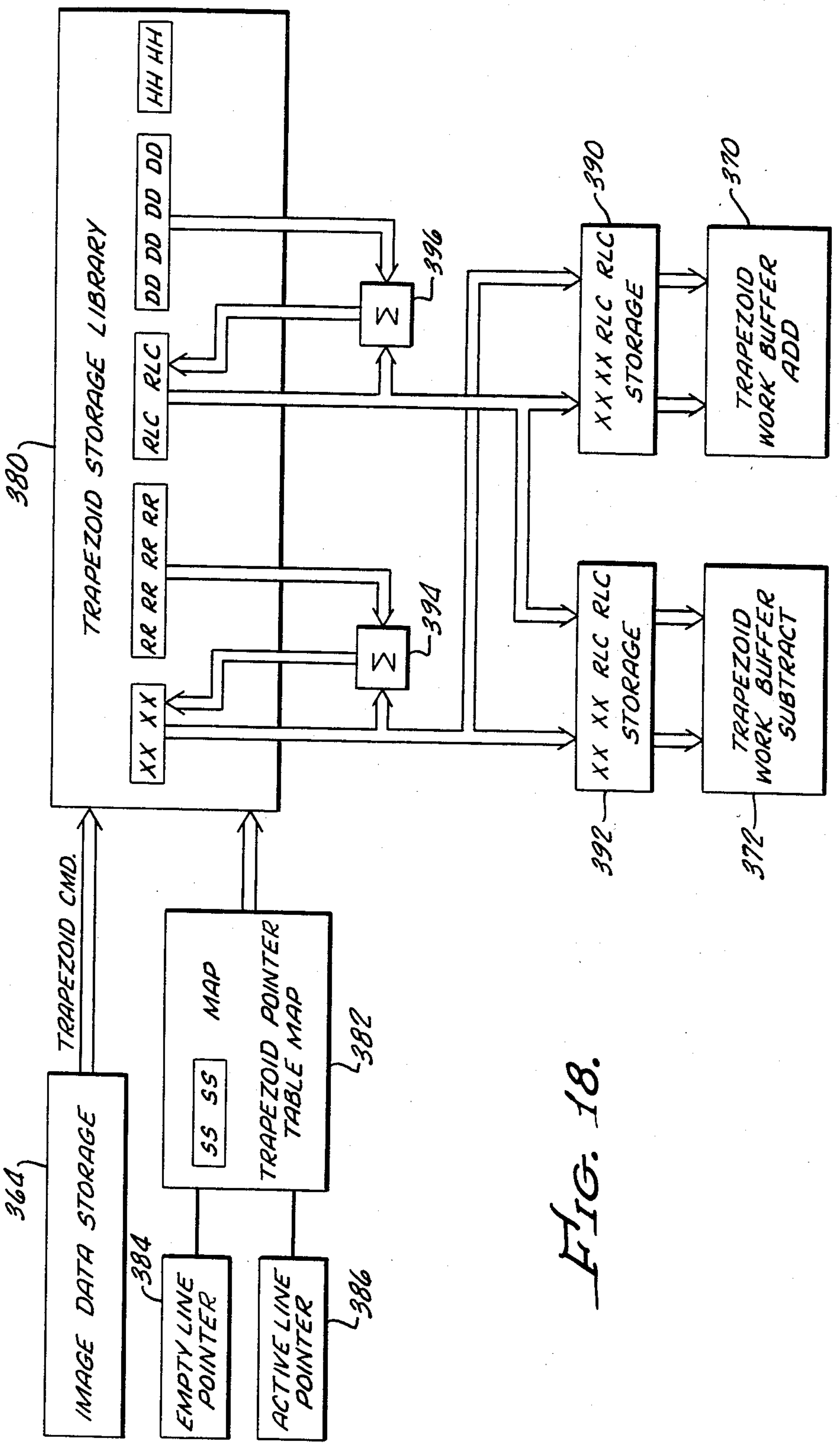
FIG. 18 is a functional block diagram illustrating operations involved in trapezoid generation.

Generation of the trapezoid line by line data is illustrated in connection with the functional block diagram of FIG. 18. Upon reading image data from the image data storage 364, and identifying a trapezoid command by the 1 in the most significant byte of the column address XX XX and a 00 in the third byte, the entire command is stored in an empty line of the trapezoid command storage library, or trapezoid RAM 380. Empty lines in RAM 380 are identified by the RAM pointer table and map 382. This pointer table and map operates just as the pattern processing table and map 62, described above in connection with FIGS. 6 and 8. The trapezoid pointer table and map 382 contains lines of address bytes SS SS which initially designate addresses SS SS of empty lines in the trapezoid command storage RAM 380. Each line of the RAM pointer table 382 also contains a set of map bits. Thus, except for the column address bits XX XX and height data $\overline{HH}$, the RAM pointer table 382 contains the same data as the pattern processing table 62 (FIG. 6). Table 382 also works in conjunction with scratch pad pointers, indicated in FIG. 18 as empty line pointer 384 and active line pointer 386. Each trapezoid command in its entirely, except for the third null byte (which is no longer needed to distinguish from pattern commands) is stored in the trapezoid command storage library 380. The column address XX XX is extracted from the trapezoid RAM 380, temporarily stored in a storage 390 or 392 (for respective add and subtract trapezoid work buffers 370, 372), and then added, as indicated by summing circuit 394 to the left side slope RR RR RR RR. The sum is returned to the trapezoid RAM storage which then contains the column address of the start point of the next scan line of the trapezoid.

Similarly, the trapezoid width or run length code is extracted from the trapezoid RAM, temporarily stored in the additive and subtractive work buffer storage 390, 392 and also added by a summing circuit 396 to the slope difference or rate of change of width DD DD DD DD. The sum is then returned to the same location in the trapezoid RAM which thereby contains trapezoid width for the next scan line. The trapezoid height HH HH is then decremented and returned to RAM storage.

The arithmetic sums are carried out by the processor controller 350. The column address and width contained in temporary storage 390 and 392 are employed to set the appropriate bit patterns in the subtract and add trapezoid work buffers 382, 380, as previously described in connection with the setting of the bit patterns in the pattern work buffers.

In a presently preferred embodiment temporary storage 390, 392 form part of RLC command processors employed for high speed expansion of run length codes into the several work buffers, as described below and illustrated in FIGS. 20 through 28. All four trapezoid and pattern work buffers are cleared after each transfer of data therefrom, as previously described.

Setting of the bit patterns in the pattern and trapezoid work buffers is readily accomplished under program control from the processor controller, or if increased speed is desired, RLC command processor circuitry is provided for specific hardware implementation of the setting of the bit pattern from the column address and trapezoid widths, on a word by word basis, as described below and illustrated in FIGS. 20 through 28.

Trapezoid Flow Charts

Figure 19A:
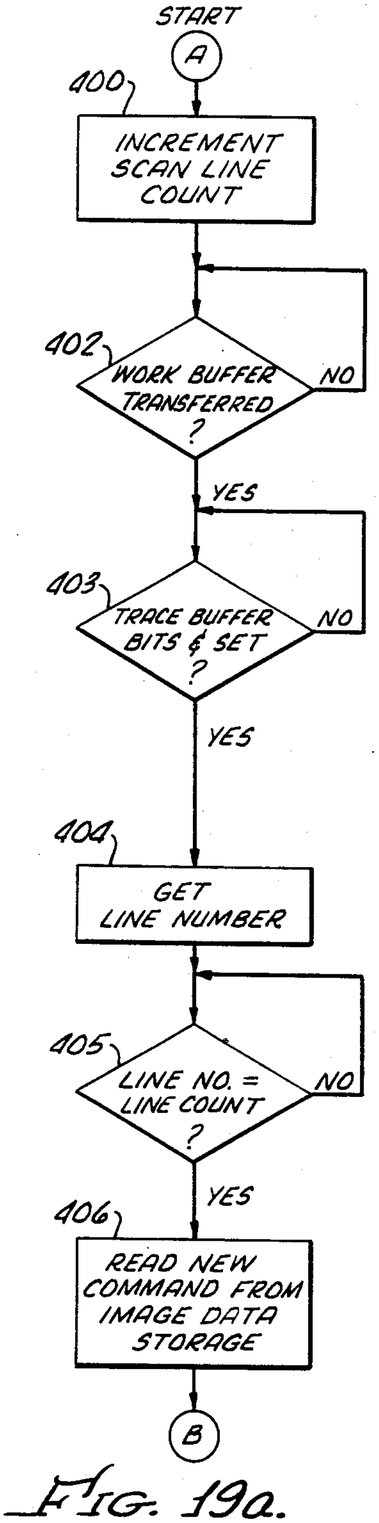
FIGS. 19*a*, 19*b*, 19*c* and 19*d* comprise flow charts describing the steps in the generation of a trapezoid.
Figure 19B:
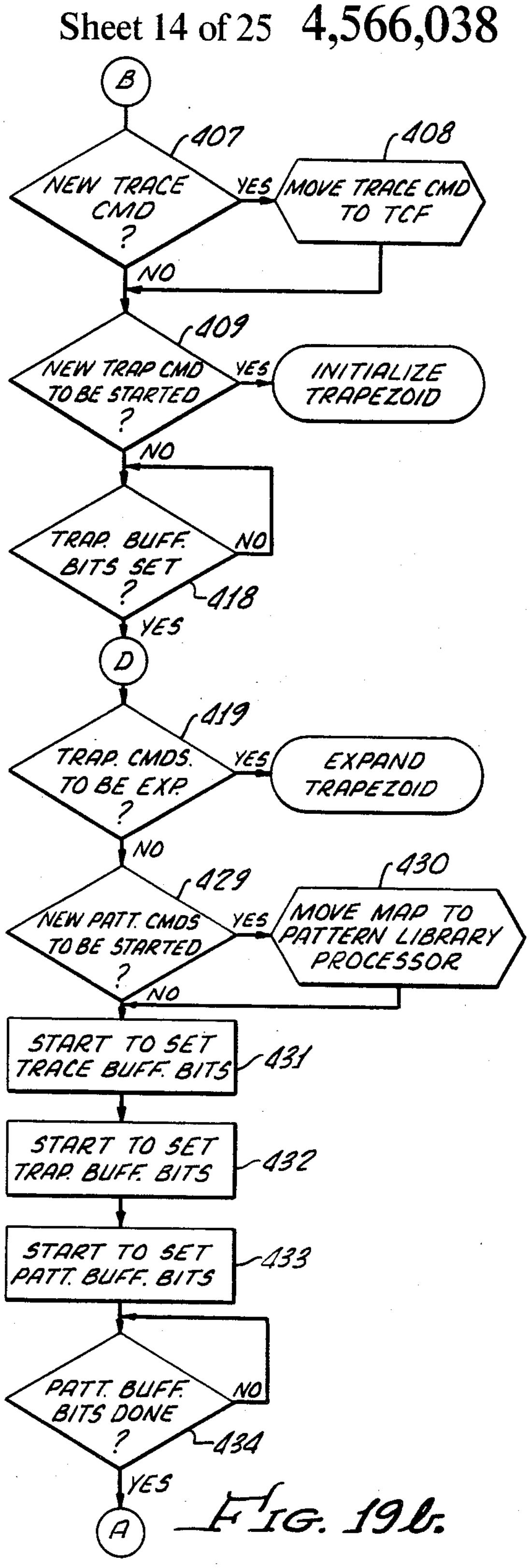
Figure 19C:
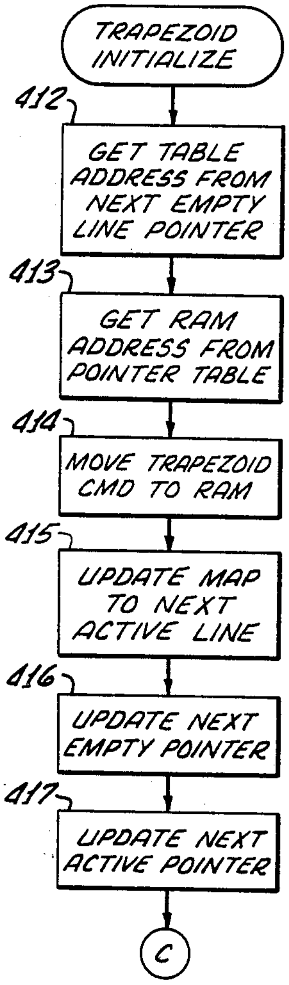
Figure 19D:
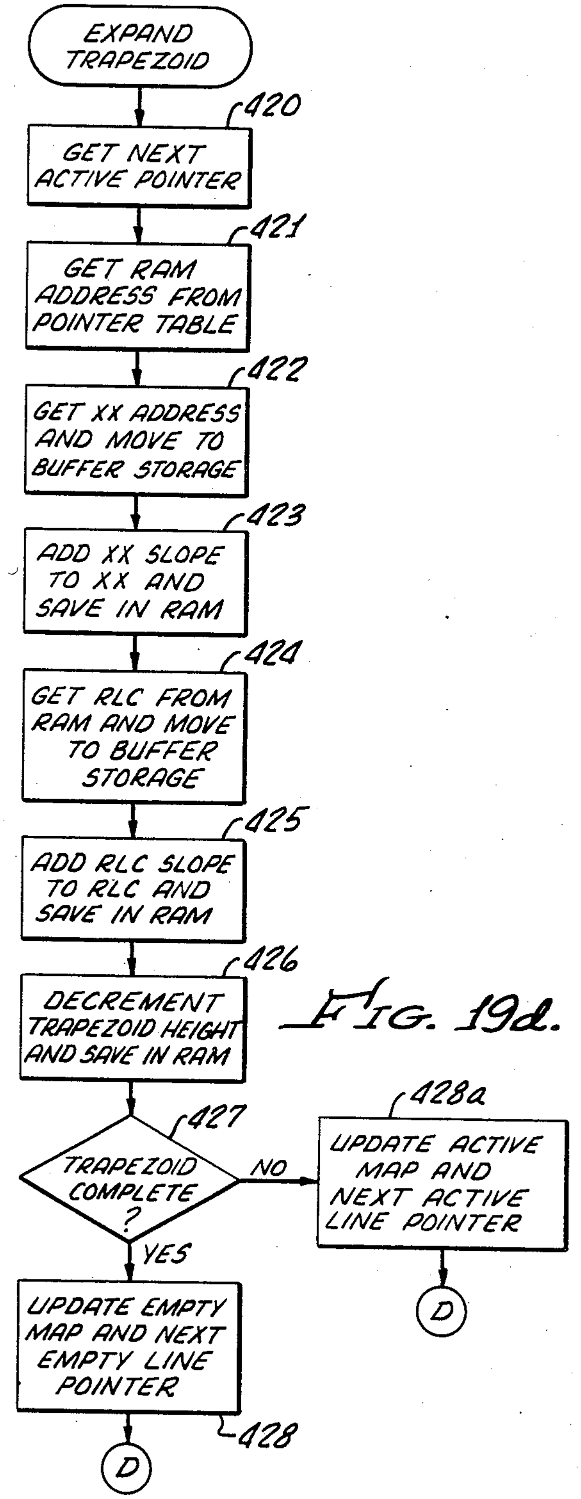

FIGS. 19*a* through 19*d* comprise flow charts generally illustrating the basic steps involved in reading and processing image data including trapezoid commands from the image data storage 364 of FIG. 17, under control of the processor/controller and the stored program. After completing a scan line and incrementing the scan line count, step 400 (FIG. 19*a*), it is determined, in step 402, whether or not the work buffer contents have been transferred to line assembly buffer 374. Then, step 403, it is determined whether or not the setting of the bit pattern in the trace work buffer 368 has been completed. Just as previously described in connection with steps 115 through step 120 of FIG. 12*a*, in step 404, the line number is extracted from storage and present line number is compared with line count, step 405, to determine whether or not a new line of image data is to be read, step 406 (FIG. 19*b*). Having determined, as previously described in connection with FIG. 12*a*, that the new line contains commands, the image data is inspected, step 407 (FIG. 19*b*), to determine whether or not there are any trace commands. Trace commands, step 408, are moved to the trace command storage FIFO (TCF), which, as previously described, may be a section of the library pointer table 360 (FIG. 17). It will be recalled that the commands are all grouped for a given line according to type—the trace commands being first, the trapezoid commands next, and all pattern commands last. Accordingly, trace commands will be read first in reading commands from the image data storage, and it is the trace work buffer that will be first employed.

After shifting all trace commands of the new line of image data to the temporary storage, the image data is inspected, step 409, to determine whether or not there are any new trapezoid commands. All new trapezoid commands are initialized.

Trapezoid initialization (FIG. 19*c*) comprises transfer of trapezoid commands from the image data on the new line to the trapezoid command storage library, RAM 380. All of the trapezoid command bytes, except the null byte 00 (which distinguishes trapezoid from pattern commands), are stored in the trapezoid command storage library with the aid of the trapezoid pointer table and map 382. This table has previously been set up to contain addresses SS SS of lines in the trapezoid command storage library, and a set of map bits which are employed just as previously described in connection with the map bits of the pattern processing table and map 62. In trapezoid initialization, the trapezoid pointer table address is obtained from the next empty line pointer 384, step 412, and this table is entered to obtain the RAM address SS SS, step 413, which is the address of an empty line in the RAM 380. The trapezoid command is moved to this address in the RAM, step 414, and the map bits of the table 382 are updated to the next active line, step 415. The next empty line pointer 384 and next active line pointer 386 are also updated, steps 416 and 417, so that the empty line pointer identifies an address of the table containing a RAM address SS SS that is empty, and the active line pointer identifies a line in the pointer table that contains the address SS SS of the line of the RAM 380 into which the last trapezoid command had been entered.

The system now returns to step 409 (FIG. 19*b*) to read additional trapezoid commands, if any, until all new trapezoid commands in this line of image data have been read and initialized. Then, if the trapezoid buffer bits have all been set (in the expansion of the immediately previous scan line), step 418, the trapezoid pointer table and map 382 is inspected to determine whether or not there are any such commands to be expanded, step 419. If so, the system begins the series of expansion steps illustrated in FIG. 19*d*.

In trapezoid expansion (FIG. 19*d*), the column address XX of a given scan line of the particular trapezoid is moved to temporary storage 392 (or to the RLC command processor, described below) for use in setting bits of the trapezoid work buffer. This column address is also updated by adding to it the slope of the left side of the trapezoid and returning the updated column address to the RAM location from which the earlier address had been extracted. Similarly, the trapezoid width RLC on this particular scan line is temporarily stored in the work buffer storage 390 and will be employed in conjunction with the column address to set the work buffer bit pattern. The trapezoid width is also updated by adding to it the delta slope (DD DD DD DD) and returning the updated width to the RAM location from which the earlier width had been extracted.

For trapezoid expansion the next active line pointer is obtained from scratch pad, step 420, and employed to obtain the RAM address, step 421, from the pointer table. The RAM address is employed to enter the RAM 380, obtain the column address XX of the trapezoid command and move this address to temporary buffer storage 392, step 422. The left side slope of this command is also added to the column address, step 423, in the processor controller. The width, or run length code of this column address, is also moved from the trapezoid command storage RAM to the temporary trapezoid command storage processor in step 424, and in step 425, the delta slope is added to the width and also saved in the RAM. The trapezoid height is decremented and the decremented value saved in the RAM, step 426. In step 427, it is determined whether or not this particular trapezoid has been completed, that is, has the height been decremented to zero. If so, the empty map bits of the pointer table and the next empty line pointer of the scratch pad are updated to indicate that this particular line in the trapezoid command storage library RAM 384 is now empty, step 428. The system then returns to point D to repeat step 419 and expand the next old trapezoid command.

If the trapezoid is not completed, the active map and next active line pointer are updated, step 428*a*, and the system returns to repeat step 419. Accordingly, all trapezoid commands are expanded, as indicated, after which in step 429 (FIG. 19*b*) the image data is inspected to determine whether or not there are any new pattern commands on this line. New pattern commands are handled just as previously described in a series of steps collectively indicated at 430, and as more specifically described in connection with FIG. 12.

Upon completion of the updating of the pattern processing table, the initialization for all commands—trace, trapezoid and pattern commands—has been completed, and the appropriate bit patterns may be set in the several work buffers. Accordingly, in steps 431, 432 and 433, setting of the bit patterns in each of the trace, pattern and trapezoid buffers is begun. Upon completion of the setting of the pattern work buffers (the pattern work buffers are the last to be modified), as determined in step 434, processing for a given scan line has been completed, the data are transferred from the work buffers to the line assembly buffers, and the next scan line is inspected to determine whether or not it contains any new commands.

RLC Command Processor

Establishment of the bit patterns or bit states in the work buffers, when performed according to conventional techniques, involves shifting of bits from the work buffer storage bit-by-bit, inspecting the bit and the corresponding command for the state of such bit, modifying the bit where required, and reading the bit back into its original position in the buffer. Thus, the addressing and the handling of data of the memory must be on a serial basis and requires recirculation of all bits, even though only one bit is to be modified. Furthermore, such previous arrangement requires that all commands be presorted, in sequence, according to memory location, in order to avoid multiple complete recirculations of the entire memory. Such required presorting according to location sequence also prevents use of overlapping commands. Arrangements previously described with respect to the command data format and processing not only eliminate the necessity for presorting of commands, according to memory location sequence, but also enable the use of commanded modification of mutually overlapping runs. The Group II command data (trapezoid command data or trace command data), as previously described, employs both a column address (XX XX) and a run length code, or data defining a pattern comprised of run length codes. No sorting of these commands is necessary. It is only necessary to group each type of command, that is, all trace commands, all trapezoid commands and all pattern commands, but within each group, commands need not be sorted according to column address. This is so, because each command carries its own column address, thereby enabling random access to the work buffers for expansion of run length codes. Any command having its own address can be used to control bits in a run or series of runs, regardless of memory location and independent of the location of other runs to be controlled. The trace and trapezoid commands each comprises an address, a run length code and a state or color bit that defines the state of the bits of a run. The pattern commands define a single address and a pattern which itself is defined by a sequence of mutually contiguous run length codes. The first of such sequence of contiguous pattern run length codes is located by the address of the pattern command. The start position of each subsequent contiguous run length code of a pattern is identified by adding the immediately prior run length code to its start address. Furthermore, because each run length code or each sequence of contiguous run length codes has its own column address, commands can identify overlapping runs of data bits, so that commands need not be previously analyzed to avoid such overlap.

Not only does the command format and work buffer arrangement provide improvements in speed of handling of the commands, but still further speed improvement results from the mode of control or modification of state of the bits in the work buffer storage (e.g., "expansion" of the RLC commands). Control of the bit states is considerably enhanced by use of an arrangement in which the contents of the work buffer storage are addressed on a word by word basis, with all bits of each word handled in parallel, rather than on a bit by bit basis. During such word addressing, all of the bits of the addressed word which are commanded to be modified are so modified simultaneously, and those bits which require no modification are recirculated simultaneously, unchanged for the single word. It will be readily appreciated that where a word length of sixteen bits is employed, a system for establishing states of the bits of the work buffer registers on a parallel word by word basis, handling all bits of a word at the same time, will be approximately sixteen times faster than a system employing bit by bit modification even in the extreme case where all bits of a line are to be modified. Where bits of less than all words in a line are to be modified the speed advantage is considerably greater, because, in the present invention, only those words having bits to be modified need be handled. Of course, where a word length of 32 bits or greater is employed, still greater improvement in speed is possible. The RLC expansion is performed by hardware and does not employ the controller processor for primary control of expansion. This allows even more improvement in expansion time.

A presently preferred embodiment of a word by word RLC processor incorporating principles of one aspect of the present invention is organized as broadly indicated in FIG. 20. A work buffer memory or RAM 520 has its contents read out one word at a time, handling all sixteen bits of each word in parallel, and recirculated back to the same RAM addresses via a sixteen bit word length multiplexer 521. The multiplexer simultaneously passes all bits of a memory word, either without modification or as modified by a "color" bit (e.g., logical 1 or 0). The color bit is fed to the multiplexer on a line 522 from the RLC command which is provided, together with the column address command, from the command generator, generally indicated at 523. The command generator is formed by the system components previously described as providing the column address and RLC commands, including the pattern data storage library, the temporary storage area of the library pointer table (for storage of trace commands), and the trapezoid command storage library. The commands are fed through storage latches and counters 524 (including an RLC word down counter and an address word up counter), which cooperate with an arithmetic logic unit 525, to provide control inputs to a bit mask generator PROM 526. PROM 526 sends a set of signals to the several multiplexer control inputs that select either of the two inputs to the multiplexer for recirculation back to the RAM. Thus, the multiplexer, under control of the PROM, will return to the RAM either the RAM data unchanged or the RAM data as modified by the color input. As previously described, after establishment of the states of all bits to be modified in a complete line of data in the work buffer RAM, this data, together with data from the other work buffers (not shown in FIG. 20), are fed out through the described logical circuitry to the line assembly buffers 527. A significant advantage of this RLC command system is that it need only establish the state of those bits that are to be changed, and no action is needed for those bits of which the state is not affected by the RLC command.

It will be recalled that the system provides commands (the run length code or RLC) that define the length of a run of consecutive bits of like states, including a color code that defines the state of the bits of the run (the most significant bit of the run length code is the color code), and the column address of the beginning of the run. The column address, which is the XX XX of the several commands, is a fifteen bit address in which the four least significant bits, bits 0 through 3 (ADR 0–3), define the bit address within the memory word of the first bit of a run and wherein the next eleven most significant bits, bits 4 through 14, define the address of the memory word containing the start of a run. The most significant bit is not used for word address but is used to distinguish additive and subtractive functions. For traces and trapezoids, each command fed to the RLC command processor from the command generator includes a run length code, a color code and a work buffer memory address for each run length code. For the pattern commands, there is only one address for a series of consecutive run length codes which define mutually contiguous runs of bits, each run having its own color code and each but the first starting at the bit that immediately follows the last bit of the preceding run. For expansion of trace and trapezoid commands, the RLC command processor merely employs the command address to determine the start of the run of bits to be controlled. For pattern commands, the command address is employed to determine the start of the first of the series of contiguous runs of bits and, by effectively adding each run length to the previous start address, the RLC command processor itself determines the start position of each run after the first. Accordingly, only a single address is needed for a command embodying many contiguous runs.

Having a command defining a run length and the start of such run, there are three possible cases relating run length to memory words, as illustrated in FIG. 21. In the first case, as shown in FIG. 21(*a*), the entire run of bits to be controlled is contained within a single memory word. Thus, the start address may be at a bit denoted by reference numeral 500, in a single word indicated at 501, with a run ending at a point 502 in the same word. The run length is represented by the shaded area, denoted RLC. A second case useful for analysis of bit state control on a word by word basis, is illustrated in FIG. 21(*b*) wherein a run of bits extends over two consecutive memory words 503, 504, starting at point 505 of a first word 503, terminating at point 506 of the immediately adjacent following word 504, and extending beyond the word boundary 507 between the two words.

The third case is illustrated in FIG. 21(*c*) in which the run of bits to be established starts at bit 508 of a first word 509 and continues through a number of complete intermediate words 510*a* through 510*n*, terminating at a bit 511 of a final word 512.

In establishing bit states on a word by word basis, there is little problem in controlling the states of bits of those words that are to be completely of one "color" (e.g., bit state, 0 or 1). However, for those words of the work buffer memory in which only some of the bits are to be modified, certain unique techniques must be employed.

Intermediate words 510*a* through 510*n* in which all bits are set to a given color can be handled directly. The initial and final words of a run, such as words 509 and 512, are handled differently. A set of logical conditions for handling all words, whether to be partly or fully modified, can be set forth in a truth table.

Three signals are employed in establishing the truth table, which specifies certain of the operations employed in setting bit patterns into the buffer memories. These signals, which may be termed state signals, are First Word (indicating the memory word in which a run starts), Last Word (indicating the last word of a run), and First Word Carry, which occurs (only during First Word) when the arithmetic sum of the least significant four bits, RLC 0-3 of the run length code and the bit position address, ADR 0-3 (the least significant four bits of the column address), exceeds one word length (16 bits in the illustrated example). The run length word residual is the remainder resulting from a division of the run length code by word length. For a sixteen bit word, the run length word residual is defined by the four least significant bits. An up counter is employed to keep track of memory words, being incremented upon recirculation of each word of the buffer memory, and a down counter is employed to keep track of the words of a run length code, being decremented upon the handling of bits of one word of the run length code. A new set of state signals is generated each time a word is recirculated from the work buffer memory. The truth table is as follows:

| | A | B | C | |
|---|---|---|---|---|
| 1 | 0 | 0 | 0 | |
| 2 | 1 | 0 | 0 | |
| | 0 | 1 | 0 | Illegal |
| 3 | 1 | 1 | 0 | |
| 4 | 0 | 0 | 1 | |
| 5 | 1 | 0 | 1 | |
| | 0 | 1 | 1 | Illegal |
| 6 | 1 | 1 | 1 | |

In the truth table, A is First Word, B is First Word Carry, and C is Last Word. First Word is set when the column address and RLC commands are received from the command generator and loaded into the RLC command processor. First Word is cleared by the first write pulse to the work buffer memory or RAM (when the first recirculated memory word is written back into memory). The First Word Carry is the carry output from the above-mentioned arithmetic summation and is valid only during First Word. Last Word is generated when bits 4, 5 and 6 of the run length code down counter are all zero, independent of First Word. Because First Word Carry is valid only in the presence of a First Word, those states of the truth table having a First Word Carry, but no First Word are not valid. The truth tables states are as follows:

In state 1 there is neither First Word, First Word Carry, nor Last Word. This means that the system is processing intermediate memory words, such as words 510*a* through 510*n*, in which all bits are to be modified. Thus, the system will modify all bits of a memory word handled in state 1, regardless of bit position or RLC, and then increment the word address and decrement the RLC word count.

State 2 indicates the existence of a First Word without either Carry or Last Word. In this case, the system modifies all bits in the memory word starting at the bit position indicated by the bit position address. Word address is incremented, and the RLC word count is decremented. An updated or new bit position is obtained by adding the four least significant bits of the RLC (RLC 0-3) and the four bits of the bit position address (ADR 0-3). The sum is saved.

In state 3 there is a First Word, First Word Carry, but no Last Word. All bits in the memory word starting at the designated bit position address are modified and the word address is incremented, but the RLC word count is not decremented. In state 3 the First Word Carry indicates that the sum of the bit position address (ADR 0-3) and the run length word residual (RLC 0-3) is greater than 16. An updated bit position address is again created by summing RLC 0-3 and bit position address ADR 0-3 and saving the sum.

State 4 occurs when there is a Last Word, but neither a First Word nor First Word Carry. This is one of two terminal states where the end of a run of bits occurs in the memory word being handled. In state 4 all bits in the word up to, but not including, the updated bit position are modified. The updated bit position had been obtained in a prior step by the summation of RLC 0-3 and ADR 0-3. In this terminal state 4 there is no change in word address or RLC word count.

State 5 is another terminal state. It corresponds to case 1 of FIG. 21(*a*), in which there is First Word and Last Word, but no First Word Carry. All bits are modified starting at the bit address for the full length of the run length code. There is no change in word address or RLC word count. An updated bit position is created by summation of RLC 0-3 and ADR 0-3 and saved.

State 6 corresponds to case 2 of FIG. 21(*d*), having a First Word and Last Word and a First Word Carry. In this state, the run goes across the word boundary into the next word, but because there is a last word, the run will terminate in the second word. In state 6 all bits in the first memory word are modified, starting at the bit position address, regardless of the length of the RLC. The word address is incremented, but there is no change in the RLC count. A new bit position address is created by adding RLC 0-3 and ADR 0-3 saving the result.

As previously indicated, states 4 and 5 are terminal states denoting the end of a run, whereas, states 1, 2, 3 and 6 are intermediate states. In the described system, state 4 will always follow states 1, 2 or 6, state 1 will always follow either of states 2 and 3, and state 4 will always follow state 1 and state 6.

Each trace of trapezoid command has a column address and a run length code and is fed to an individual trace or trapezoid RLC command processor which then expands the run length code and, after all commands on a given scan line have been expanded, transfers data, word-by-word, via sixteen bit buses, from the work buffer to the line assembly buffers. Each pattern command to a pattern RLC command processor has a single address and a number of consecutive run length codes. Each such command is fed to the RLC command processor one run length code at a time, with only the first of these accompanied by a start address. All RLC command processors are nearly identical, requiring only minor changes, to be described below, to distinguish trace command processors (which, uniquely, are not cleared) and additive and subtractive processors. The expansion carried out by the RLC command processor defines the updated address of the start of the next contiguous run and stores this in the address latches. Accordingly, for a pattern RLC command processor where no address accompanies the second and subsequent run length codes, the already stored updated address is used to identify start of such subsequent run. However, each trace and trapezoid command includes its own address, and such address is entered into the address latches when the run length code is entered into the RLC latches. Therefore, the same RLC command processor arrangement operates for either an RLC command having its own address or for a series of RLC commands defining contiguous runs but having an address for only the first run.

Figure 22:
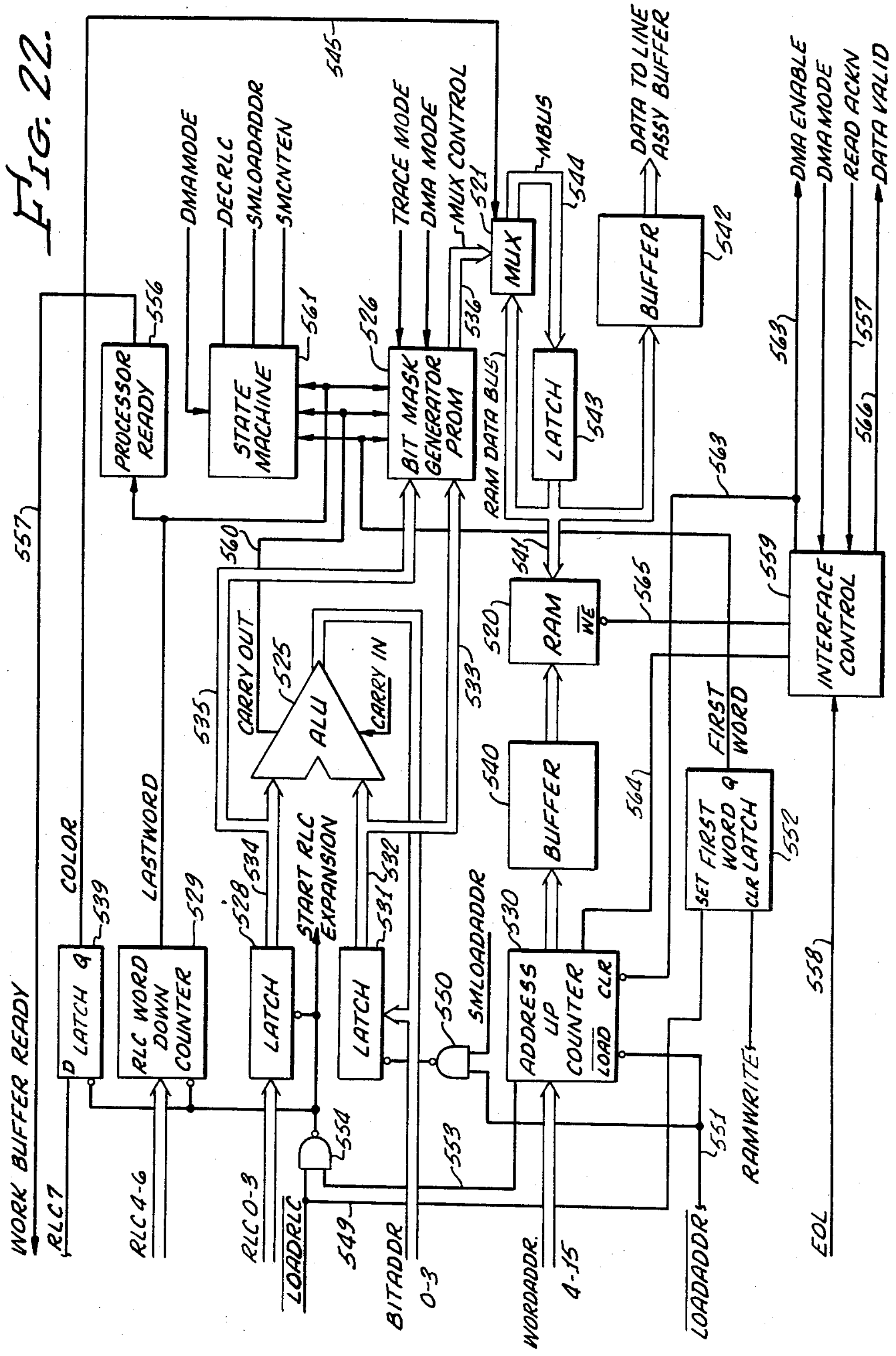
FIG. 22 is a block diagram of the run length code command processor.

A presently preferred form of an RLC command processor is shown in the block diagram of FIG. 22. Bits 0-3 of the run length code command are fed into a latch 528, and bits 4 through 6 of the run length code command are fed into an RLC word down counter 529, which includes a latch for temporary storage of the command bits. The color bit, the most significant bit, RLC 7, is fed into a color latch 539. When the RLC word down counter, which is decremented in various states as determined by the truth table, reaches zero, it produces the Last Word state signal.

The column address includes twelve most significant bits 4 through 15, of which all but the most significant identify the memory word in which the starting bit occurs. These bits are fed to an address up counter 530 which includes temporary bit storage latches. The bit position address, which is formed by the four least significant bits of the column address, is fed to a bit address latch 531 and also, via a four-bit bus 532, 533, to the bit mask generator PROM 526 and the arithmetic logic unit (ALU) 525.

The output of RLC 0-3 and ADR 0-3 latches 528 and 531 are both fed to ALU 525 which sums its two inputs and feeds the result back into the bit position storage latch 531. Outputs of the bit position latch 531 and RLC run length word residual latch 528 are also fed directly via four-bit buses 534, 535, and by bus 533 directly to the bit mask generator PROM 526. The latter comprises, in effect, a logic tree which provides a number of output lines forming a full word length multiplexer control bus 536, each line having a state determined by the inputs to the PROM 526 on buses 533 and 535 from the latches 531 and 528 and the state signal inputs, First Word, First Word Carry, and Last Word.

The bit position address is employed to identify the first bit line of the sixteen bit mask generator PROM output lines that control the multiplexer. In effect, the RLC 0-3 then determines how many of the succeeding lines of the PROM output are to control. For example, with a bit address of (decimal) 5 and an RLC 0-3 equal to (decimal) 3, PROM output lines 5, 6 and 7 would control (being high, for example). With a bit address of 5 and an RLC of 12, PROM output lines 5 through 15 control. The same lines would control with a bit address of 5 and a RLC 0-3 of 14, since bits do not control beyond the end of the word or beyond the last of the output lines of the PROM. For an input of First Word and Last Word but no First Word Carry, only those output lines of the PROM are controlled starting from the bit position of the bit address for a number of bits determined by the run length word residual. Where all three of the First Word, First Word Carry and Last Word are present, lines of the PROM are controlled only to the last PROM output line. Where there is a Last Word but no First Word or First Word Carry, the PROM is arranged so that all of the output lines control, from its first output line up to, but not including, the output line identified by the bit position address.

The work buffer memory or RAM 520 is addressed by means of an address driver buffer 540 which receives an eleven bit word address from the address up counter 530 for selection of a particular memory word of the RAM. The twelfth bit of the word address is employed to distinguish between additive and subtractive commands (as will be described below). Words stored in RAM 520 are fed out one word at a time (all sixteen bits in parallel) on a sixteen line RAM data bus 541 which feeds both to an RLC command processor output buffer 542, for connection to the logical circuitry feeding the line assembly buffer 527 (FIG. 20), and also to one side of the multiplexer 521. The color code is fed to the other side of the multiplexer via line 545 from the output of the color code latch 539. Under control of the signals provided from the PROM on a sixteen line bus 536, the multiplexer feeds either the color code or the RAM data via a sixteen bit MBUS 544 to a RAM data latch 543 from which the data is passed back to RAM data bus 541 and RAM 520 for storage in the same memory location from which this word was extracted.

In order to permit overlapping of trapezoids or patterns, the writing of zero's into trapezoid work buffer RAMs is inhibited during data expansion. This prevents the removal of one's entered at given bit positions according to a first command, if a later command for the same image data line has zero's in the same bit positions.

A LOADRLC command on line 549 from the command generator sets a first word latch or flip-flop 552. For a pattern, multiple LOADRLC commands are sent from the command generator without a corresponding address, as previously described. Flip-flop 552 is cleared by a RAM write command, which occurs as soon as the first recirculated word is written back into the RAM. A load address command on a line 551 allows the address up counter 530 to load the word address from the command generator and provides one input to a gate 550 having a second input in the form of a load new address command (SMLOADADR). The output of the gate 550 enables the bit position address latch 531 to receive either the bit position from the command generator or the updated bit position from ALU 525.

The state signals Last Word, which occurs when the RLC word counter has been decremented to zero, First Word, from first word latch 552, and First Word Carry, derived from the carry output on a line 560 of the arithmetic logic unit 525, collectively define the truth table states and are fed to control both the bit mask generator PROM 526 and the operation of a state machine 561 that controls the counters. In response to the truth table state signals, First Word, First Word Carry, and Last Word, state machine 561 provides output commands to decrement the RLC down counter (DECRLC), to increment the address up counter (SMCNTEN), and to store the updated address (SMLOADADDR) calculated by ALU 525.

The most significant bit of the address from address up counter 530 is used to distinguish between additive and subtractive processors, as described below, and is essentially a load enable signal. It is fed via a line 553 to enable a coincidence gate 554 which receives a signal from the command generator to load the RLC. Gate 554, accordingly, signals each of the RLC 0–3 latch 528, the RLC word down counter 529, and the color code latch 539 to latch or actually store the information presented at the respective inputs. A signal from gate 554 also provides a signal to start the RLC expansion.

Commands from the command generator are sent to the RLC command processor input latches and expanded, one at a time. After each command has been processed, the RLC word down counter 529 sends the Last Word to a processor ready circuit 556 to feed a signal via line 557 back to the command generator, indicating that the work buffer is ready for the next command. When all commands for a given scan line have been expanded, the command generator sends an end of line (EOL) signal on line 558 to an interface control 559. Control 559 sends a DMAENABLE signal to the line assembly buffers on line 563 thereby to signal that RLC expansion is done and that transfer of data directly from this work buffer memory to the line assembly buffers may begin. In the system illustrated in FIG. 17, each of the five work buffers include its own RLC command processor. DMAENABLE signals from all work buffers are ANDed so that transfer of data from the work buffers to the line assembly buffers begins upon receipt of DMAENABLE from all work buffers.

Upon receipt of the DMAENABLE signal from all work buffers, the line assembly buffers send back a DMAMODE signal to the control 559. The address counters of RAM 520 are cleared by DMAENABLE, line 563, in preparation for transferring the first memory word from the RAM through output buffer 542 to the line assembly buffer. Control 559 sends a DATAVALID signal via line 566 to the line assembly buffer to signal that the line assembly buffer may now latch the RAM data from output buffer 542. Data from the output buffer 542 is latched by the line assembly buffer upon receipt of the DATAVALID signal, but controller 559 waits until the receipt of a read acknowledge (READACKN) signal on a line 557 from the line assembly buffer, indicating that data from all of the RLC command processors (where more than one work buffer is employed) have been received and latched. The read acknowledge signal causes the controller 559 to allow the address counter to be incremented, via a line 564, and the next word from the RAM to be read, line 565. Before the address counter is incremented, the word in the RAM is cleared for all cases except a trace command.

Figure 23A:
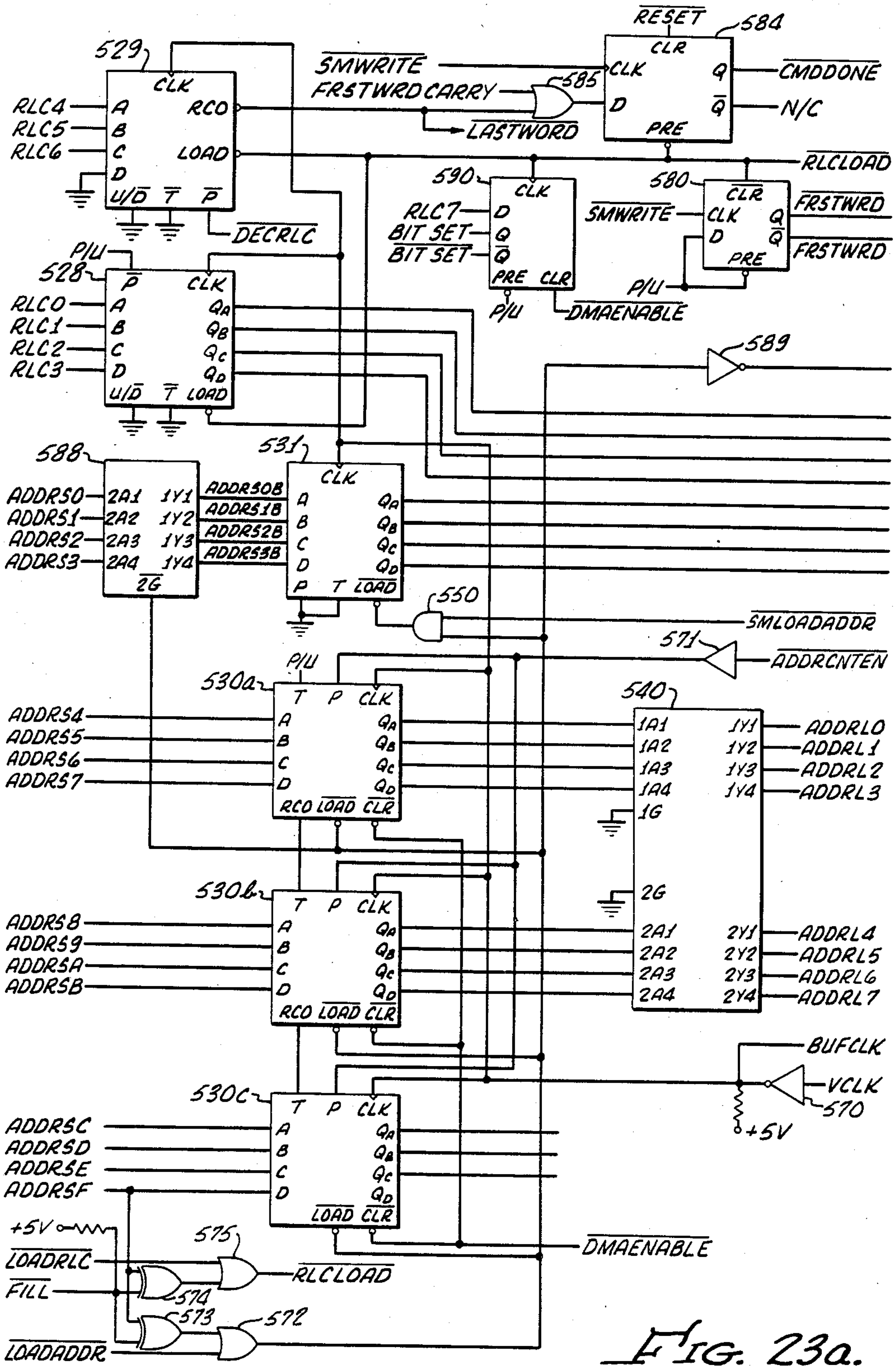
Figure 23B:
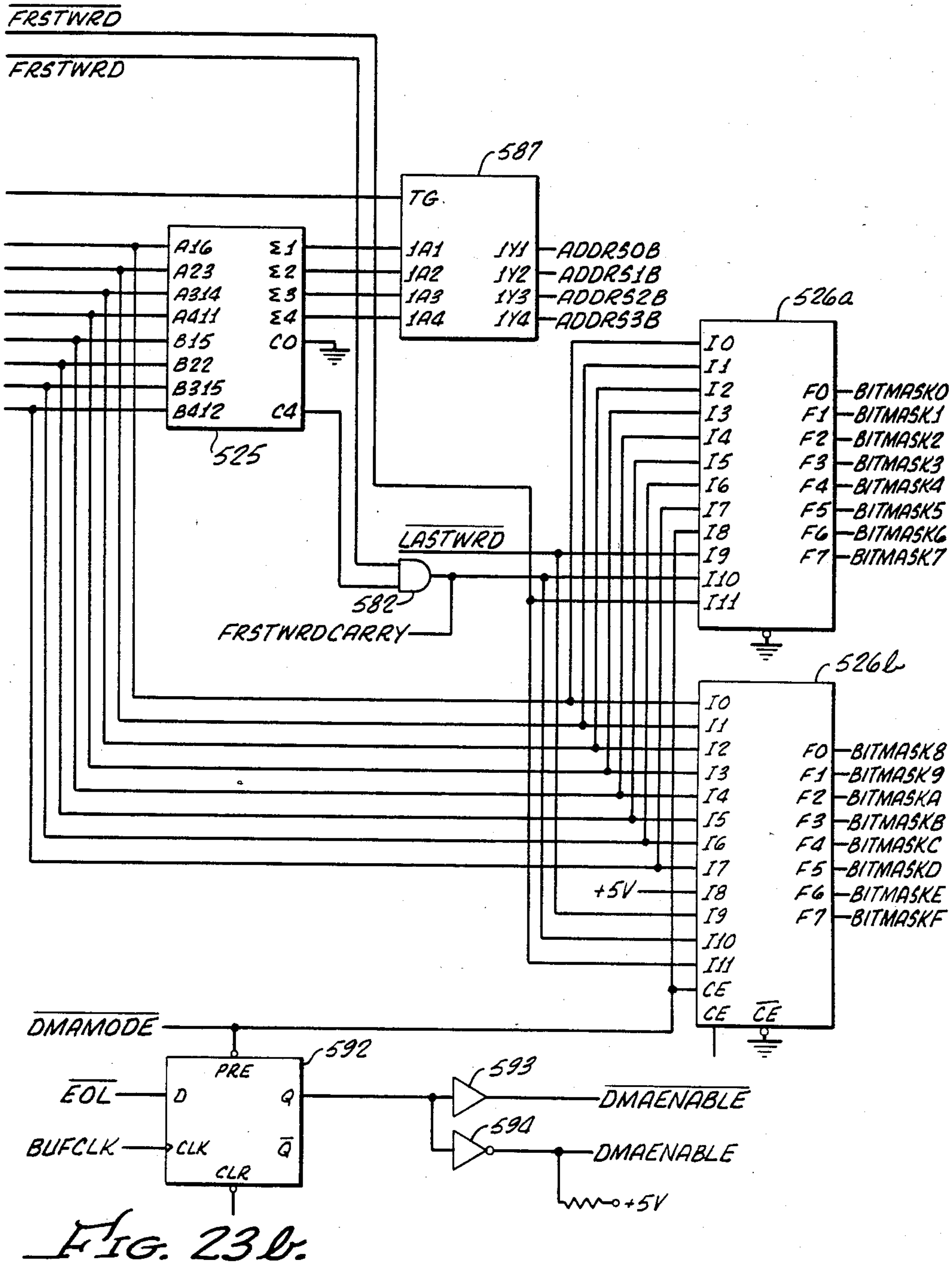

Illustrated in FIGS. 23, 24, 25, 26, 27 and 28 are circuit diagrams of portions of the RLC command processor shown in the block diagram of FIG. 22. FIG. 23 is made up of FIGS. 23*a* and 23*b* placed side by side with FIG. 23*a* to the left. The several input command latches and counters, designated by the same reference numerals employed in FIG. 22, include the RLC word down counter 529, RLC 0–3 bit latch 528, the bit position address latch 531, and address up counter and latches 530*a*, 530*b* and 530*c*. Active low logic is employed. The counters and latches are clocked from a signal fed from an inverter 570 that generates the buffer clock signal (BUFCLK). Address counter 530 is enabled from address counter enable signal (ADDRCNTEN) fed to its P input via an amplifier 571. Addresses are loaded into the address latches and counter under control of a load address signal LOADADDR fed from the command generator via a gate 572 which also receives a signal from an exclusive OR gate 573 having inputs from a FILL signal and the most significant bit of the address. The inputs to exclusive OR gate 573 are also fed via an exclusive OR gate 574 to enable a gate 575 to pass the RLCLOAD from the command generator and to provide an internal RLCLOAD signal. The RLCLOAD signal starts the processor operation.

The most significant bit of the word address is used to identify a command as additive or subtractive so that it will be entered into the appropriate additive or subtractive buffer only. Exclusive OR gates 573, 574 are used to enable each RLC command processor and to distinguish between additive and subtractive commands. The FILL input to gates 573, 574 is a fixed high for an additive buffer and a fixed low for a subtractive buffer. Accordingly, a high in the most significant bit of the word address will be passed through gates 573 and 574 to enable gates 572, 575 only for those buffers in which FILL is high and vice versa. The address counters are cleared by the DMAENABLE signal, as previously described. Outputs of the RLC 0–3 latch 528 and ADR 0–3 latch 531 (FIG. 23*a*) are fed to arithmetic logic unit 525 (FIG. 23*b*) and also to the bit mask generator PROM, formed of chips 526*a* and 526*b*. Outputs of the bit mask generator PROM 526*a* and 526*b* are provided on 16 lines as BITMASK 0–F in the hexadecimal system employed in the exemplary embodiment.

The bit mask generator PROM also receives the three state signal inputs, Last Word being provided from a ripple carry (RCO) of the RLC word down counter 529, First Word being provided from the output of a first word flip-flop 580, which is cleared by the RLCLOAD command from gate 575, and clocked by a state machine write (SMWRITE) command from state machine 561. First Word Carry is provided by the output of a coincidence gate 582 (FIG. 23*b*) which receives a first input from the carry output of arithmetic logic unit 525 and First Word from flip-flop 580.

The command done (CMDDONE) or work buffer ready signal is provided from the output of a flip-flop 584 that is clocked from the state machine write signal provided from the state machine (see FIG. 26) and reset by the output of a gate 585 in response to First Word Carry (low) from gate 582, and Last Word (low) from the RLC word down counter 529. Thus, the command done flip-flop produces the CMDDONE output only in one of the two terminal states 4 and 5, where there is a Last Word but no First Word Carry.

The color signal to the multiplexer is formed by a BITSET signal from a flip-flop 590 that is clocked by RLCLOAD, cleared by DMA ENABLE, and set by the most significant bit of RLC, the color code.

The output of arithmetic unit 525, which sums the least significant bits of the RLC and the bit address, is to be saved in bit position address latch 531 under certain conditions, as previously described. To this end a buffer 587 (FIG. 23*b*), which acts as a digital switch, cooperates with a corresponding buffer 588 (FIG. 23*a*) to collectively act as a multiplexer so as to feed to the inputs A, B, C, D of bit position address latch 531 either the address bits resulting from the arithmetic summation of the logic unit 525 or the address bits of the bit position address command from the command generator. Thus, the 1Y1-1Y4 outputs of both buffers 587, 588 are connected to the A, B, C, D inputs, respectively, of latch 531. Bit position address latch 531 is loaded either by the load address command fed via gate 572 when initially loading commands into the RLC command processor or, during the processing of a command by the state machine, by the SMLOADADDR signal from the state machine, both commands being fed to the load input of latch 531 via a gate 550 which acts as an OR gate with the active low logic. The initial LOADADDR signal from gate 572 is fed with mutually exclusive states to the buffer 588 and, through an inverter 589, to the buffer 587 so that one or the other of these buffers will transfer bit position to latch 531. Buffer 588 is enabled when loading an address command from the command generator to cause latch 531 to store the commanded bit position for the first word modification, whereas buffer 587 is enabled for subsequent words. A DMA enable flip-flop 592 (FIG. 23*b*) is preset by the DMAMODE signal from the line assembly buffer, clocked by the buffer clock signal, and set by the end of line (EOL) signal from the processor controller which signals that transfer of RLC commands from the processor controller to the work buffer is complete. This flip-flop provides the DMAENABLE signal and its inverse from gates 594 and 593. The DMAMODE signal is also fed to the bit mask generator PROM 526*a* and 526*b* to disable these during transfer of data from the work buffers to the line assembly buffers.

Figure 24:
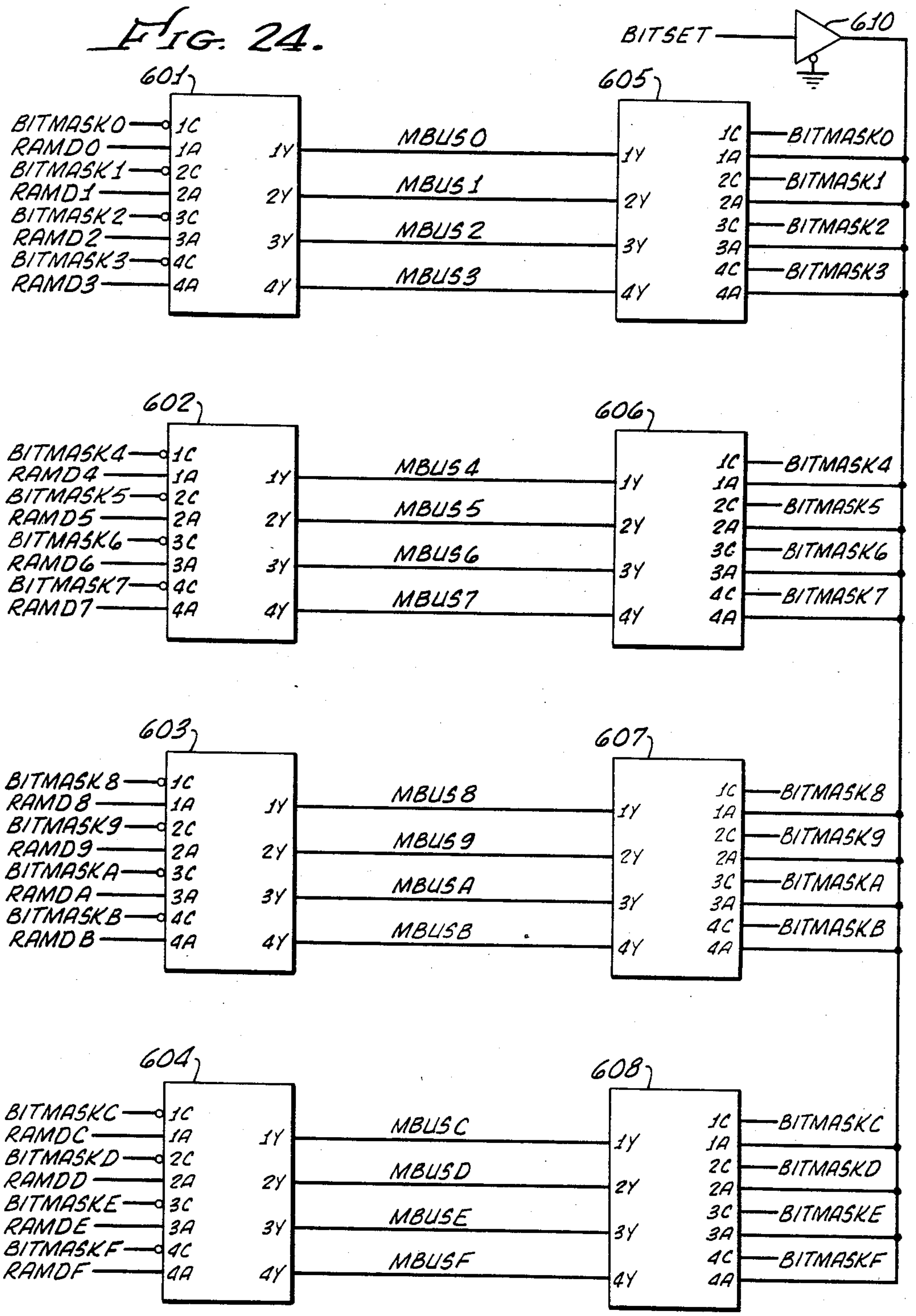

FIG. 24 illustrates circuitry of the multiplexer, which is basically a switching device formed of first and second banks of switches, with each pair of corresponding switches of the two banks having a common output to the MBUS and latch 543 (FIG. 22). Thus, a first bank of multiplexer switches includes switch groups 601, 602, 603, and 604 having a first set of sixteen control inputs, BITMASK 0-F, from the bit mask generator PROM 526*a* and 526*b* and a second set of sixteen data inputs, RAMD 0-F, from the RAM data bus 541 (FIG. 22). A second bank of multiplexer switch groups 605, 606, 607 and 608 has a first set of sixteen control inputs from the bit mask outputs 0 through F and a second set of data inputs, all from the color code provided from an amplifier 610 having a BITSET input provided from the output of the color flip-flop 590 (FIG. 23*a*). Corresponding switches of the two banks have common output leads to the MBUS 0-F. These switches have individual enable/disable control lines so that each data bit can be controlled individually. When a BITMASK input is high, the corresponding switch (buffer) of banks 605-608 is enabled so as to rout BITSET (color) to MBUS. Banks 601-604 are disabled when BITMASK is high. When BITMASK is low, the corresponding switch (buffer) from banks 601-604 is enabled to rout RAMDATA to MBUS. The multiplexer modifies the state of only those bits selected by the RLC command and merely passes, unchanged, all other bits.

As shown in FIG. 25, the RAM data latch 543 of FIG. 22 comprises a pair of chips 543*a* and 543*b* receiving the sixteen inputs from the MBUS lines 0 through F and providing the sixteen outputs to the RAM data bus 541, under control of the RAMWRITE signal fed to clock the latch through an inverter 612, such that the MBUS data is latched and enabled during the command to write the data back into the RAM. The RAM memory chips are always in read condition in the absence of an active (low) RAMWRITE signal. When the latter goes active (low) RAM DATA BUS 541 becomes an input port, and latches 543*a* and 543*b* are enabled to place their contents on the RAM DATA BUS at the same time that the MBUS data is transferred to the latches. Therefore, when RAMWRITE goes low, contents of the MBUS are transferred into the RAM where the data is latched upon termination (rising edge) of the RAMWRITE signal.

Figure 26:
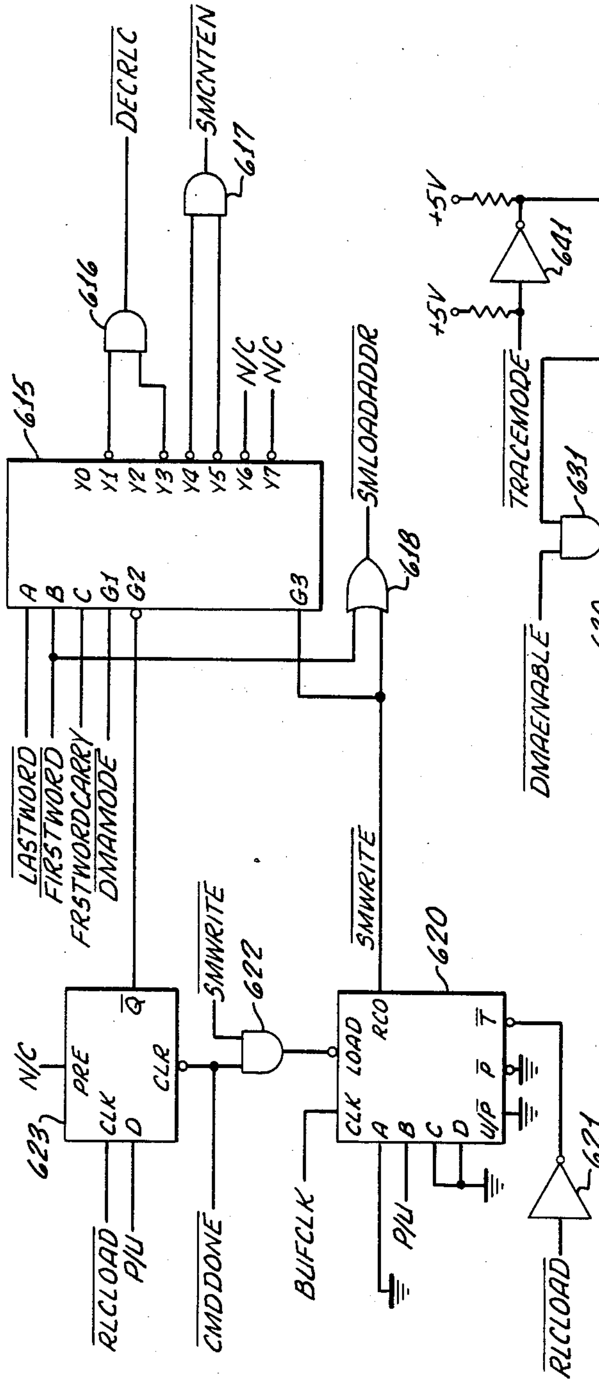

State machine 561, which controls the counters during data expansion, is shown in FIG. 26. The state machine comprises a decoder 615 having inputs Last Word, First Word, First Word Carry and DMAMODE which are connected to this decoder to provide outputs according to the six states of the truth table. The outputs are decrement RLC (DECRLC) from a gate 616 and address counter enable (SMCNTEN) from a gate 617. The state machine also includes an OR gate 618 providing a load updated address (SMLOADADDR) output and having a first input from First Word and a second input from the write signal (SMWRITE). The SMWRITE signal is the ripple carry output of a modulo three ring counter 620. The load input to set counter 620 is provided from a coincidence gate 622 having inputs SMWRITE and CMDDONE, from flip-flop 584 (FIG. 23*a*). A start flip-flop 623, which is cleared by CMDDONE, set by a fixed signal P/U and clocked from the RLCLOAD, provides a start input to the state machine decoder 615. The SMWRITE is fed to state machine decoder chip 615 to enable its outputs on the third count of the ring counter, according to system timing described below and illustrated in FIGS. 29, 30 and 31.

Figure 27:
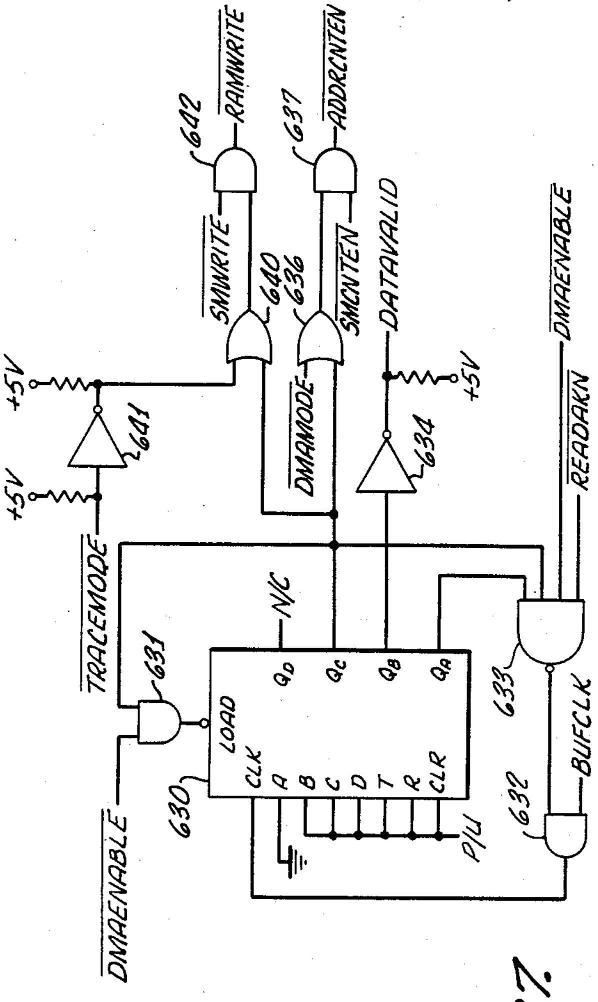

Illustrated in FIG. 27 is the interface control circuit, broadly indicated at 559 in FIG. 22. This state machine circuit assumes control, after completion of data expansion, to control work buffer memory clearing (for trapezoid and pattern) and transfer of expanded data, word-by-word, from the RLC command processor to the line assembly buffers. A shift register 630 has its A input grounded and other inputs, including B and C, connected to a fixed high, P/U. The shift register is loaded by the output of a coincidence gate 631 having inputs from the DMAENABLE and its own output $Q_c$. It is clocked from the output of an AND gate 632 having as a first input the buffer clock, and, as a second input, the output of a gate circuit 633 having inputs $Q_a$, $Q_c$, DMAENABLE and READACKN. When register 630 is loaded, output $Q_a$ is low and outputs $Q_b$ and $Q_c$ are both high. Output $Q_a$ is simply recycled back to the clock input to provide pass-through time to allow stabilization of data. $Q_b$ is fed through an inverter 634 to provide the DATAVALID signal. Output $Q_c$ is fed to a coincidence gate 636 having DMAMODE as its second input, and providing an output to an OR gate 637 which has as its second input the SMCNTEN signal from the data expansion state machine. Gate 637 provides as its output the ADDRCNTEN signal to amplifier 571 (FIG. 23*a*) to enable the address up counter, upon receipt of READACKN in DMAMODE or SMCNTEN in data expansion mode. The $Q_c$ output is also fed as one input to an AND gate 640, which also receives a fixed level TRACEMODE signal via an inverter 641, and the output of gate 640 provides a first input to an OR gate 642 having a second input from the SMWRITE signal and providing at its output the RAMWRITE signal. When the TRACEMODE signal is grounded (as it is for a trace RLC command processor), gate 642 will not produce the RAMWRITE signal that clears the trapezoid and pattern work buffers. The TRACEMODE signal is high for the trapezoid and pattern work buffers. The SMWRITE signal generates the RAMWRITE signal (for all work buffers) during data expansion, whereas the $Q_c$ output of the shift register 630 generates the RAMWRITE signal (for pattern and trapezoid work buffers only) during data transfer (and clearing) to the line assembly buffers.

DMAENABLE loads shifts register 631 to set $Q_a$ low and $Q_b$ and $Q_c$ high, and the shift register remains in this state until DMAENABLE is removed. When the line assembly buffer receives the DMAENABLE signal from all RLC command processors, it returns the DMAMODE signal to clear the DMAENABLE. Removal of the DMAENABLE signal allows shift register 630 to start counting, going from its count $Q_a$ to $Q_b$. The shift register stops and waits at $Q_b$ until it receives the READACKN signal, and then goes to $Q_c$. When $Q_b$ is low, $Q_a$ is high, DMAENABLE is high (inactive) and READACKN is high (inactive), because the line assembly buffer has not yet acknowledged receipt of the data, and gate 634 provides the DATAVALID signal. The shift register 630 stays in its second count, with $Q_b$ low, and when READACKN goes low (active), the shift register is clocked and $Q_c$ goes low to produce the RAMWRITE signal and ADDRCNTEN to allow the address counter to be incremented at the next buffer clock when the RAMWRITE is removed. At the next buffer clock, the address is incremented, and the ADDRCNTEN and RAMWRITE are removed.

DMAMODE from the line assembly buffers is fed to the PROM 526*a*, 526*b* (FIG. 23*b*) to disable its outputs during data transfer to the line assembly buffers. DMAENABLE has previously cleared the color flip-flop 590 (FIG. 23*a*) so that the multiplexer will pass only zeros and therefore will clear all bits of the addressed RAM word when RAMWRITE is enabled. Therefore, for all but the trace RLC command processors, each word location of the work buffer is cleared during transfer of data from such one word location to the line assembly buffers. For still greater speed, output buffer 542 (FIG. 22) may be replaced by a switchable controlled latch which will temporarily store each data word while waiting for READACKN from the line assembly buffers. Accordingly, the work buffer word location may be cleared during transfer of expanded data to the line assembly buffers, and while waiting for the READACKN and the third cycle of shift register 630, to thereby eliminate time involved with the READACKN waiting.

The circuit shown in FIG. 28 inhibits writing zero's into pattern and trapezoid work buffers. BUFRDY, fed as a first input to an OR gate 650, is used to deselect (disable writing into) the RAM (by the gate output RAMSEL) when the buffer is ready to accept new RLC commands but is not actually processing them. This saves power, because the RAM uses less power when deselected, and several of the work buffers may be idle while a number of commands are being directed to a single work buffer. The RAM is also disabled by a second input to gate 650 from a three input coincidence gate 652 having inputs BITSET cleared, absence of DMAMODE and absence of TRACEMODE. Inhibiting of writing zero's into the pattern and trapezoid work buffer RAMS during data expansion allows the overlay of patterns upon patterns and trapezoids upon trapezoids in a single work buffer. If there are overlapping run length codes in the image data of one scan line of a work buffer, the first command to be expanded may have one's in a series of bit positions. A later RLC command for the same work buffer and data line may command zero's in the same bit positions, but if the overlay is to be accomplished, these zero's must not affect the previously entered one's. Accordingly, writing of zero's into trapezoid and pattern work buffers is inhibited via gate 652 during data expansion. Of course, zero's need not be written because pattern and trapezoid work buffers are cleared (all bits set to zero) before expansion of commands on any new scan line.

The various circuits of FIGS. 23 through 27 are standard TTL chips made by several manufacturers, including Texas Instruments. The several chips are identified as follows:

| Reference Numeral | Part Description |
|---|---|
| 529, 528, 620 | 74 LS169 |
| 531, 530a, 530b, 530c | 74 LS161 |
| 540, 587, 588 | 74 LS244 |
| 580, 584, 590, 592, 623 | 74 LS74 |
| 525 | 74 LS283 |
| 615 | 74 S138 |
| 630 | 74 S195 |
| 601-604 | 74 LS125 |
| 605-608 | 74 LS126 |
| 543a, 543b | 74 LS374 |
| 520 | 2148H-3 |
| 542 | 74 S05 |
| 526a, 526b | Signetics 82S100 |

RLC Command Processor Timing

Figure 29:
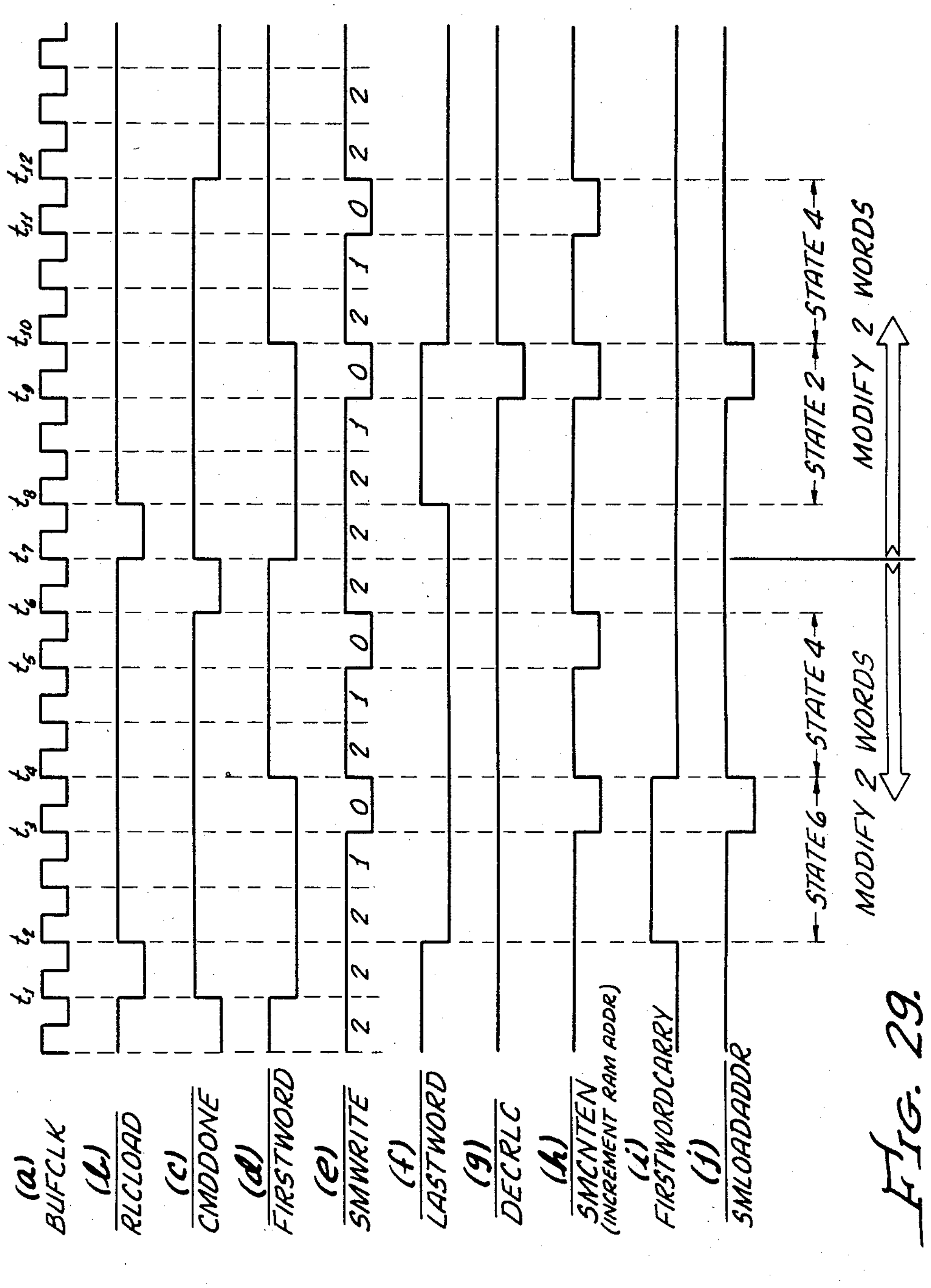

Illustrated in FIG. 29 is the operation of the state machine 561 (shown in detail in FIG. 26) for expansion of two different commands, each of which causes modification of two successive memory words. Times $t_1$ through $t_7$ illustrate operation wherein the entire run of bits to be modified is contained in two successive memory words, there being a First Word, Last Word, and First Word Carry appearing simultaneously. The system is in state 6 until $t_4$, and then goes to state 4. Under control of the buffer clock, line (a) of FIG. 29, RLCLOAD, line (b), and First Word, line (d), become true (low) at time $t_1$, and the modulo three ring counter 620 (FIG. 26) is loaded to start counting when RLCLOAD goes inactive (high) at $t_2$. The ring counter counts down through its cycles, as indicated by the numerals 2, 1 and 0, line (e). Last Word, line (f), becomes active at $t_2$ upon completion of the loading of latch 529. First Word Carry, line (i), goes active (high) at $t_2$. At the beginning of the last count of the ring counter, time $t_3$, its output SMWRITE, line (e), becomes active, causing the state machine decoder 615 to provide its active output SMCNTEN, line (h), and SMLOADADDR, line (j). The First Word Carry high prevents setting of the command done flip-flop 584 by the SMWRITE signal at $t_3$. First Word, First Word Carry, SMCNTEN, and SMLOADADDR all become inactive at $t_4$. The ring counter starts its next three count cycle, producing its second SMWRITE pulse at $t_5$, but the system is in state 4 and only Last Word is active. The decoder 615, therefore, produces only the SMCNTEN signal, line (h). The command done flip-flop 584 having been set by First Word Carry inactive and Last Word active is clocked by the rise of the SMWRITE pulse at $t_6$ to provide a command done signal at $t_6$, line (c).

Figure 30:
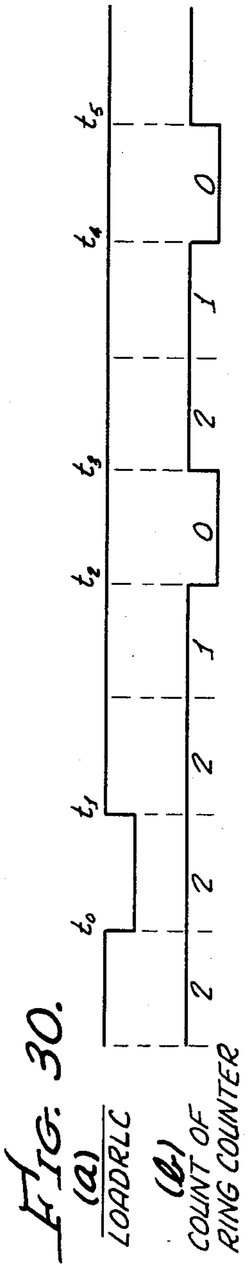

Illustrated in FIG. 30 are the three counts of the state machine ring counter 620 (FIG. 26). During the load RLC pulse $t_0$ through $t_1$, the ring counter is loaded, the word address and the run length code are loaded into the latches, First Word is set, and it is determined if First Word Carry and/or Last Word exist. At $t_1$ the counter begins its count of three count with its third count beginning at $t_2$ and terminating at $t_3$, where it recycles to start its next count of three. The address to the RAM is incremented at $t_3$, the trailing edge of the third count. During the first two counts, from $t_3$ through $t_4$, the system enables the RAM to read, and either contents of the RAM or the color bit (BIT SET) are switched to the MBUS, depending upon the state of the bit mask outputs. At the end of the second count, at time $t_4$, the contents of the MBUS are latched into latches 543*a*, 543*b*, and the conventional RAM write cycle is begun. The third count of the ring counter commences at time $t_4$ (FIG. 30). During this count SMWRITE is active, and the contents of the latches 543*a* and 543*b* are written into the RAM, address increment is enabled, and RLC is decremented, if required. At the end of the third count of the ring counter, RAM address is incremented as the counter once again commences its count of three.

Referring back to FIG. 29, that part of this figure from time $t_7$ to the right-hand side of the figure illustrates operation of the state machine 561 for modification of two adjacent words where there is no First Word Carry. This part of the drawing illustrates operation of the system starting in state 2 and then going to state 4. Upon termination of RLCLOAD at time $t_8$, the ring counter commences its count. Upon the beginning of its third count at time $t_9$, there being a First Word but no Last Word nor First Word Carry, the SMWRITE signal is produced together with DECRLC, SMCNTEN and SMLOADADDR. At time $t_{10}$, after the first full three count cycle of the ring counter, First Word is inactive and Last Word becomes active, and the system changes from state 2 to state 4. At time $t_{11}$, beginning of the third count of the ring counter, the state machine provides its output SMCNTEN to increment the RAM address. The command done flip-flop 584, having been set by Last Word active and First Word Carry inactive prior to $t_{11}$, is clocked by SMWRITE that begins at $t_{11}$ to initiate the command done signal at the next buffer clock $t_{12}$, thus completing the second of the two word modification operation illustrated in FIG. 29.

Figure 31:
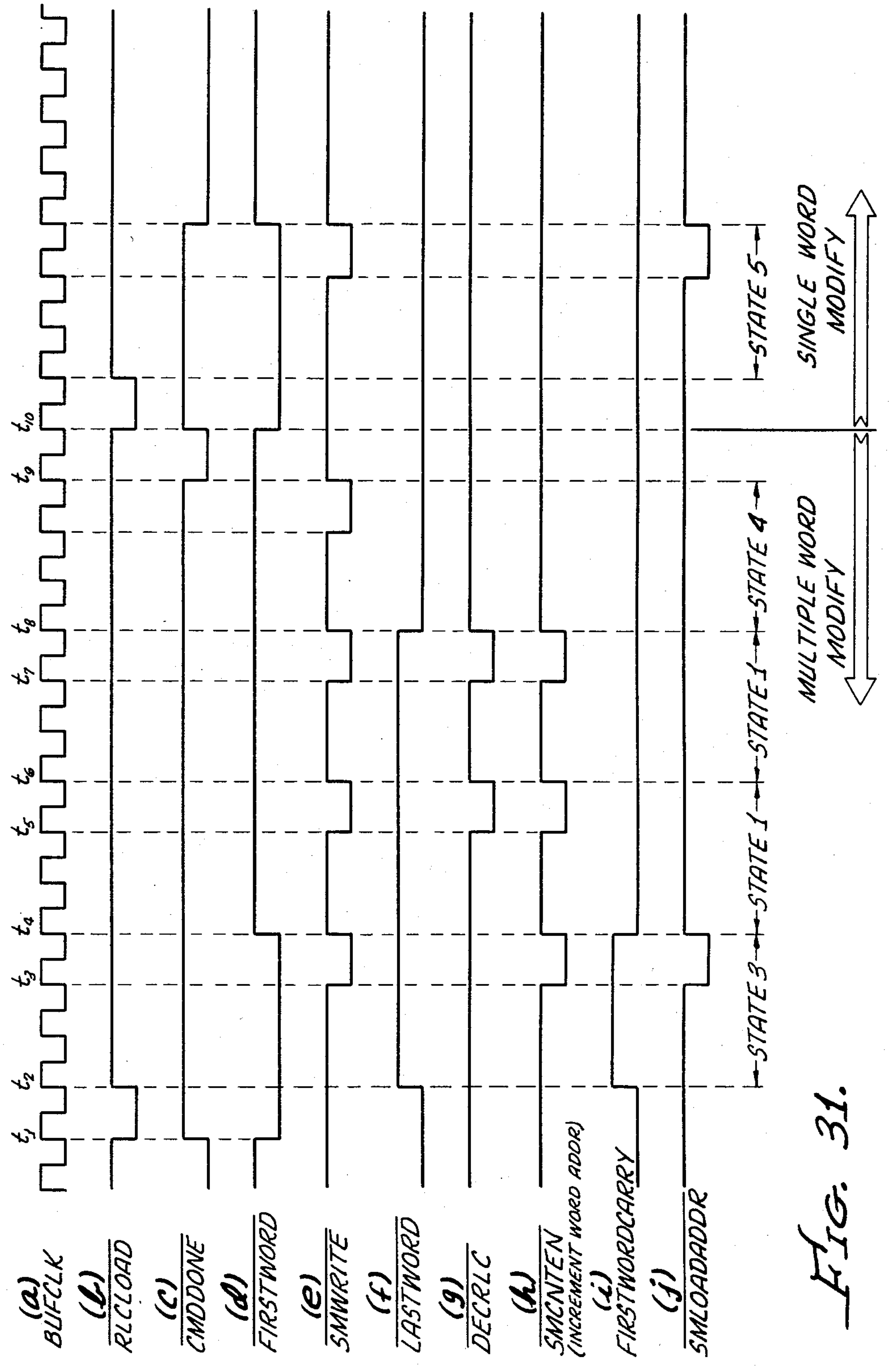

Illustrated in FIG. 31 is the operation of the state machine 561 for a modification extending over multiple words, on the left-hand side of this figure, and for a modification of only a single word, as in state 5, on the right-hand side of this figure. FIG. 31 shows, between times $t_1$ and $t_9$, operation of the state machine for modification of a run length code that extends over four memory words. Times $t_1$ through $t_4$ show operation of the machine in state 3 in which there is a First Word active and First Word Carry active, but Last Word inactive. Between times $t_4$ and $t_6$ is shown operation of the machine in the second word, in state 1, and similarly between, times $t_6$ and $t_8$, operation is shown in the third word, also in state 1. All of the bits of each of the second and third words are modified. Between times $t_8$ and $t_{10}$ operation of the machine is shown for the final memory word of this command, wherein the machine is operating in state 4.

From time $t_{10}$ through the end of the lines of timing signals, FIG. 31 illustrates operation of the machine in state 5, in which the entire run length code occurs in a single word. Here, First Word and Last Word are active, but First Word Carry is inactive. Accordingly, the state machine provides only the state machine load address (SMLOADADDR) output to save the sum of RLC 0–3 and ADR 0–3, and the command done flip-flop is set by the Last Word occurring prior to the SMWRITE count of the three ring counter.

Figure 32:
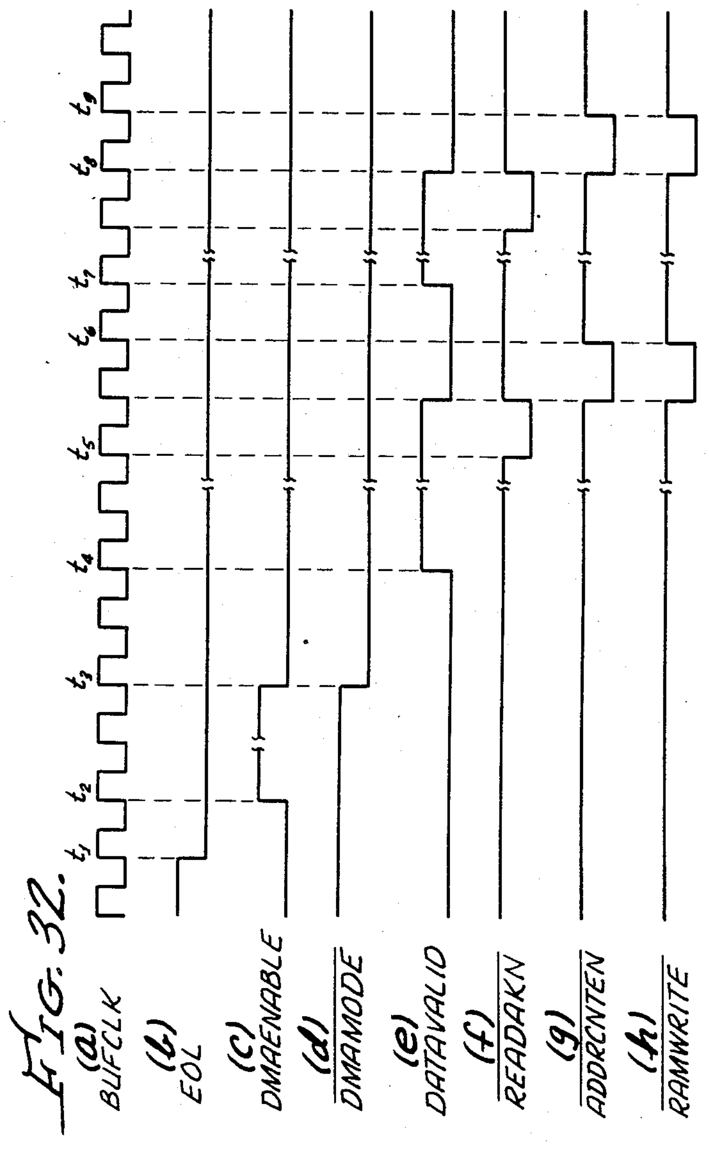

FIG. 32 shows the interface control 559 (shown in detail in FIG. 27) and the relative timing of its inputs and outputs under control of the buffer clock shown in line (a). Upon receipt of the EOL signal line (b), which is the input command on line 558 (FIG. 22) from the command generator to the DMA enable flip-flop 592 (FIG. 23*b*) at time $t_1$, the flip-flop provides a DMAENABLE signal, line (c), at the next buffer clock, time $t_2$, which is sent to the line assembly buffers. When the line assembly buffers have received DMAENABLE from all of the work buffers, they send back DMAMODE, line (d), which clears DMAENABLE (flip-flop 592, FIG. 23*b*), time $t_3$, allowing shift register 630 to start counting upon receipt of clock inputs. At time $t_4$ on the second count of the shift register 630 the latter provides a DATAVALID signal, line (e), which is sent to the line assembly buffers. Upon receipt of the DATAVALID signal and latching of the output data from the RLC command processor, the line assembly buffers at time $t_5$ return READACKN, triggering the third count ($Q_c$) of the shift register 630, which thereupon, lines (g) and (h), provides its ADDRCNTEN output (from gate 637, FIG. 27) and the RAMWRITE output (from gate 642, FIG. 27). The RAMWRITE signal in DMAMODE (but not during data expansion) commands erase of the contents of the trapezoid and pattern work buffers, but not the trace work buffers.

At time $t_2$ (FIG. 32) the RAM address counters of the work buffers are cleared to prepare for the word-by-word transfer of expanded data to the line assembly buffers. On the trailing edge of ADDRCNTEN, at time $t_6$, RAM address is incremented, and on the next buffer clock the RAM data becomes stable, time $t_7$. Data is then held valid until READACKN is received from the line assembly buffers, and at time $t_8$ all buffer memories other than trace buffer memories are cleared. At time $t_9$ on the trailing edge of the ADDRCNTEN, RAM address is again incremented, and the next RAM word is placed in output buffer 542 (FIG. 22).

The line assembly buffers include a counter for counting transferred words, and when the counter signals receipt of the last of the known number of memory words, DMAMODE is removed and no further READACKN is sent from the line assembly buffers. Accordingly, shift register 630 remains in the same state without further shifting until the next line of data has been expanded and is to be transferred. Removal of DMAMODE toggles of flip-flop (not shown) that produces a buffer ready (BUFRDY) signal to cause the next command to be sent from the command generator for expansion by the RLC command processor. Obviously, other arrangements may be readily employed to signal end of the word-by-word data transfer to the line assembly buffers and to enable the next line of commands to be loaded into the RLC command processor. Thus, the contents of the RAM are transferred to the line assembly buffers one word at a time, as shift register 630 repetitively recycles, until the entire line of data has been transferred.

It will be seen that the described arrangement permits location of each pattern at any position within the image, either additively or subtractively overlapping other pattern, trapezoid or trace portions. It is not confined, as are some prior systems, to placement of patterns in a rigidly structured arrangement, nor to patterns having a uniform size. Patterns of many different overall sizes may be readily employed in the described embodiment. Data compression is high. Once stored in library and image data memories, the data for a given image may be used repeatedly for repetitive generation of such image. Master storage (such as, for example, on the floppy discs 28, 30, or equivalent tape storage or the like) is greatly decreased because only one pattern of each different configuration need be stored (e.g., data for a given pattern appears in storage only once even though such pattern may appear many times in a single image). Preparation of commands is simplified, location sorting is avoided, and overlap is accommodated. Slant lines and other trapezoidal patterns can be rapidly generated from a minimum of data, and dedicated hardware enables high speed modification of work buffer memories on a word by word basis, handling all bits of each word in parallel.

The foregoing detailed description is to be clearly understood as given by way of illustration and example only, the spirit and scope of this invention being limited solely by the appended claims.

What is claimed is:

1. A system for generating an image in a plurality of scan lines of image elements, said image comprising a plurality of traces having relatively less change from one scan line to the next, and a plurality of patterns having relatively more change from one scan line to the next, said system comprising trace buffer means for containing data defining trace elements on a scan line, pattern buffer means for containing data defining pattern elements on a scan line, means for providing a group of trace data defining trace elements line by line, means for providing a group of pattern data defining pattern elements line by line, means for clearing said pattern buffer means and feeding a line of said pattern data thereto for each line of said data, means for clearing said trace buffer means and feeding trace data thereto only upon occurrence of a line of trace data that varies from a preceding line, means for generating a data stream that controls a plurality of scan lines to produce an image, control means for controlling said data stream, and means for transferring data from both said trace and pattern buffer means to said control means to control said data stream.

2. A system for generating an image in a plurality of scan lines of image elements, said image comprising a plurality of traces having relatively less change from one scan line to the next, and a plurality of patterns having relatively more change from one scan line to the next, said system comprising trace buffer means containing data defining trace elements on a scan line, pattern buffer means containing data defining pattern elements on a scan line, means for generating a data stream that controls a plurality of scan lines to produce an image, control means for controlling said data stream, and means for transferring data from both said trace and pattern buffer means to said control means to control said data stream, at least one of said buffer means comprising a memory having a plurality of word storage areas defining memory words, each composed of a plurality of bits, a plurality of commands for specifying states of bits in said memory, each command including a length code that defines a run of consecutive bits of like states and a color code that defines the state of the bits of said run, at least one of said commands having a start address that defines the word address of the memory word containing the start of a run, and the bit address within a memory word of the first bit of a run, and including apparatus for controlling the state of bits in said memory, said apparatus comprising means for addressing bits from said memory at least one word at a time, and means responsive to said commands for controlling the state of bits of a word being addressed, said means for controlling comprising means for generating a bit mask that selects bits of a given word to be controlled, and means responsive to said bit mask generating means and to said color code for controlling states of those bits of an addressed word selected by said bit mask generating means.

3. A system for generating an image in a plurality of scan lines of image elements, said image comprising a plurality of traces having relatively less change from one scan line to the next, and a plurality of patterns having relatively more change from one scan line to the next, said system comprising trace buffer means containing data defining trace elements on a scan line, pattern buffer means containing data defining pattern elements on a scan line, at least one of said buffer means comprising a memory having a plurality of storage areas each containing a plurality of bits, means for providing a plurality of commands for specifying states of bits in said memory, each command including a length code that defines a run of consecutive bits of like states and a color code that defines the state of the bits of said run, at least one of said commands having a start address that defines the address of the start of a run, means for generating a data stream that controls a plurality of scan lines to produce an image, control means for controlling said data stream, means for transferring data from both said trace and pattern buffer means to said control means to control said data stream, pattern library means for storing pattern data that define elements of a plurality of patterns, image data means for producing scan line data having pattern calls that identify patterns on each scan line, and means responsive to each pattern call for transferring pattern data from said pattern library means to said pattern buffer means.

4. The system of claim 3 wherein said scan line data of said image data means includes a trapezoid command defining a trapezoid, and including trapezoid buffer means, means responsive to said trapezoid command for storing in said trapezoid buffer means data defining trapezoid elements on a scan line, and means for transferring data from said trapezoid buffer means to said control means.

5. The system of claim 3 wherein said pattern data is stored in said library means in run length coding.

6. The system of claim 3 wherein said pattern data transferring means comprise pointer table storage means for storing library addresses of patterns in said pattern library means, and means responsive to each pattern call for extracting from said pattern library means pattern elements at an address determined by said pointer table storage means.

7. The system of claim 6 wherein said pattern calls identify a pattern and the column address of a point of said pattern, and wherein said means for extracting pattern data elements comprises pattern processing table storage means, means for storing in said processing table storage means library addresses of patterns in said pattern library means identified in pattern calls and scan line column addresses of such patterns, and means for transferring data elements of patterns identified in pattern calls from said library means to locations in said pattern buffer means identified by said column addresses of said processing table storage means.

8. The system of claim 7 wherein each pattern call identifies the column address of a point on the boundary of an area that encompasses such pattern.

9. The system of claim 8 including means responsive to each pattern call for entering in said processing table storage means data related to the pattern identified by such pattern call, and means for employing the pattern library address stored in the processing table storage means for selecting a line of pattern data for transfer from said pattern library means to said buffer means.

10. The system of claim 7 including means for monitoring the number of lines of data of each pattern transferred from said pattern library means.

11. The system of claim 7 wherein said processing table storage means includes a plurality of storage areas including active areas having active pattern data and empty areas not having active pattern data, each area including a map section that identifies the area address of another active area or of another empty area, said map sections forming a trail from one active area to another and from one empty area to another.

12. The system of claim 11 including an active pointer memory for temporarily storing the area address of one of said active areas, and an empty pointer memory for temporarily storing the area address of one of said empty areas.

13. The method of providing a data stream for control of a writing device to generate an image having a plurality of patterns, said method comprising storing at different addresses in a pattern library memory, bit data for each of said patterns in successive lines of data bits, storing in a pointer memory a list of the patterns in said library memory together with the library memory address of each pattern, identifying, for each scan line, each pattern that begins on such scan line and its position on the scan line, selecting from the pointer memory the library memory address of each identified pattern, storing in a pattern processing memory, data defining position on the scan line of each identified pattern and its library memory address, entering into a work buffer, for each scan line, the library memory bit data of each pattern for which an address is stored in the pattern processing memory, and making such entry at the scan line position stored in said processing memory, transferring said bit data from said work buffer to provide a data stream, storing map data in association with data of each identified pattern in said pattern processing memory, said map data for each pattern uniquely identifying the location in said pattern processing memory of data of another pattern therein, to thereby provide a trail from data of one pattern to data of another in said pattern processing memory, and storing in a scratch pad memory an active pattern pointer that uniquely designates location of data of one of the patterns in said pattern processing memory.

14. The method of claim 13 including storing in said pattern processing memory scan line position and library memory address data for another identified pattern, storing map data in association with said last mentioned pattern data that identifies the location designated by said active pointer in said scratch pad memory, and changing said active pointer to designate the location of said last mentioned pattern data, whereby said active pointer designates the location of data for the last identified pattern.

15. A system for generating an image in a plurality of scan lines of sequential image elements, said image including a plurality of patterns, said system comprising a pattern library memory for storing pattern lines of data that define elements of each line of a plurality of patterns of said image, an image data memory for storing scan line data having pattern calls that identify patterns that begin on each scan line, means for reading said scan line data from said image data memory, scan line by scan line, pattern work buffer means for storage of data that define image elements of a scan line, means responsive to each pattern call of a scan line read from said image data memory for transferring a line of pattern data from said pattern library memory to said pattern work buffer means, said pattern data transferring means comprising a pointer memory for storing library addresses of patterns in said pattern library memory, a pattern processing memory, means responsive to each pattern call of a scan line read from said image data memory for storing in said pattern processing memory active pattern data including the library address and scan line column address of patterns identified in calls read from said image data memory, and means for transferring data from library addresses of said active pattern data to locations in said pattern work buffer means identified by said column addresses of said active pattern data, write means for generating an image, and means for controlling said write means from data in said pattern work buffer means.

16. The system of claim 15 wherein each pattern call identifies the column address of a point on the boundary of an area that encompasses such pattern.

17. The system of claim 15 wherein each pattern call identifies the column address of an initial corner of a boundary rectangle that circumscribes such pattern.

18. The system of claim 15 wherein said pattern processing memory includes a plurality of active lines having active pattern data stored therein, each active line having a map section that stores the address in said pattern processing memory of a unique one of the other active lines, and active pointer memory for temporarily storing the address in said pattern processing memory of one of said active lines.

19. The system of claim 18 wherein said pattern processing memory includes means for storing the number of data lines in each pattern of which an address is stored therein, means for changing such number for each transfer of pattern data from said pattern library memory and means for changing the area address identified in the active line map section of one area upon transfer of data from said pattern library memory.

20. The system of claim 15 wherein said image includes a plurality of traces having relatively less change from one scan line to the next, the scan line data stored in said image data memory including trace calls that identify scan line data for said traces, trace work buffer means for storing trace data that defines image elements of a scan line, said means for controlling said write means comprising a line assembly buffer, means for storing in said line assembly buffer a complete scan line of scan data including image elements of both patterns and traces on such scan line, and means for transferring to said line assembly buffer data from either one or both of said work buffers.

21. The system of claim 20 including second pattern work buffer means for storage of data that define image elements of a scan line, and means for subtractively combining data of said second pattern work buffer means with data of at least one of said first mentioned pattern or trace work buffer means.

22. The method of providing a data stream for control of a raster to generate an image having a plurality of patterns, said method comprising storing in a first buffer data defining scan line elements of a first type of image component, storing in a second buffer data defining scan line elements of a second type of image component, generating a raster to produce an image, and controlling the generation of the raster in accordance with data from both the first and second buffers, said step of storing in said first buffer comprising controlling states of a run of like bits in said first buffer for a length defined by a run length code and starting at a bit position defined by a word address and a bit address within such word, said step of controlling states comprising the steps of feeding data from said first buffer to a switching device one word at a time, feeding to said switching device a color signal denoting the state to be established for each bit of a given run of bits within the first buffer, establishing a group of control signals in response to the bit position address and a run length word residual, and controlling the switching device to pass one or the other of its inputs to the first buffer according to said control signals.

23. The method of claim 22 wherein the step of controlling generation of the raster comprises transferring data from either one or both of the first and second buffers to a line assembly buffer and employing data in said line assembly buffer for control of generation of the raster.

24. The method of claim 22 including the step of additively combining data from said first and second buffers for transfer into a line assembly buffer, said step of controlling generation of the raster employing data from the line assembly buffer.

25. The method of claim 22 including the step of subtractively combining data from said first and second buffers for storage in a line assembly buffer, said step of controlling generation of the raster employing data from the line assembly buffer.

26. The method of claim 22 including the step of arithmetically summing the bit address and the run length word residual to obtain an updated bit address, and employing said updated bit address to control the control signals applied to the switching device.

27. A system for generating an image in a plurality of scan lines of image elements, said system comprising write means for generating an image, control means for controlling said write means, image data means for producing scan line data that defines a trapezoid, said scan line data including data defining column address of a point on said trapezoid, slope of one side of said trapezoid, width of said trapezoid along a scan line, rate of change of said width, and the height of said trapezoid, means responsive to said scan line data for driving said control means to cause said write means to generate a trapezoid, said means for driving said control means comprising buffer means, means responsive to said scan line data for storing in said buffer means elements of said trapezoid along a scan line, and means for transferring data from said buffer means to said control means, said buffer means comprising a memory having a plurality of word storage areas defining memory words, have composed of a plurality of bits, the bits to be controlled being specified by a plurality of commands, each command including a length code that defines a run of consecutive bits of like states, a color code that defines the state of the bits of said run, a start address that defines the word address of the memory word containing the start of a run, and the bit address within a memory word of the first bit of a run, said means for storing comprising means for recirculating bits from said memory at least one word at a time, and means responsive to said commands for controlling the state of bits of a word being recirculated, said last mentioned means for controlling comprising means for generating a bit mask that selects bits of a given word to be controlled, and means responsive to said bit mask generating means and to said color code for controlling states of those bits of a recirculating word selected by said bit mask generating means.

28. A system for generating an image in a plurality of scan lines of image elements comprising write means for generating an image, control means for controlling said write means, image data command storage means for storing trace, pattern and trapezoid commands, each said trace command defining column address and scan line width of scan line elements of a trace, each said pattern command defining pattern identification and column address of a point of an area that encompasses a pattern, each said trapezoid command defining column address of a point on a trapezoid, slope of one side of said trapezoid, width of said trapezoid along a scan line, rate of change of said width, and height of said trapezoid, pattern library means for storing pattern data defining elements of a plurality of patterns, trapezoid library means for storing said trapezoid commands and updating such commands for each scan line, trace work buffer means for storing data defining elements of a trace on a scan line, pattern work buffer means for storing data defining elements of a pattern on a scan line, trapezoid work buffer means for storing data defining elements of a trapezoid on a scan line, means responsive to a trace command for storing trace data in said trace buffer means, means responsive to a pattern command for transferring pattern data from said pattern library means to said pattern work buffer means, means responsive to a trapezoid command for transferring trapezoid data to said trapezoid work buffer means, a line assembly buffer, means for transferring data from each of said work buffer means to said line assembly buffer, and means responsive to said line assembly buffer for controlling said control means.

29. The system of claim 28 wherein each of said pattern and trapezoid work buffer means is cleared as data is transferred therefrom.

30. The system of claim 28 wherein data from said work buffers are additively and subtractively combined for transfer to said line assembly buffer.

31. The method of forming an image of a printed circuit board, said image having components comprising a number of pads and a number of traces, said pads including solid patterns of varying shapes and said traces including relatively narrow lines extending between said pads, said method comprising the steps of providing a write beam and a medium upon which an image is to be formed, scanning said write beam across said medium to form said image, providing a body of write beam controlling image data, and controlling said write beam in accordance with said image data, said step of providing a body of write beam controlling image data comprising grouping said image components into traces and patterns, providing a first group of data defining said traces line by line in code, providing a second group of data defining said patterns line by line, transferring a line of data defining said traces to a trace buffer, transferring a line of data defining said patterns to a pattern buffer, and combining data from both said buffers to form a line of write beam control data that defines part of said write beam controlling image data.

32. The method of claim 31 wherein said step of providing a first group of data defining said traces in code includes the step of providing a line address for each code, whereby data defined by a code of a line of said first group of data may be transferred to said trace buffer at a location thereof defined by the line address of such code.

33. The method of claim 31 wherein contents of said pattern buffer are cleared after being combined to form a line of write beam controlling image data, and wherein the contents of said trace buffer are changed only upon occurrence of a code in a line of data transferred to the trace buffer.

34. A system for generating an image of a printed circuit board, said image having components comprising a number of pads and a number of traces, said pads including solid patterns of varying shapes and said traces including relatively narrow lines extending between said pads, said system comprising means for providing a write beam, means for supporting a medium upon which an image is to be formed, means for scanning said write beam across said medium to form said image, means for providing a body of write beam controlling image data, and means for controlling said write beam in accordance with said image data, said means for providing a body of write beam controlling image data comprising a trace buffer, a pattern buffer, means for providing a first group of trace data defining said traces line by line, means for providing a second group of pattern data defining said patterns line by line, means for transferring a line of data defining said traces to said trace buffer, means for transferring a line of data defining said patterns to said pattern buffer, and means for combining data from both said buffers to form a line of write beam control data that defines part of said write beam controlling image data.

35. The system of claim 34 including means for clearing contents of said pattern buffer for each line of write beam controlling image data, and including means for clearing contents of said trace buffer only upon occurrence of trace data in a line of data to be transferred to the trace buffer.

* * * * *